(12) United States Patent
Hunter

(10) Patent No.: US 9,007,004 B2
(45) Date of Patent: Apr. 14, 2015

(54) SENSORLESS AC MOTOR CONTROLLER

(75) Inventor: Gregory Peter Hunter, Taren Point (AU)

(73) Assignee: University of Technology, Sydney, Ultimo, New South Wales (AU)

( * ) Notice: Subject to any disclaimer, the term of this patent is extended or adjusted under 35 U.S.C. 154(b) by 564 days.

(21) Appl. No.: 13/882,905

(22) PCT Filed: Nov. 1, 2010

(86) PCT No.: PCT/AU2010/001452
§ 371 (c)(1),
(2), (4) Date: May 1, 2013

(87) PCT Pub. No.: WO2011/054032
PCT Pub. Date: May 12, 2011

(65) Prior Publication Data
US 2013/0221885 A1    Aug. 29, 2013

(30) Foreign Application Priority Data

Nov. 6, 2009  (AU) ................................ 2009905434

(51) Int. Cl.
*H02P 6/00*    (2006.01)
*H02P 6/12*    (2006.01)
*H02P 21/00*   (2006.01)
*H02P 21/14*   (2006.01)

(52) U.S. Cl.
CPC ............ *H02P 6/001* (2013.01); *H02P 21/0003* (2013.01); *H02P 21/0042* (2013.01); *H02P 21/146* (2013.01)

(58) Field of Classification Search
USPC .................. 318/400.15, 400.02, 609, 799
See application file for complete search history.

(56) References Cited

U.S. PATENT DOCUMENTS

| 6,204,622 | B1 * | 3/2001 | Tsuruta ......................... 318/609 |
| 8,174,217 | B2 * | 5/2012 | Zhang et al. ............. 318/400.02 |
| 2007/0132415 | A1 | 6/2007 | Patel et al. |
| 2009/0160394 | A1 * | 6/2009 | Zhang et al. .................. 318/799 |

OTHER PUBLICATIONS

International Search Report for PCT/AU2010/001452 mailed Jan. 18, 2011.
Written Opinion of the International Searching Authority mailed Jan. 18, 2011.
T. Kim et al., "Sensorless Control of the BLDC Motors from Near-Zero to High Speeds", IEEE Transactions on Power Electronics on Power Electronics, vol. 19, No. 6, Nov. 2004, pp. 1635-1645.
H. Kim et al., "Sensorless Control of Interior of Permanent-Magnet Machine Drives with Zero-Phase Lag Position Estimation", IEEE Transactions on Industry Applications, vol. 39, No. 6, Nov./Dec. 2003.

* cited by examiner

Primary Examiner — Paul Ip
(74) *Attorney, Agent, or Firm* — Nixon & Vanderhye, PC

(57) ABSTRACT

A controller for an AC electric motor, includes a Feed Forward Torque Controller and a load model. The Torque controller directly derives a torque related component of applied motor voltages from a signal representing a torque command input T* and at least one motor parameter. The load model derives a motor speed value including a model of motor speed behavior of the AC electric motor to provide an output signal which represents the motor speed of the AC electric motor. This motor speed output signal is used in determining a frequency of rotation of an applied motor voltage vector. Where an input to the load model is the signal representing the torque command input T*, the load model uses the signal representing the torque command T*, at least over a part of an operating speed range of the AC motor which includes zero speed, to determine the motor speed output signal.

20 Claims, 56 Drawing Sheets

SENSORLESS AC MOTOR CONTROLLER

This application is the U.S. national phase of International Application No. PCT/AU2010/001452 filed 1 Nov. 2010 which designated the U.S., the entire contents of which is hereby incorporated herein by reference.

INTRODUCTION

The present invention relates generally to the field of AC motor speed control and in particular an improved speed controller is provided which employs Feed Forward Torque Control (FFTC) for controlling the torque and speed of an electric motor without the use of sensors for measuring the rotor angular position or speed of rotation.

BACKGROUND

The two main types of alternating current motors used in the world are the induction motor and the permanent magnet synchronous motor (PMSM). Also used in much lower quantities are the wound rotor synchronous motor (for high power), the synchronous reluctance motor (for very rugged environments) and the switched reluctance motor (low cost but poor performance due to mechanical vibrations).

To speed control the induction motor, all that is needed is to supply alternating currents to the windings and vary their frequency to vary the motor speed. For all the other types of motors, a rotor position sensor is normally also used to synchronise the phase of each winding current to the rotor angle so that the applied alternating current has the correct phase to produce a positive rotor torque.

The problem with this sensor is that it costs money (for small motors it can cost more than the motor itself), it puts restrictions on the motor's operating environment (the sensor is much less rugged than the motor), it reduces the reliability of the motor, and the extra leads to connect the sensor to the controller must be accommodated.

Over at least the last 20 years there has been a large volume of research effort directed at developing control methods to eliminate the sensors, especially for the most used motor, the PMSM. However even though the research effort has been intense for a long time, only limited commercial success has been achieved.

There are several simple sensorless control schemes for PMSM's that have wide commercial use. One is the stepper motor, which is widely used in printers and photocopiers. This is a low speed motor which is controlled by injecting a high current into one winding at a time which forces the rotor's magnetic field and thus the rotor itself to align with the field generated by the current. The high current is moved sequentially from one winding to the next dragging the rotor with it. It is also possible to hold the rotor between two steps by putting partial currents in two adjacent windings, a technique called microstepping. These motors have a high number of poles so that one step results in the rotor moving only one or two degrees. This method does not work at higher speeds due to instabilities encountered when the speed matches a mechanical resonance and due to distortion of the current waveforms from the rising back EMF voltage.

There is also another simple sensorless control technique which has found wide application but which only works at high speed. It is used in hard disk drive motors and other small, high speed motors. This technique consists of supplying current to two of the three motor windings at any one time and using the disconnected winding to measure the PMSM's back EMF to determine the position of the rotor. This position information is then used to determine when to rotate the currents to the next set of windings. This method is not self-starting due to the lack of back EMF at low speed, so the motor is first started as a stepper motor then changed over to back EMF control when the speed is increased to a sufficient level.

For applications requiring high torque at zero speed, fast speed reversal, or the application of smooth sinusoidal currents for smooth torque output, the above methods do not work. Research in the field has concentrated on finding sensorless methods which are suitable for these applications. The only sensorless controller for these applications that has gained commercial use is a combination of two techniques one for high speed operation and one for zero and low speed operation.

The technique used for high speed running is to determine the rotor position from the back EMF as before, but to derive the back EMF by measuring the motor terminal voltages and subtracting the voltage drop across the motor winding resistance and inductance, leaving the back EMF voltage as the remainder. There are two obstacles to using this method, particularly at very low speeds. First, it is very difficult to sense and filter the motor terminal voltages and currents to extract the rotor speed and position with minimal delay time at the low end of the speed range and second, the motor resistance changes with motor temperature making it very difficult to obtain accurate values for it. Most recent research in this type of sensorless control has centred on solving these two problems.

The technique used for low speed running is to determine the rotor position by measuring changes in winding inductance, usually by injecting a high frequency test current into the windings while the motor is running. Unfortunately, this requires a specially designed motor in which the winding inductance varies in a predictable way with rotor position. Many researches are beginning to accept that there is no alternative to this compromise. For many applications, including direct drive washing machine motors, the use of motors of this type is not possible, due to their higher cost and design restrictions.

Throughout this specification the term 'low speed' refers to motor speeds low enough so that damping of the natural resonance of the motor is affected mainly by the motor resistance. These motor speeds are typically considered to be speeds below half the natural resonant frequency as measured on the rotor shaft. The term 'high speed' refers to motor speeds high enough that damping of the natural resonance of the motor is affected mainly by the change in motor speed with load torque and where changes in motor resistance have little effect. These motor speeds are typically considered to be speeds above twice the natural resonant frequency as measured on the rotor shaft. The transition between the low speed and the high speed region is gradual with low and high speed effects not completely eliminated at any speed. The natural resonance of the motor is the resonance resulting from the interaction between the restoring torque produced by the misalignment of the back EMF with the applied rotating voltage vector and the shaft inertia. The frequency of this resonance for a two pole motor is the natural resonant frequency $\omega_n$ referred to in the document.

The terms 'low frequency' and 'high frequency' refer to the electrical frequencies of the motor winding voltages and currents corresponding to 'low speed' and 'high speed' operation where the frequency is the speed times the number of pole pairs in the motor. In the description of the AC motor controllers and in the example simulations of AC motor controllers in this document, it is assumed the motor has only one pole pair to simplify the explanation of the operation of these controllers without affecting the general applicability of the method. For the case of the single pole pair motor, the frequency and the speed are the same. However the skilled addressee will readily appreciate how to extend the method to the case of motors having multiple pole pairs.

SUMMARY

According to a first aspect a controller is provided for an AC electric motor, the controller comprising:

i) a Feed Forward Torque Controller which directly derives a torque related component of applied motor voltages from a signal representing a torque command input T* and at least one motor parameter;

ii) a load model, which derives a motor speed value including a model of motor speed behaviour of the AC electric motor to provide an output signal which represents the motor speed of the AC electric motor for use in determining a frequency of rotation of an applied motor voltage vector and where an input to the load model is the signal representing the torque command input T*, the load model using the signal representing the torque command T*, at least over a part of an operating speed range of the AC motor which includes zero speed, to determine the motor speed output signal.

According to a second aspect a method of controlling an AC electric motor is provided, the method comprising:

i) directly deriving a torque related component of applied motor voltages from a signal representing a torque command input T* and at least one motor parameter;

ii) deriving a motor speed value by modelling a behaviour of the AC electric motor to provide an output signal representing the motor speed for use in determining a frequency of rotation of an applied motor voltage vector, and the modelling using as an input the signal representing the torque command input T* at least over a part of an operating speed range of the AC motor which includes zero speed, to determine the motor speed.

Preferably the load model will use the signal representing the torque command T*, over all of the operating speed range of the AC motor to determine the motor speed output signal.

The load model may include a further input which receives a signal representing a torque producing component of the motor currents and used to modify the output signal of the load-model for at least a part of an operating speed range of the AC motor or preferably over all of the operating speed range of the AC motor.

In a preferred embodiment the signal representing a torque producing component of the motor currents is a correction value $\Delta i_q$ derived in a correction calculator which compares an applied torque current $i'_q$ derived from the signal representing the torque command input T* and a measured torque producing component $i_q$ of the motor currents.

A flux current controller may directly derive a flux related component of applied motor voltages from a flux current command input such that a flux component of the motor currents is increased to hold a rotor of the motor in alignment with a direction of a magnetic field produced by the flux component of the motor currents at zero motor speed and at motor speeds at which the rotor cannot align naturally from a presence of motor back EMF.

The load model, may also include a modelling component representing an inertial component of the load, whereby, at least when operating over the part of the operating speed range of the AC motor which includes zero speed, the load model uses the modelling component representing the inertial component of the load to model motor behaviour and to derive the output signal representing the motor speed.

The Feed Forward Torque Controller may operate without using a comparison with feedback information (or at least direct feedback information) from the motor. The Feed Forward Torque Controller may use indirect feedback information comprising an applied motor speed ω' derived by the load model using the signal representing the torque command input T*, the applied torque current $i'_q$ derived from the signal representing the torque command input T* and a measured torque current $i_q$ fed back from the motor.

Said at least one motor parameter may include a value of rotor flux linkage value $\lambda_r$ which may be an estimated value.

The applied value of a torque producing component of the motor currents may be an estimate derived by dividing the torque command input by the rotor flux linkage value.

The load model may incorporate a stability control component including a high speed damping component for stability control. The stability control component may comprise a modulator which modulates an applied motor speed signal with a signal representing a torque producing component of the motor currents.

The load model may incorporate a $1^{st}$ order load torque correction component which corrects the torque command input of the load model by subtracting a signal proportional to a signal representing a torque producing component of the motor currents. The load model may also incorporate a 2nd order load torque correction component.

The controller may also include an integrator which has as an input a signal representing a torque producing component of the motor currents and wherein the 2nd order load torque correction component corrects the torque command input of the load model by subtracting a signal proportional to an output of the integrator. Over at least a part of an operating speed range of the AC, motor which includes zero speed, the integrator may include a DC gain which is limited by modifying the integrator to configure it as a single pole low pass filter. The DC gain may be modified as a function of motor speed with the DC gain increasing as motor speed increases.

A signal representing a torque producing component of the motor currents may be a correction value derived in a correction calculator which compares the applied torque current $i'_q$ derived from the signal representing the torque command input T* and a measured torque producing component $i_q$ of the motor currents.

The stability control component may include a filter in a stabilisation path arranged to provide improved speed feedback stability.

The calculations for the feed forward block may be implemented in a rotating (dq) frame of reference with the resulting dq frame motor voltages and/or flux linkages rotated to a stationary frame of reference for the output to a power converter.

A combined motor equation may be used directly in the feed forward block to create an output to a power converter which is in the stationary frame of reference.

The power convert is preferably a PWM output module.

The calculations for the feed forward block may not include motor speed directly as a factor.

The AC motor controlled by the controller is preferably a permanent magnet synchronous motor. The AC motor may also be an induction motor.

According to a third aspect a controller is provided for an AC electric motor, the controller comprising:

i) a Feed Forward Torque Controller which directly derives a torque related component of applied motor voltages from a signal representing a torque command input T* and at least one motor parameter;

ii) one or more dq to stationary reference frame conversion blocks which rotate an applied motor voltage vector, or vectors from which the applied motor voltage vector is derived, the applied motor voltage vector causing a rotor of the AC motor to rotate at a desired speed and where a signal representing a torque producing component of the motor currents is used to determine a frequency of rotation of the applied motor voltage vector over at least a part of an operating speed range of the AC motor.

According to a fourth aspect a method of controlling an AC electric motor is provided, the method comprising:

i) directly deriving a torque related component of applied motor voltages from a signal representing a torque command input T* and at least one motor parameter;

ii) determining a frequency of rotation of an applied motor voltage vector from an input signal representing a torque producing component of the motor current over at least a part of its operating speed range.

The signal representing the torque producing component of the motor current is preferably used to determine the frequency of rotation of the applied motor voltage vector over a full operating speed range of the motor.

According to a fifth aspect, a controller is provided for an AC electric motor the controller comprising:

i) a Pulse Width Modulation (PWM) driver which receives multiphase voltage signals and creates from them multiphase drive voltage outputs applied to motor windings of the AC electric motor;

ii) an output controller which generates the multiphase voltage signals;

iii) an over-modulation limiting block which compensates for the effects of over-modulation of the multiphase drive voltage outputs.

According to a sixth aspect, a method of controlling an AC electric motor is provided, the method comprising:

i) generating multiphase voltage signals representing desired outputs of a Pulse Width Modulation (PWM) driver;

ii) modifying the multiphase voltage signals to limit a peak output of the Pulse Width Modulation (PWM) driver iii) applying the modified multiphase voltage signals to the Pulse Width Modulation (PWM) driver to create multiphase drive voltage outputs; and iv) applying the multiphase drive voltage outputs to motor windings of the AC electric motor;

whereby the effects of over-modulation of the multiphase drive voltage outputs are compensated for.

The output controller may have as inputs multiphase flux linkage signals and the over-modulation limiting block may operate by limiting a rate of change of the flux linkage signals.

The multiphase voltage signals which control the Pulse Width Modulation (PWM) driver may be fed to the modulator at repeating fixed sample times.

The over-modulation limiting block may consist of clipping said voltage signals at each sample time at a level to prevent saturation of the modulator signals then adding the difference between the original voltage signals and the clipped voltage signals to the voltage signals at the next sample time in such a way that the integral of the original and the clipped voltage signals over multiple sample times remain substantially (generally) the same.

According to a seventh aspect, a controller is provided for a permanent magnet synchronous AC electric motor the controller comprising:

i) an output driver which receives multiphase voltage signals and creates from them multiphase drive voltage outputs applied to motor windings of the AC electric motor;

ii) an output controller which generates the multiphase voltage signals, the output controller comprising:

a) current output regulation which controls the multiphase voltages to regulate an output current of the output driver in a first one of two orthogonal axes of the motor windings, and at least at zero speed the output controller controlling the output current at a value sufficient to align a magnetising axis of a rotor of the motor with the first orthogonal axis; and b) output impedance regulation which regulates an output impedance of the output driver in a second of the two orthogonal axes, at least at zero speed, such that the total of the motor winding impedance and the output impedance in the second orthogonal axis provides damping to rotor oscillations.

According to an eighth aspect, a method of controlling a permanent magnet synchronous AC electric motor is provided the method comprising:

i) driving motor windings of the AC electric motor with multiphase drive voltage outputs created in an output driver which receives multiphase voltage signals;

ii) generating the multiphase voltage signals in an output controller which, at least at zero speed:

a) controls the multiphase voltages to regulate an output current of the output driver in a first one of two orthogonal axes of the motor windings, the output controller controlling the output current at a value sufficient to align a magnetising axis of a rotor of the motor with the first orthogonal axis, at least at zero speed; and b) regulates output impedance of the output driver in a second of the two orthogonal axes such that a total of the motor winding impedance and the output impedance in, the second orthogonal axis provides damping to rotor oscillations.

To achieve the desired effective winding impedance, a negative inductance may be added to an output impedance of the output driver. An electronic resistance may also be added to the output impedance of the output driver. Preferably the output resistance of the output driver is modified by modifying the output controller. In particular the output resistance may be modified by adding the change in the motor current in the second orthogonal axis signal input $\Delta i_q$ to the output controller and modifying the second orthogonal axis applied voltage $v'_q$ by subtracting $\Delta i_q R_1$. In some embodiments $R_1$ may be negative.

The controller of the first, third, fifth and seventh aspects and the methods of the second, fourth, sixth and eighth aspects may be implemented using a suitable programmable digital signal processor (DSP).

For a DSP implementation, the DSP sample period for calculations may be half of a carrier period with each sample time synchronised to a start of a carrier half period. Sample periods which are multiples of a carrier half period may also be used. The dq to $\alpha\beta$ of conversion block may be implemented using sine and cosine look-up tables. Where differentiation of the look-up table outputs is required, this may be implemented in a differentiation block, for an $n^{th}$ sample, by subtracting an $n-1^{th}$ table look-up value from an $n^{th}$ table look-up value.

For large changes between successive sample values, caused, for instance, because of a step change in the torque command, such that an output sampled value of a differentiation block could be large enough to cause voltage clipping of output pulses of the power converter, a pulse lengthening block may be added after the differentiation block to lengthen subsequent output pulses to compensate for the clipping. In a simple case the extra pulse length of the pulses in the following sample period may be equal to the amount clipped from the pulse length in the current sample period whereby the peak voltage is limited without changing the voltage integral. Where an output voltage also includes the IR voltage drop compensation component added after differentiation, the pulse lengthening process may also take this extra voltage into account. Another method of compensating for clipping is to calculate the difference between a modified pulse voltages $$\begin{vmatrix} (v'_{1\alpha})_n \\ (v'_{1\beta})_n \end{vmatrix}$$

and the saturated (i.e. actual) pulse voltages $$\begin{vmatrix} (v'_{S\alpha})_n \\ (v'_{S\beta})_n \end{vmatrix}$$

for an $n^{th}$ pulse and adding the result to the nominal voltages $$\begin{vmatrix} (v'_{\alpha})_{n+1} \\ (v'_{\beta})_{n+1} \end{vmatrix}$$

of the $n+1^{th}$ pulse to get modified voltages $$\begin{vmatrix} (v'_{1\alpha})_{n+1} \\ (v'_{1\beta})_{n+1} \end{vmatrix}$$

for the $n+1^{th}$ pulse (i.e.

$$\begin{vmatrix} (v'_{1\alpha})_{n+1} \\ (v'_{1\beta})_{n+1} \end{vmatrix} = \begin{vmatrix} (v'_{\alpha})_{n+1} \\ (v'_{\beta})_{n+1} \end{vmatrix} + \left( \begin{vmatrix} (v'_{1\alpha})_n \\ (v'_{1\beta})_n \end{vmatrix} - \begin{vmatrix} (v'_{S\alpha})_n \\ (v'_{S\beta})_n \end{vmatrix} \right).$$

BRIEF DESCRIPTION OF THE DRAWINGS

Embodiments of a Sensorless AC Motor Controller will now be described by way of example with reference to the accompanying drawings in which.

DETAILED DESCRIPTION OF EMBODIMENTS OF A SENSORLESS AC MOTOR CONTROLLER

Feed Forward Torque Control (FFTC) is a new technique for sensorless control of the PMSM which approaches the sensorless control problem in a different way to previous research.

All previous methods, except the stepper motor, are based around estimating the rotor position motor terminal measurements instead of measuring it directly. FFTC uses the reverse of this process. FFTC starts with the required motor torque then calculates the wanted motor position from a model of the load and the required motor voltages from an inverted model of the motor (which converts motor currents to voltages instead of voltages to currents). Errors between the rotor position applied to the motor and the actual rotor position are corrected at high speed by using the error in the motor currents to correct the load model and at low speed by increasing the motor current in the correct phase sequence to lock in the rotor position, similar to a stepping motor. Standard speed and position feedback loops are easily applied to the feed forward torque controller for the control of speed or position. FFTC offers many advantages over the sensorless control techniques currently being used:

Embodiments of FFTC require only one method to operate over the full speed range, including fast speed reversals and zero speed operation under load.

FFTC does not require any specially designed motors. Embodiments can be devised which are ideal for direct drive washer motors.

Existing methods use high bandwidth current feedback loops which need high computing power. FFTC embodiments can use very low bandwidth current feedback greatly reducing the needed hardware computing resources.

The problem of extracting the rotor speed and position information from the motor terminal voltages and currents can be avoided.

The problem of estimating the motor resistance with varying motor temperature can be avoided. Embodiments of FFTC do not require accurate knowledge of the motor resistance to operate.

Existing methods use feedback torque control, resulting in a delayed torque response. Torque response with FFTC can be instantaneous, allowing much faster response times for servo applications.

FFTC is not only applicable to the PMSM. It can be applied to all other AC motors including the induction motor.

For fast dynamic control of electric motors, the drive control scheme normally has a fast inner torque or current controller surrounded by feedback speed and position controllers as required for the application.

The inner torque controller is normally a feedback type. The motor torque or torque generating current is measured directly or indirectly then compared with a reference torque or current, the error from which is then used to control the components of the applied motor voltage responsible for generating torque. Also required is a flux controller, which may be feedback or feed forward. This control structure has been very successful and has been almost universally used in both DC and AC motor drives.

Figure 1:
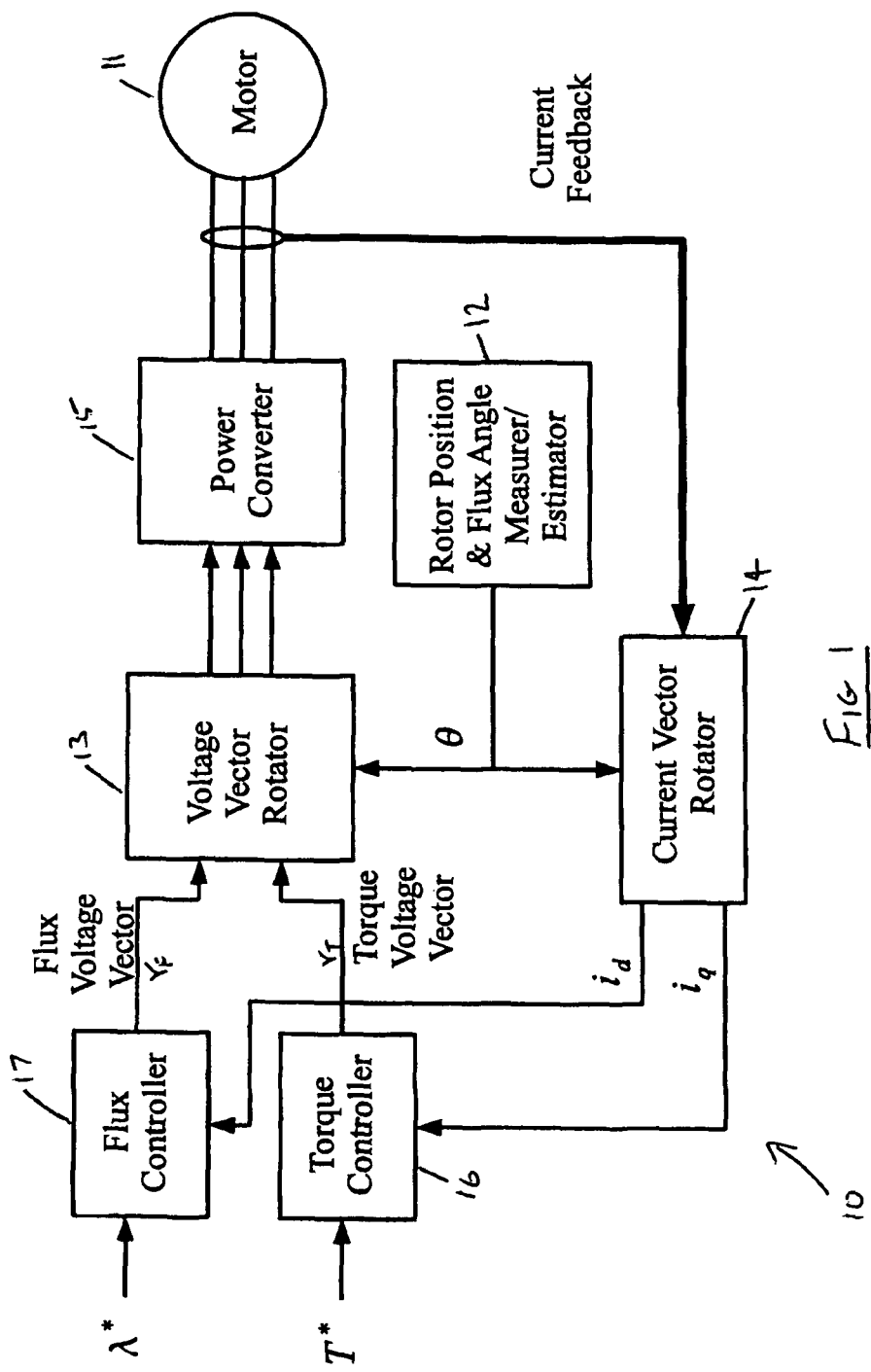
FIG. 1 schematically illustrates a conventional torque controller.

A general block diagram of a controller 10 of this type for an AC motor 11 is shown in FIG. 1. A feature of this type of controller is the need to measure or estimate the rotor position θ. This is used in a voltage vector rotator block 13 to calculate the angle of the motor flux which is needed to rotate the output voltage vector in synchronism with the flux. The rotator position θ is also used in a current vector rotator block 14 to convert measured feedback currents $i_u$, $i_v$, $i_w$ to field and torque current values $i_d$, $i_q$. The torque current $i_q$ is fed to a torque controller block 16 which also takes a signal representing a torque command input T* and generates a torque voltage vector $v_T$ which may contain components of voltage, in both the d and q axis. The field current $i_d$ is fed to a flux controller block 17 which also takes a flux command input λ* which may be substituted by a flux component of motor current command and generates a flux voltage vector $v_F$. The torque voltage vector $v_T$ and flux voltage vector $v_F$ are added and used as inputs to the voltage vector rotator 13 to generate the output voltage vector.

For a synchronous motor with a rotor angle sensor, the flux angle is just the rotor angle θ times the number of pole pairs. For an induction motor, the flux angle is usually indirectly determined from the measured rotor speed and an estimate of the slip frequency. For sensorless control of the motor, the flux angle must be estimated from the motor voltages and currents.

The Following Nomenclature is Used Herein:

*, ', Superscripts indicating command value, applied value, estimated value
T Motor electrical torque
$T_L$ Load torque
θ Rotor angle, anticlockwise between rotor d axis and stationary α winding axis
$\lambda_r$ Rotor flux linkage (amplitude of fundamental component)
ω Rotor speed in radians per second
R Stator phase resistance
L Stator phase inductance
J Motor plus load inertia
$\omega_n$ Natural resonant (hunting) frequency of the motor and load at high speed=$\lambda_r/\sqrt{LJ}$
$R_n$ Natural impedance of the motor and load=$\lambda_r\sqrt{L/J}$
$i_d$ d axis component of motor current
$\Delta i_d$ $i_d-i'_d$: d axis component of motor current error
$i_q$ q axis component of motor current
$\Delta i_q$ $i_q-i'_q$: q axis component of motor current error
$v_\alpha$ α phase motor voltage for two phase motor
$v_\beta$ β phase motor voltage for two phase motor
$v_u$ u phase motor voltage
$v_v$ v phase motor voltage
$v_w$ w phase motor voltage
$V_{DC}$ Inverter DC bus voltage
p Differential operator
$R_T$ Total effective series q axis resistance at low speed
$T_M$ Load torque limit
$i_{d0}$ d axis component of motor current at zero speed
$K_H$ High speed stability compensation gain constant
$\omega_H$ Filter roll off frequency in stability control path
$K_1$ Torque disturbance compensator $1^{st}$ order gain constant
$K_2$ Torque disturbance compensator $2^{nd}$ order gain constant.
$K_3$ Torque disturbance compensator $2^{nd}$ order DC gain constant
$K_{\omega I}$ Speed feedback controller integral gain
$K_{\omega P}$ Speed feedback controller proportional gain
$K_{\omega f}$ Speed feedback controller natural frequency normalised to $\omega_n$
$K_{\omega d}$ Speed feedback controller damping factor
$R_I$ Added inverter generated output resistance
$L_N$ Added inverter generated negative inductance
$\omega_r$ Induction motor rotor rotational frequency
$\omega_e$ Induction motor flux rotational frequency
$\omega_s$ Induction motor slip frequency
$L_l$ Induction motor total leakage inductance
$L_m$ Induction motor magnetising inductance
$R_s$ Induction motor stator resistance
$R_r$ Induction motor stator referred rotor resistance
$i_{dm}$ Magnetising component of induction motor d axis current
$i_{dt}$ Transient component of induction motor d axis current due to a changing flux amplitude
$e_\alpha$ Induction motor α phase equivalent back EMF with rotor flux oriented control
$e_\beta$ Induction motor β phase equivalent back EMF with rotor flux oriented control
$K_{\lambda I}$ Integral gain of the induction motor rotor flux amplitude proportional integral controller
$K_{\lambda P}$ Proportion gain of the induction motor rotor flux amplitude proportional integral controller A variation on the controller of FIG. 1 is the direct torque control method. In this method, the motor torque and flux are calculated directly from the measured motor currents and the estimate of flux position without the need of a current vector rotator. The torque and flux controllers then use these direct values rather than the $i_d$ and $i_q$ currents. Also, the torque and flux controllers are hysteresis controllers directly determining the voltage vectors applied to the motor without using pulse width modulation (PWM).

When using a conventional torque controller with a permanent magnet synchronous motor (PMSM), estimating the rotor position without a rotor position sensor has proved particularly difficult. No universal method which will work with all PMSM types at all speeds has yet been devised. A summary of the various methods that have been devised so far are as follows.

For a permanent magnet motor with rotor saliency, such as an interior permanent magnet motor, it is possible to determine the rotor angle by directly measuring the spatial inductance variation by injecting a high frequency or pulse test currents. One such system which has had some commercial success is the INFORM method. The most advanced of such methods to date is the ellipsoid pattern high frequency injection method. This method gains its high performance by directly measuring the spatial angular rate of change of inductance.

For permanent magnet motors without saliency, the only available method of determining the rotor angle is by using an estimation method using the motor's back-EMF. Many different estimators of this type have been devised. The problem with these methods is that the back-EMF is too small at very low motor speeds to be measured and does not exist at all at zero speed. As a result, a back-EMF sensing method can only be used in applications where operation at zero and low motor speeds is not required. In such applications, the motor is usually started by injecting a current vector into the windings then spatially rotating the phase of the vector to drag the rotor around. Once enough speed is obtained, the controller switches to back-EMF sensing mode.

Figure 2:
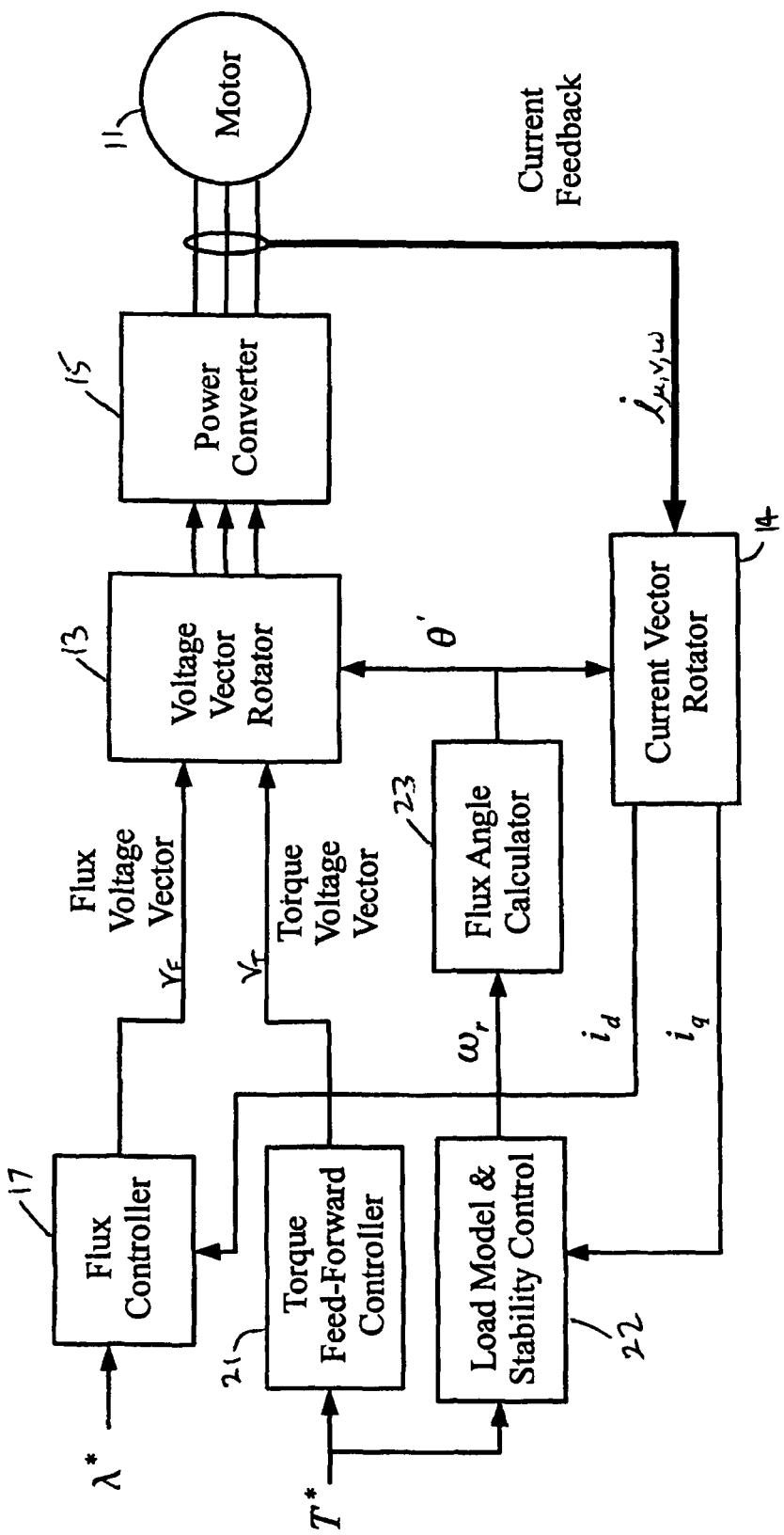
FIG. 2 schematically illustrates an embodiment of a feed forward torque controller now proposed.

In the Sensorless AC Motor Controller now proposed, rather than trying to solve the position estimation problem inherent in conventional torque controllers, a completely new torque controller structure is introduced which does not require knowledge of the rotor position to operate. This new structure is called feed forward torque control. A block diagram illustrating how it may be applied to an AC motor is shown in FIG. 2. In this new structure, the torque voltage vector $v_T$ is calculated directly from the torque command in a torque feed-forward controller 21 using estimates of the motor parameters and the motor flux. The applied rotor speed $\omega'_r$, from which the flux angle calculator 23 calculates the applied flux angle θ', is also found from the torque command using a load model 22. For synchronous machines, the applied flux angle θ' is just the integral of the applied rotor speed $\omega'_r$, but for induction motors a correction must be added for the rotor slip. The load model 22 is corrected for errors and unknown disturbances by feed-back of the torque producing current $i_q$ and comparing this with the expected current calculated from the signal representing the command torque T* (not shown in FIG. 2). This scheme results in torque errors being corrected by changing the rate of acceleration rather than by changing the motor voltages as would occur in a traditional torque feed-back scheme. Errors in the flux angle are corrected mainly by the automatic restoring torque produced in the motor from the resulting change in the torque producing current $i_q$. To prevent rotor speed oscillations (rotor hunting) due to the interaction of the restoring torque with the rotor inertia, some form of stability control should also be added to the load model 22.

Using this new torque control structure allows fast dynamic control of the motor at all speeds. In addition, the slow response time to a change in the signal representing the command torque T* introduced with a conventional feed-back torque control loop, especially with sampled data DSP control hardware, is removed. The response time for the change in motor torque to a change in the command torque is usually only one sample period.

An important feature of this new structure is that close approximations of the rotor speed and position are automatically made available at all speeds for use by the outer feedback loops. As well, the new structure places much lower demands on the hardware, with the required bandwidth of the current feedback signals being typically less than 100 Hz. This is a consequence of the feed-back current being used to correct the load model which only involves mechanical time constants, rather than the electrical time constants associated with the conventional feed-back torque controller.

Presented hereinafter is a detailed example of an implementation of feed forward torque control for a non-salient permanent magnet synchronous motor. The structure of the control system as applied to this type of motor is presented including a detailed description and analysis and simulation results.

Structure of Feed Forward Torque Control for the PMSM

Figure 3:
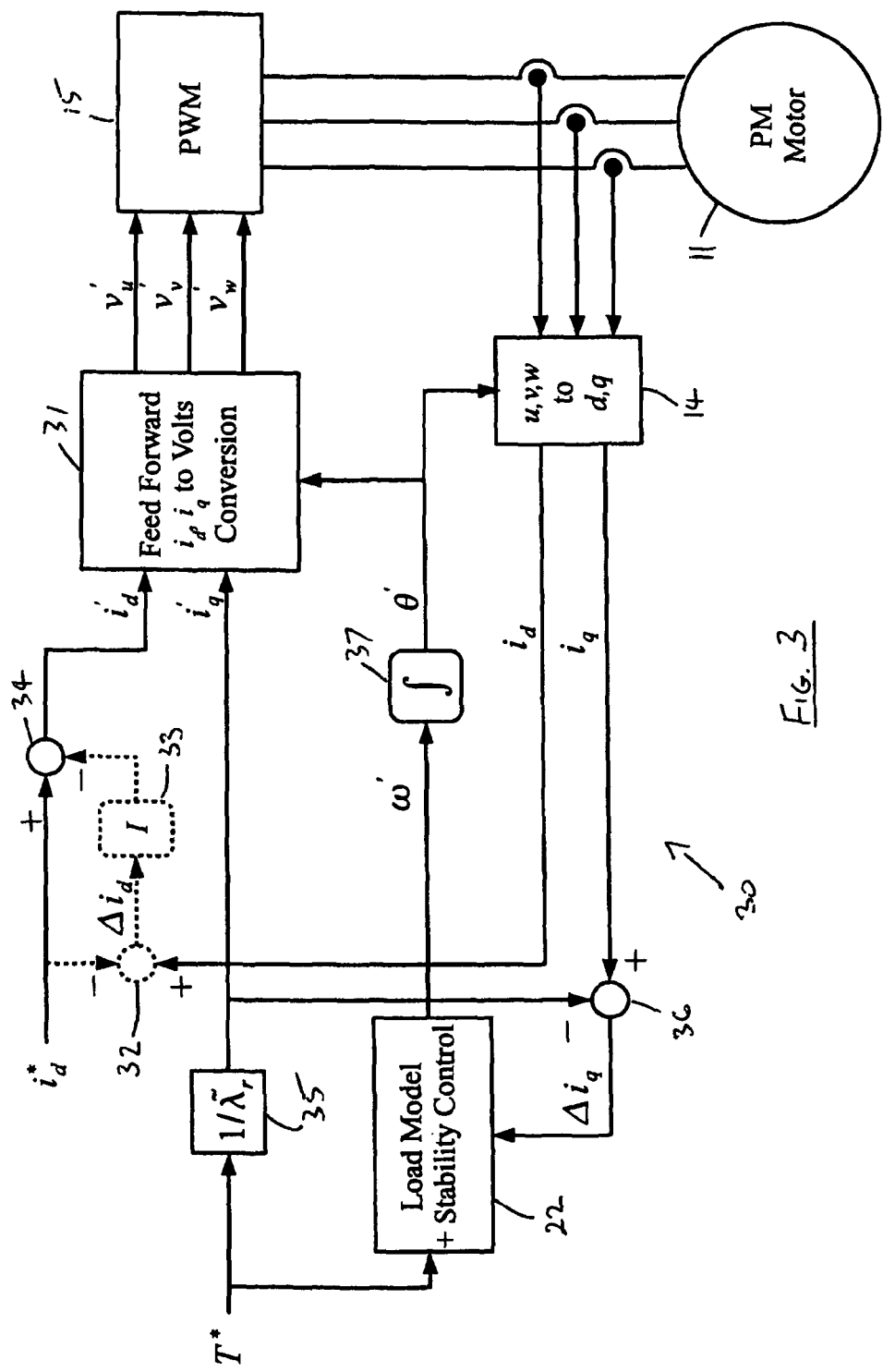
FIG. 3 schematically illustrates the structure of the feed forward torque controller of FIG. 2 in detail as implemented for a PMSM in the preferred embodiment.

A feed forward torque control structure suitable for driving a non-salient PMSM is shown in FIG. 3. In this arrangement, the torque feed-forward controller 21, the flux controller 17 and the voltage vector rotator 13 of FIG. 2 are combined into the feed-forward $i_d$, $i_q$ to volts conversion block 31. Combining these functions into the one block was found to greatly simplify the required algorithms. The flux is fixed by the rotor permanent magnets, so the flux command λ* is replaced with the direct axis current command $i^*_d$. Also, the signal representing the torque command value T* is converted to the applied quadrature axis current $i'_q$ by dividing it by the estimate of the rotor flux linkage in divider 35. The error in the torque producing current $\Delta i_q$, generated as the difference between the applied quadrature axis current $i'_q$ and the torque current $i_q$ in adder 36, is used to correct the load model 22 for unpredicted load disturbances and for correcting errors between the applied rotor position θ' and the actual rotor position θ.

Note that the dq axes referred to is actually the applied dq axes and not the true dq axes of the motor's rotor. When the controller is operating correctly the angle error between the two is minimised.

The accuracy of the d axis current can be improved by using feedback as shown dotted in FIG. 3 to modify the applied d axis current $i'_d$ before the feed forward block. The difference $\Delta i_d$ between the measured field current $i_d$ obtained from the current vector rotator block 14 and the direct axis current command $i^*_d$ may be calculated in adder 32 and amplified and integrated in the integral controller block 33 to calculate a correction which is subtracted from the direct axis current command $i^*_d$ in adder 34 to generate the applied direct axis current value $i'_d$ for the current to voltage converter 31. This is particularly useful at zero or near zero speeds when it is very difficult to precisely set the output current using open loop feed forward control only, especially for a motor with very low winding resistance.

Instead of estimating the rotor speed and position from either the back-EMF or high frequency injection, as in a conventional inner torque control structure for a sensorless PM motor, a load model 22 is used to determine an applied rotor frequency ω' which is then integrated (in integrator 37) to obtain an applied rotor position θ'. To improve the load model 22, the difference $\Delta i_q$, calculated in adder 36, between the applied q axis torque producing component of current $i'_q$ and the measured value of this current $i_q$ may be used to correct the load model 22. Usually the load model used just models the load inertia with the q axis current error being used to correct for added load torque.

The feed forward torque control method relies on the actual rotor position θ tracking the applied rotor position θ'. For the permanent magnet synchronous motor, at high rotor speeds above the natural hunting frequency of the rotor and load, this occurs naturally. An increase in the rotor position error causes a change in the motor q axis component of current $i_q$ resulting in the generation of an automatic restoring torque to correct the error. Without any modifications, though, the rotor damping of the oscillations caused by the interaction of the restoring torque and the rotor inertia is very poor. This instability can be successfully damped using a method which involves modulating the applied rotor frequency ω' with the deviation in the q axis component of current caused by the instability. A refined version of this method suitable for feed forward torque control of the permanent magnet synchronous motor is described in this document.

At very low speeds, the natural restoring torque which is a consequence of the back-EMF is too weak to lock the rotor position to the applied rotor position. Instead, at low speed, a different mechanism can be used. At these speeds, a positive value of the direct axis motor current $i_d$ can be applied to lock the rotor into its correct position from the interaction of the rotor magnetic field and the field generated by this current. This is the mechanism by which stepping motors work, and as with stepping motors, good low speed position control can be achieved.

Detailed Description and Analysis of Feed-Forward Current to Voltage Conversion

Figure 4:
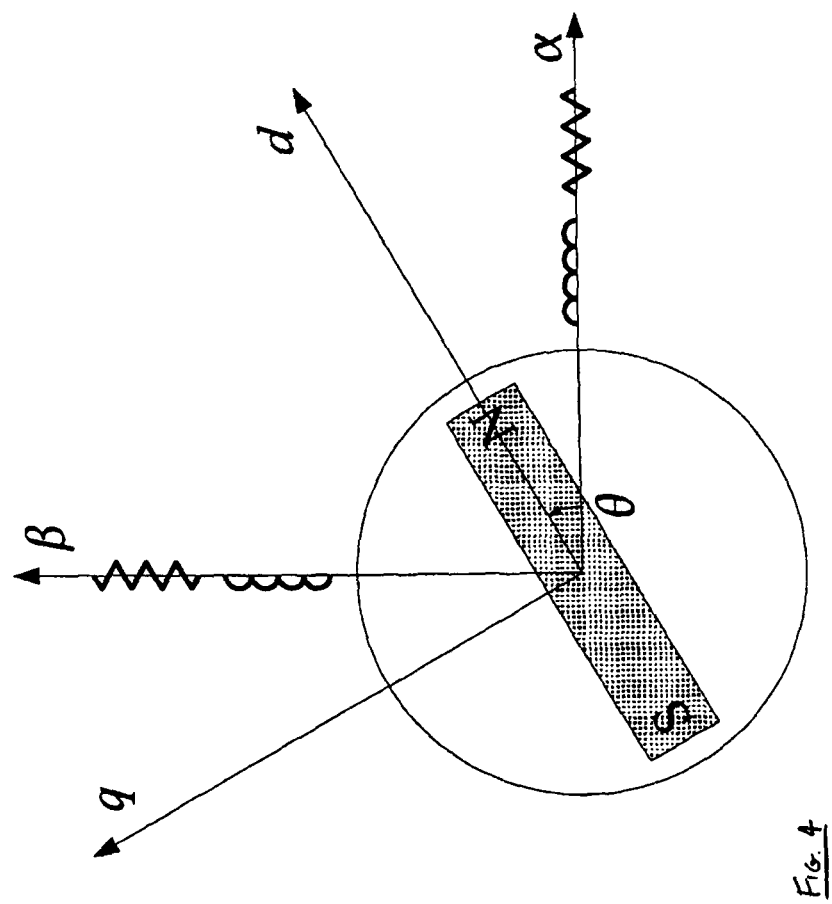
FIG. 4 schematically illustrates fixed and rotational axis representations of a PMSM.

The feed-forward conversion block generates the motor voltages required for the motor currents to track the input applied dq axes currents $i'_d$ and $i'_q$ for an input applied rotor angle θ'. The outputs of this block are the two-phase applied output motor voltages $v'_\alpha$ and $v'_\beta$ which can then be converted 3-phase output voltages for use by the PWM generator. The outputs of this block are generated using the motor equations linking $v'_\alpha$ and $v'_\beta$ to $i'_d$ and $i'_q$ which are derived as follows:

Using the stationary αβ axes shown in FIG. 4, the motor currents and voltages are related by the equation:

$$\begin{bmatrix} v_\alpha \\ v_\beta \end{bmatrix} = \begin{bmatrix} Ri_\alpha \\ Ri_\beta \end{bmatrix} + p \begin{bmatrix} Li_\alpha + \lambda_{r\alpha} \\ Li_\beta + \lambda_{r\beta} \end{bmatrix} \quad (1)$$

Converting the stationary αβ frame currents and flux linkages to the rotating dq frame shown in FIG. 4 using the relationship:

$$\begin{bmatrix} \alpha \\ \beta \end{bmatrix} = \begin{bmatrix} \cos\theta & -\sin\theta \\ \sin\theta & \cos\theta \end{bmatrix} \begin{bmatrix} d \\ q \end{bmatrix} \quad (2)$$

and assuming the rotor flux is aligned on the d axis, giving $\lambda_{rd}=\lambda_r$ and $\lambda_{rq}=0$, the following equation is obtained:

$$\begin{bmatrix} v_\alpha \\ v_\beta \end{bmatrix} = \begin{bmatrix} \cos\theta & -\sin\theta \\ \sin\theta & \cos\theta \end{bmatrix} \begin{bmatrix} Ri_d \\ Ri_q \end{bmatrix} + p \begin{bmatrix} \cos\theta & -\sin\theta \\ \sin\theta & \cos\theta \end{bmatrix} \begin{bmatrix} Li_d + \lambda_r \\ Li_q \end{bmatrix} \quad (3)$$

This equation can be expanded further to the following familiar motor voltage equations in the dq frame:

$$\begin{bmatrix} v_d \\ v_q \end{bmatrix} = \begin{bmatrix} R+Lp & -\omega L \\ \omega L & R+Lp \end{bmatrix} \begin{bmatrix} i_d \\ i_q \end{bmatrix} + \omega \lambda_r \begin{bmatrix} 0 \\ 1 \end{bmatrix} \quad (4)$$

where:

$$\begin{bmatrix} v_\alpha \\ v_\beta \end{bmatrix} = \begin{bmatrix} \cos\theta & -\sin\theta \\ \sin\theta & \cos\theta \end{bmatrix} \begin{bmatrix} v_d \\ v_q \end{bmatrix} \quad (5)$$

In a conventional motor controller, all calculations are implemented in the dq frame with the resulting dq frame motor voltages rotated to the αβ frame for the PWM output. For the feed-forward current to voltage conversion block, it is possible to use the same procedure, first using equation (4) to generate the applied motor voltages in the dq axis then using equation (5) to convert to the αβ frame.

An alternative and novel approach proposed here is to use the combined motor equation (3) directly. Some useful benefits are obtained using this approach. A block diagram of a suitable programmable digital signal processor (DSP) implementation of the feed-forward block using equation (3) is shown in FIG. 5.

Figure 5:
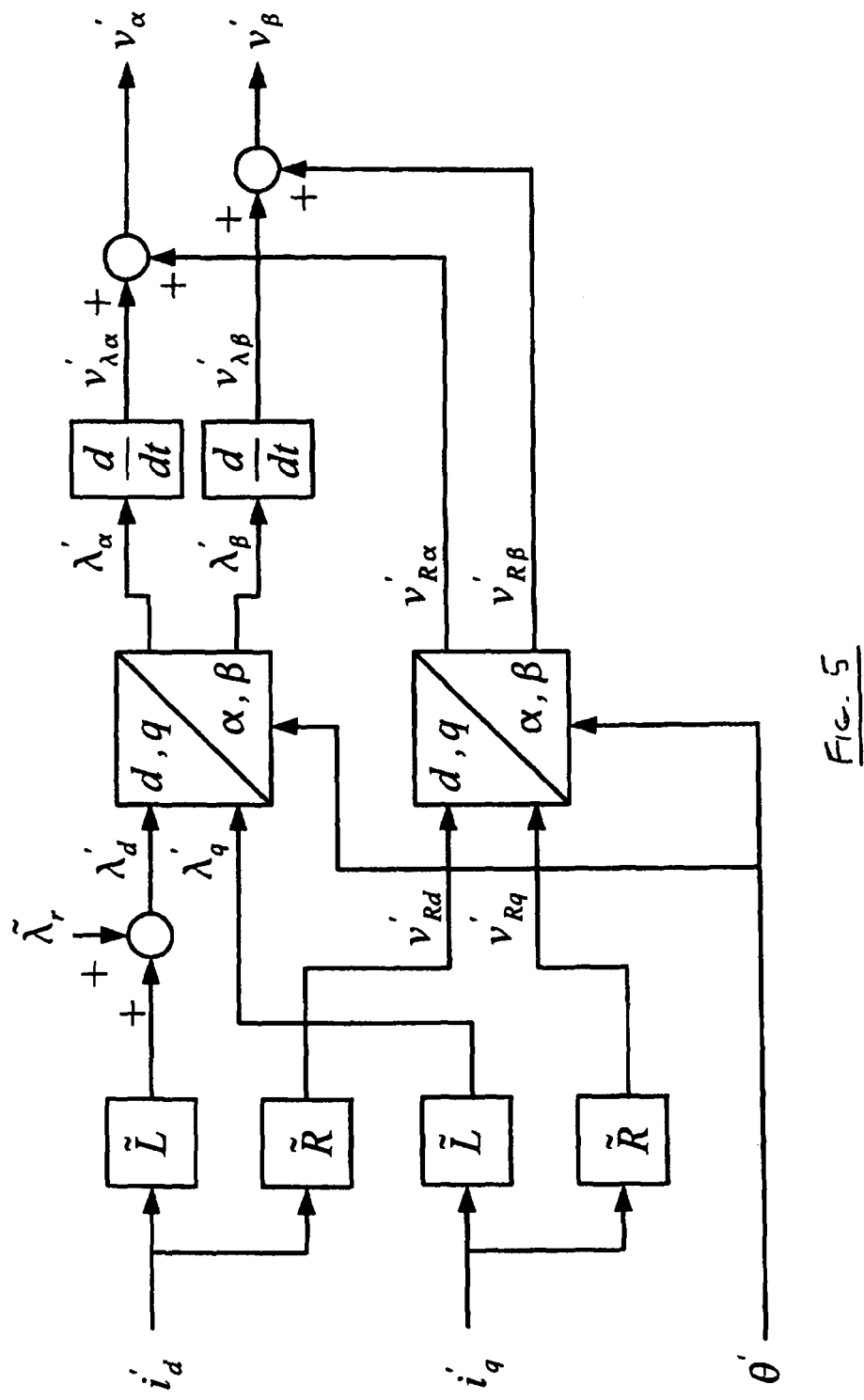
FIG. 5 schematically illustrates a basic implementation of a feed forward block.

Note that if the motor has some rotor saliency where the d and q axes inductances differ, this can be accounted for in the feed-forward block as shown in FIG. 5 by using different values of the estimate of inductance in each of the d and q paths. With such motors, it is often advantageous to misalign the rotor flux angle to generate reluctance torque. Further changes to the feed-forward block would be required to achieve this misalignment.

Figure 6:
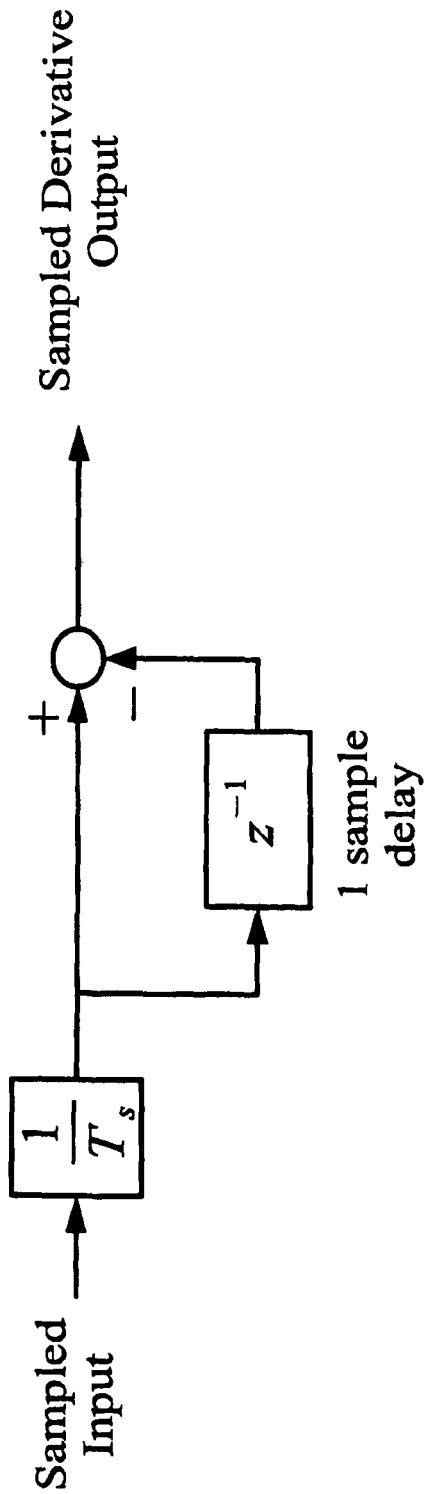
FIG. 6 schematically illustrates an implementation of a differentiation block.

For a DSP implementation, the DSP sample period for calculations is normally half the carrier period with each sample time synchronised to the start of a carrier half period. Sample periods which are multiples of a carrier half period can also be used. The dq to αβ conversion block is usually implemented using sine and cosine look-up tables. Each differentiation block in FIG. 5 can then be implemented by subtracting the previous table look-up value from the new table look-up value at each sample. This is shown in block diagram form in FIG. 6.

An advantage of using a direct implementation of equation (3) that the sine and cosine look-up tables for the d, q to α, β conversion block do not need to be very accurate because an error in one sample value will cause a short term proportional current error only (LΔi=Δλ) which would be considerably less than the carrier induced current ripple anyway. Contrast this to a scheme using equations (4) and (5) where the vector rotation acts on the voltages instead of the flux linkages. The sine and cosine look-up tables now need to be very accurate because an error in one sample value causes a permanent step change in current (LΔi=∫Δvdt). Also in the feed-forward implementation scheme of FIG. 5 is the direct voltage to voltage vector rotation of the estimated motor IR drop voltages. Since these added voltages compensate only for the motor resistance voltage drops, the look-up tables for the dq to αβ conversion also do not need to be very accurate.

Another advantage of using the direct implementation is that because the output voltages $v'_\alpha$ and $v'_\beta$ are the change in flux linkage over each PWM carrier period or half period, these voltages are equal to the average expected voltages over this period (Δλ=Δ∫vdt). The resulting PWM pulse widths are thus proportional to the average output voltages over that period. It has been shown that this greatly reduces subharmonic currents when the carrier to output frequency ratio is low.

Figure 7:
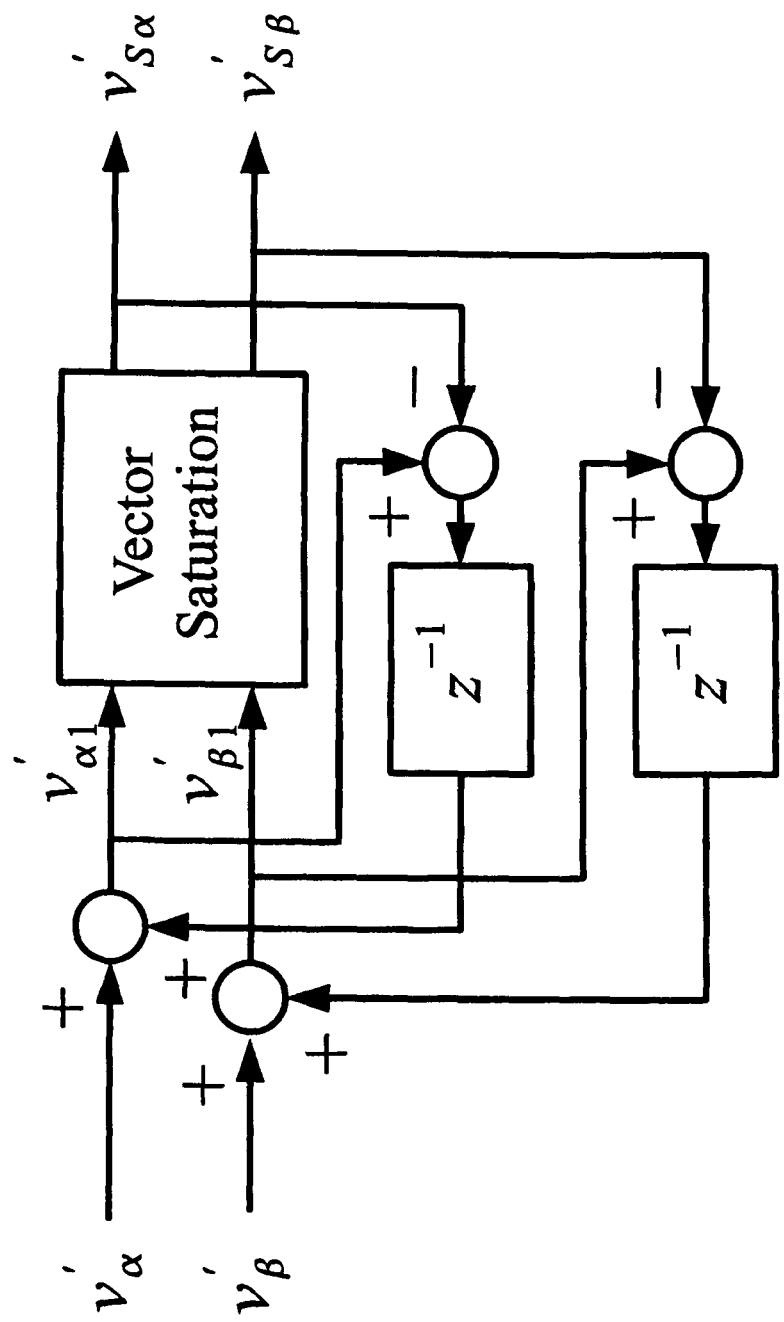
FIG. 7 schematically illustrates a method of pulse clipping and lengthening.

For large changes between successive sampled values of the applied flux linkages $\lambda'_\alpha$ and $\lambda'_\beta$ caused, for instance, by a step change in the torque command, the output sampled value of each differentiation block could be large enough to cause clipping in the PWM output voltage. This would result in the needed change in flux linkage and the corresponding change in current not appearing on the motor. To prevent this happening, an extra pulse lengthening block can be added after differentiation to limit the peak voltage without changing the voltage integral. Because the output voltage also includes the IR voltage drop compensation component added after differentiation, the pulse lengthening process must also take this extra voltage into account. A suitable method of implementing the required pulse lengthening is shown in FIG. 7. This pulse lengthening and clipping unit modifies the applied output stationary axis voltages $v'_\alpha$ and $v'_\beta$ by clipping their vector magnitude and adding the resultant errors to the inputs at the next sample.

This method of pulse lengthening is only approximate. It assumes the change in the applied IR drop voltages $v'_{R\alpha}$ and $v'_{R\beta}$ and the change in the applied flux angle θ' are not significant during pulse lengthening. A more complex pulse lengthening method may be needed for a motor with high winding resistance or for a low sample frequency to output frequency ratio.

Figure 8:
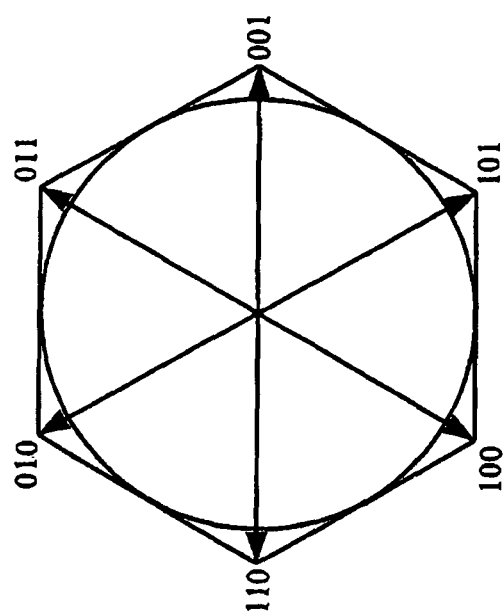
FIG. 8 illustrates inverter output space vectors showing a hexagonal limit and a proposed circular limit.

The vector saturation unit can clip the $[v'_\alpha, v'_\beta]$ vector to a fixed magnitude so it is limited to a circle in the space vector plane. For maximum utilisation of the available inverter output voltages, assuming a six switch 3 phase inverter is used, clipping to a hexagon limit can be implemented. The two limits on the space plane are shown in FIG. 8.

Figure 9:
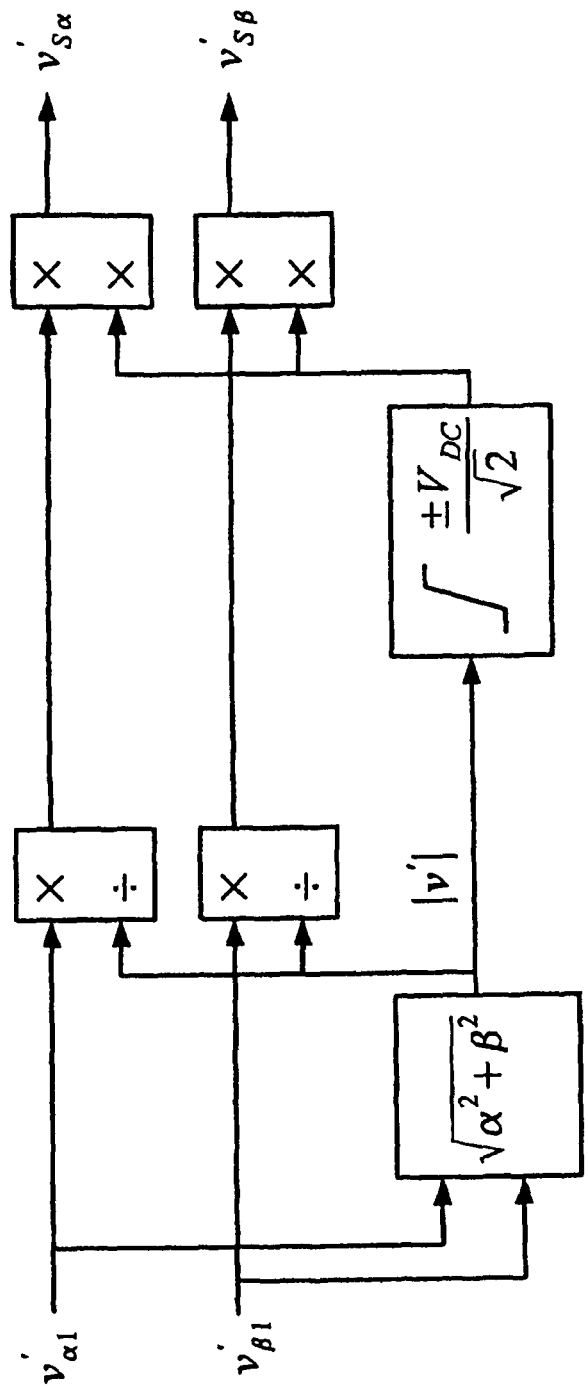
FIG. 9 schematically illustrates vector saturation of the applied phase voltages.

A simple method of implementing clipping to a circle which avoids calculating the vector angle is shown in FIG. 9. The vector components are normalised by dividing by the vector magnitude then resealed using the clipped value of the magnitude. To reduce the computational load, the vector magnitude need not be calculated accurately.

An alternative method of effective pulse lengthening is to limit the rate of change of the vector magnitude of the total flux linkage. This could be implemented either before or after the vector rotation from the dq to the αβ reference frames in FIG. 5.

Pulse Width Modulation

The two most common methods of generating the actual output pulse width modulated output voltages from the output voltage signals are space vector modulation and triangle carrier-based modulation. It is difficult to apply space vector modulation in this instant because the angle of the applied output voltage signal vector is not known and can be difficult to calculate from the vector components $v'_{S\alpha}$ and $v'_{S\beta}$. Instead, carrier-base modulation will be used. There is little difference between the performances of the two methods.

Figure 11:
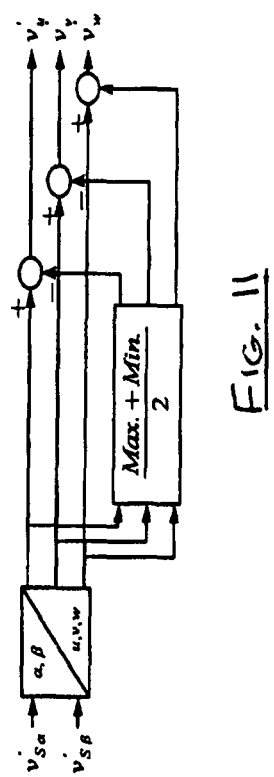
FIG. 11 schematically illustrates a method of centring the PWM inputs.

The PWM process used in the experimental set-up as implemented on dSpace hardware is shown in FIG. 11. The stationary frame output voltage signals $v'_{S\alpha}$ and $v'_{S\beta}$ are first converted to three, phase format and then centred within the DC bus limits.

The equivalent three-phase output voltages are found using the power conversion formula of equation (6).

$$\begin{bmatrix} v'_u \\ v'_v \\ v'_w \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} v'_{S\alpha} \\ v'_{S\beta} \end{bmatrix} \quad (6)$$

Figure 10:
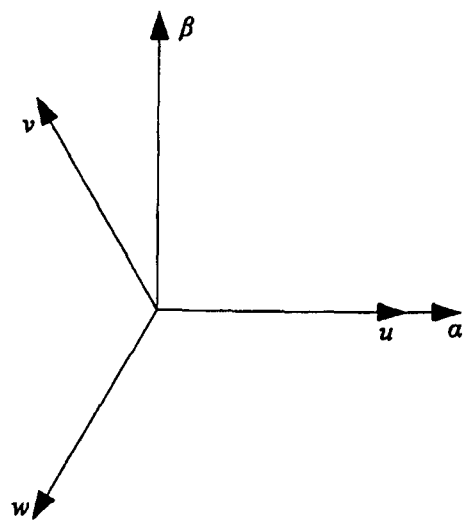
FIG. 10 is a vector diagram showing the relationship between the u, v and w and the $\alpha$ and $\beta$ vectors.

For clarity, the relation between the u,v,w and the α, β vectors is shown graphically in FIG. 10.

The centring within the DC bus limits is equivalent to having equal start and finish null vector times in the space vector modulation method. The output voltage signals $v'_u$, $v'_v$ and $v'_w$ can, after suitable scaling and offset adjustment, be sent to a hardware carrier-based PWM generator as found in most motor control DSP's.

Although not implemented here, it is often advantageous to clamp the PWM output voltages to alternatively the positive and negative DC bus limits for minimum switching losses.

Load Model

As shown in FIG. 3, a load model 22 is required to find the applied motor speed $\omega'$ from the reference torque T*. For most applications, a basic inertial model is sufficient. This model assumes the following relationship between the torque and speed, shown Laplace transformed:

$$\omega = \frac{T}{Js} \tag{7}$$

This equation is implemented as the load model by using an estimate of the total inertia. The load model block implementing this equation is shown in FIG. 12.

As will be shown later, at high speeds, errors caused by added load torque can be corrected using the measured rotor flux oriented q axis component of motor current. At low and zero speed, any added load torque will cause an error in the rotor angle which can be constrained by setting a high d axis component of motor current.

Stabilisation at High Speed

Figure 12:
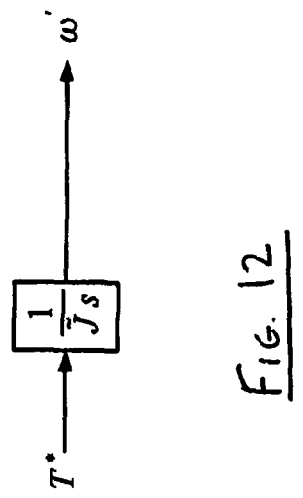
FIG. 12 schematically illustrates a load model block for an inertia load.

If only the load model of FIG. 12 was used to generate the applied rotor speed $\omega'$, the motor would exhibit instability, with the actual motor speed oscillating about the applied speed. To prevent this, electrical damping must be added to the control structure. There are two modes of oscillation, one that occurs at high speed and another that occurs at low and zero speed and each mode requires a different damping procedure.

The oscillation in rotor speed of the PMSM when operating with a fixed frequency at high speed is well known. An exact analysis of the phenomenon is given by J. Itoh, N. Nomura and H. Osawa. ("A comparison between v/f control and position-sensorless vector control for the permanent magnet sensorless motor," *Proc. Power Conversion Conf.*, 2002, vol. 3, pp. 1310-1315, April 2002.). Here, a simplified analysis is given similar to that presented by R. S. Colby and D. W. Novotny. ("An efficiency-optimising permanent-magnet synchronous motor drive," *IEEE Trans. Ind. Appl.*, vol. 24, no. 3, pp. 462-469, May/June 1988.). This analysis is sufficient for choosing the parameters in a controller design.

Figure 13:
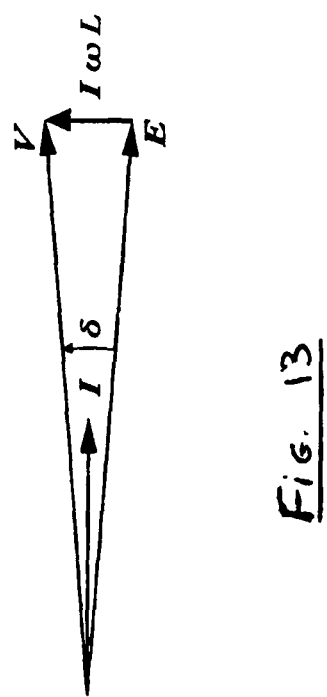
FIG. 13 is a phasor diagram for a rotor retarded by angle $\delta$.

Consider the case of a two pole PMSM operating without load at a high fixed stator frequency $\omega$ and with the rotor emf vector, E, equal to the applied voltage vector, V. Now consider the case of a small perturbation of $\delta$ radians in the rotor angle due to instability causing a current I to flow. At high speed, the motor reactance $\omega L$, is much larger than the motor resistance and the phasor diagram shown in FIG. 13 applies.

Assuming $\delta$ is very small, and with the applied q axis aligned with the voltage vector V, $I \approx i_q$ and the resulting current is given by:

$$i_q = \frac{\lambda_r \delta}{L} \tag{8}$$

The resulting restoring torque T is given by:

$$T = \lambda_r i_q \tag{9}$$

$$= \frac{\lambda_r^2 \delta}{L}$$

Coupled with the motor inertia J, the resultant simple harmonic motion is described by the differential equation:

$$J \frac{d^2 \delta}{dt^2} = -\frac{\lambda_r^2}{L} \delta \tag{10}$$

Replacing $\delta$ with T as the independent variable using equation (9):

$$J \frac{d^2 T}{dt^2} = -\frac{\lambda_r^2}{L} T \tag{11}$$

In reality, there will be a steady state torque and q axis current as well as the oscillating torque and current so torque T in the above equation should be replaced with the change in torque $\Delta T$, giving the differential equation describing the oscillation as:

$$J \frac{d^2 \Delta T}{dt^2} = -\frac{\lambda_r^2}{L} \Delta T \tag{12}$$

Compare this to the equation for an LC tuned circuit:

$$C \frac{d^2 i(t)}{dt^2} = -\frac{1}{L} i(t) \tag{13}$$

Figure 14:
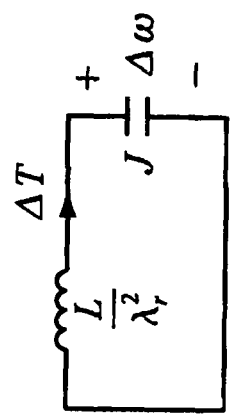
FIG. 14 schematically illustrates a high speed quasi-steady-state mechanical equivalent circuit.

The quasi-steady-state differential equation (12) can now be conveniently represented by the LC equivalent circuit of FIG. 14. This tuned circuit analogy is an excellent way of viewing the main system energy storage states involved in the oscillation which are not readily apparent in a mathematical representation.

The capacitor in FIG. 14 represents the load inertia and the voltage across it, as shown, gives the quasi steady state change in rotor speed $\Delta\omega$.

The resonant frequency of this system, which is called the natural frequency $\omega_n$, is an important parameter in the design of the controller. Its value is given by the equation:

$$\omega_n = \frac{\lambda_r}{\sqrt{LJ}} \tag{14}$$

Figure 15:
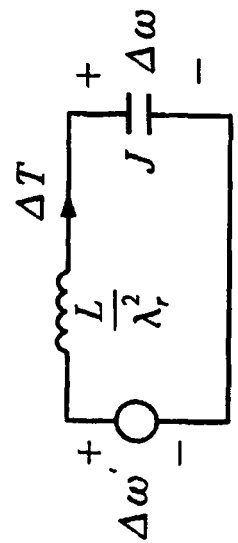
FIG. 15 schematically illustrates a high speed mechanical equivalent circuit with forcing function $\Delta\omega'$.

To apply damping to the above resonant system, a series equivalent resistance can be inserted in the equivalent tuned circuit. To do this, first a forcing function is added in series in the circuit by adding a modulating frequency $\Delta\omega'$ to the applied frequency. This appears in the equivalent tuned circuit as an equivalent forcing voltage as shown in FIG. 15. Note that with the feed forward block as implemented in FIG. 5, when a change in frequency is made, a change in the q axis output voltage of $\lambda_r \Delta\omega'$ also occurs. At high speed, where the back-EMF is much larger than this change in voltage, it has little effect on the q axis current. As will be seen later, at low speed, the reverse is true: the q axis current is affected mainly by this voltage change and not by the change in the applied frequency.

To provide damping, the forcing function Δω' can be made proportional to the change in torque ΔT to create an equivalent series damping resistance. For a damping factor ζ, the required forcing function is given by the equation:

$$\Delta\omega' = -\frac{2\zeta}{\lambda_r}\sqrt{\frac{L}{J}}\Delta T \quad (15)$$

In the actual controller, the measured parameter is $i_q$ rather than torque, so changing ΔT to $\Delta i_q$ as the independent variable, equation (15) becomes:

$$\Delta\omega' = -2\zeta\sqrt{\frac{L}{J}}\Delta i_q \quad (16)$$

The high speed damping can be incorporated into the load model block 22 of FIG. 3. Combining the simple inertia load model of equation (7) and FIG. 12 with high speed damping, the Laplace transform equation of the load block implementation is now:

$$\omega' = \frac{T^*}{Js} - 2K_H\sqrt{\frac{L}{J}}\Delta i_q \quad (17)$$

where $K_H$ is defined as the high speed damping constant and is equal to the LC damping factor ζ.

Figure 16:
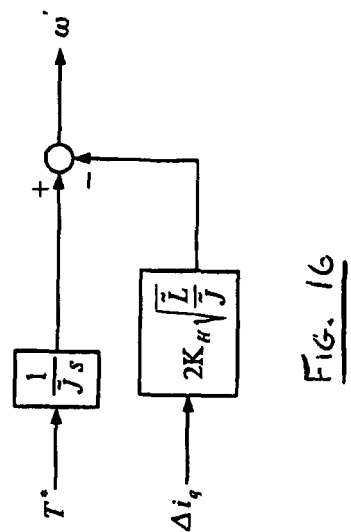
FIG. 16 schematically illustrates a load model and stability control incorporating high speed damping.
Figure 17:
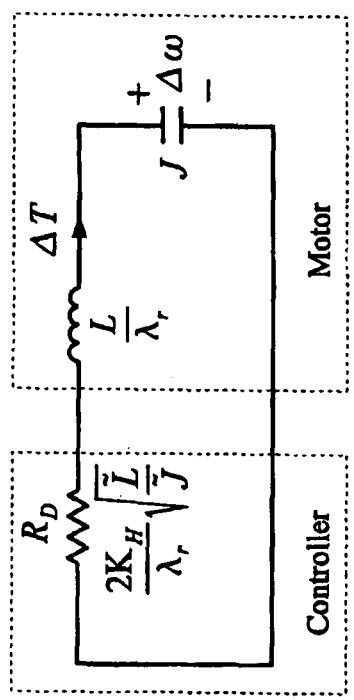
FIG. 17 schematically illustrates a high speed mechanical equivalent circuit for damping.

The resulting load model plus stability control block is shown in FIG. 16. The damping circuit of FIG. 15 with the series equivalent damping resistance added is shown in FIG. 17.

Figure 18:
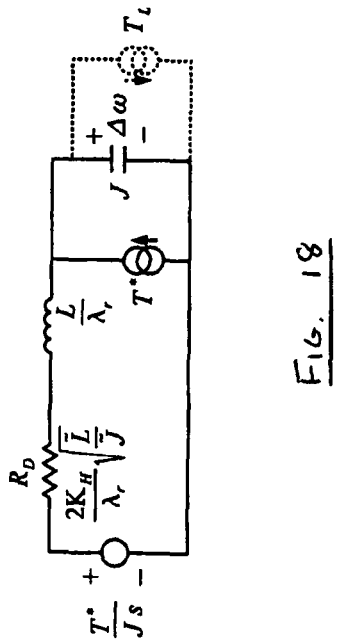
FIG. 18 schematically illustrates an equivalent circuit showing the effect of a command torque and a load disturbance torque.

The effect of the command torque T* can be approximately represented by the circuit of FIG. 18. The torque command current source emulates the effect of the torque feed forward path and the integral of torque voltage source emulates its effect on the rotor speed via the load model. As can be seen, a change in the command torque does not excite the tuned circuit allowing command torque response times much faster than the motor's electrical time constants. Note that this is only true provided the motor parameters used in the controller match the actual motor parameters. Also shown shaded in FIG. 18 is the effect of a load torque disturbance $T_L$.

Stabilisation at Low Speed

At speeds much less than the natural frequency $\omega_n$, the high speed restoring torque disappears and an alternative method must be used to hold the rotor angle θ in alignment with the applied rotor angle θ'.

Fortunately restoring torque can be applied at low speed by applying current in the d axis, turning the motor into a stepping motor. This restoring torque, like the restoring torque created at high speed, creates its own resonance from interacting with the motor inertia which must be damped. This damping problem is well known in the control of stepping motors. Usually mechanical damping is relied upon, but various electromagnetic damping methods have also been proposed.

A novel controller solution to the low speed damping problem is now presented. To analyse the resonances and develop a method of damping, an electrical circuit analogy will again be used. Consider a two-phase, two-pole PMSM with no external load except the load inertia and with a quasi-stationary rotor with the d and q axes aligned with the two windings.

Figure 19:
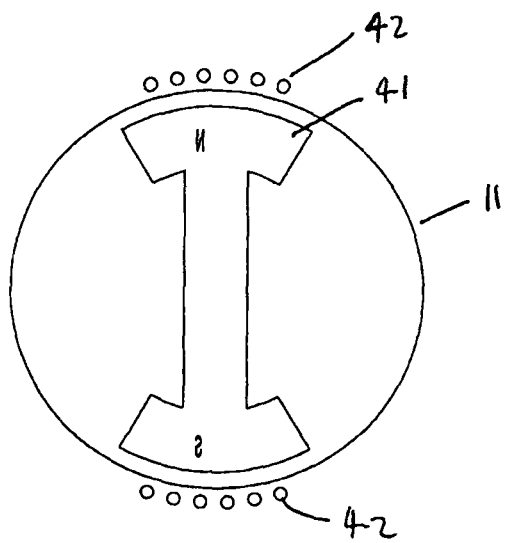
FIG. 19 schematically illustrates a motor with a quasi-stationary rotor showing the q axis coil for analysis of rotor resonance.
Figure 20:
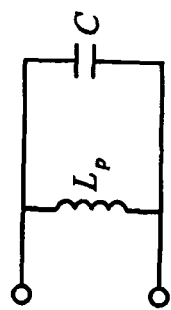
FIG. 20 illustrates a stationary open circuit q axis equivalent circuit with fixed d axis current.

Assume a fixed current in the winding aligned with the d axis locking the rotor to this axis. A simplified diagram of the motor 11 with a quasi-stationary rotor 41 showing the q axis winding 42 is illustrated in FIG. 19. Now consider the equivalent LC circuit for the stationary q axis for an undamped oscillating rotor with the q axis winding open circuit. The equivalent LC tuned circuit is shown in FIG. 20. The parallel inductance is called $L_P$ to distinguish it from the winding inductance L.

To derive the parallel inductance, consider the effect of the restoring torque generated by the fixed d axis current when the q axis winding is open circuit. When the rotor moves off the d axis by an angle δ, the resulting restoring torque is $i^*_d \lambda_r \sin\delta$ or $i^*_d \lambda_r \delta$ to a first approximation. The resulting equation of motion is:

$$J\frac{d^2\delta}{dt^2} = -i^*_d\lambda_r\delta \quad (18)$$

For electrical circuit equivalence, this must match the differential equation for the tuned circuit which is:

$$C\frac{d^2i(t)}{dt^2} = -\frac{1}{L_P}i(t) \quad (19)$$

The tuned circuit component values can be found by matching terminal voltage, energy and resonant frequency. The q axis terminal voltage $\lambda_r d\delta/dt$ is the voltage on the capacitor and the energy stored in the capacitor $0.5 C (\lambda_r d\delta/dt)^2$ is the kinetic energy $0.5 J d\delta/dt$, giving:

$$C = \frac{J}{\lambda_r^2} \quad (20)$$

Matching the inverse square of the resonant frequencies gives $L_P C = J/(i_d \lambda_r)$ giving a value for the inductor of:

$$L_p = \frac{\lambda_r}{i_d} \quad (21)$$

Finally, equating the capacitor voltage $\lambda_r d\delta/dt$ to the inductor voltage $L_p di_p/dt$, where $i_p$ is the inductor current, then integrating and assuming zero initial conditions, the rotor deviation angle is found to be:

$$\delta = \frac{i_p}{i_d} \quad (22)$$

The value for C of $J/\lambda_r^2$ is, not unexpectedly, the same as the capacitance in the high speed equivalent circuit of FIG. 15 with the variables changed from torque to current (using $i=\lambda_r/\Delta T$) and from rotational speed to voltage (using $v=\lambda_r\Delta\omega$).

Figure 21:
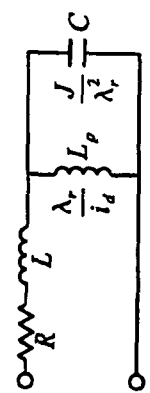
FIG. 21 illustrates a complete q axis equivalent circuit of the motor at low speed.

To complete the q axis equivalent circuit for quasi-stationary rotor oscillations, the winding inductance and resistance can be added as shown in FIG. 21. This circuit model was derived for a stationary motor with no load but it also holds approximately for low speed operation with a fixed torque load.

It can be seen from this LC equivalent circuit that to provide damping at low speeds, the inverter can provide a resistive output impedance in the q axis but the level of damping will be limited if a high d axis current results in the equivalent inductance $L_P$ being comparable with the motor winding inductance.

The d axis command current must be set at least high enough so that the pull-out torque $\lambda_r i_d$ is higher than the maximum expected error between the actual and the load modelled torque. It may need to be set higher than this minimum value to reduce the maximum rotor angle error (for, example, better position control) or to reduce the settling time of the rotor on start up. If the d axis current is set too high, inductance $L_P$ could be too low compared to the winding inductance to allow adequate low speed damping as can be seen in the equivalent circuit. As will be shown later in this document, it is possible to improve damping in this situation by adding negative inductance to the inverter generated output impedance.

The added inverter generated resistance must be chosen so that this resistance plus the winding resistance provides adequate damping for both the series LC tuned circuit and the parallel $L_P C$ tuned circuit. For fastest rotor settling time at start up and after torque disturbances, the total series resistance $R_T$ should be set for approximately critical damping of the parallel tuned circuit, i.e. $R_T = 0.5\sqrt{L_P/C}$. For maximum robustness to torque disturbances, it should be set for approximately critical damping of the series tuned circuit, i.e. $R_T = 2\sqrt{L/C}$. Usually a compromise between these settings is made.

If the controller high speed damping shown in FIG. 16 and equation (17) is left in place at low speeds, a change in applied speed $\Delta\omega'$ from a change in $\Delta i_q$ automatically produces a corresponding change in the q axis terminal voltage of $\lambda_r \Delta\omega'$. From equation (16), the resulting inverter impedance $\lambda_r \Delta\omega / \Delta i_q$ is given by:

$$\frac{\lambda_r \Delta\omega'}{\Delta i_q} = 2 K_H R_n \tag{23}$$

where $R_n$ is the natural impedance of the motor and is equal to $\lambda_r \sqrt{L/J}$.

Not surprisingly, this provides the correct resistance for damping the LC tuned circuit if the winding resistance is ignored. Often, this resistance plus the winding resistance is enough to provide adequate damping of the $L_P C$ tuned circuit but sometimes an extra inverter generated resistance is needed.

If an extra inverter resistance $R_I$ on top of the inverter generated resistance from the high speed damping is added, the total effective winding resistance will be:

$$R_T = 2 K_H R_n + R + R_I \tag{24}$$

Figure 22:
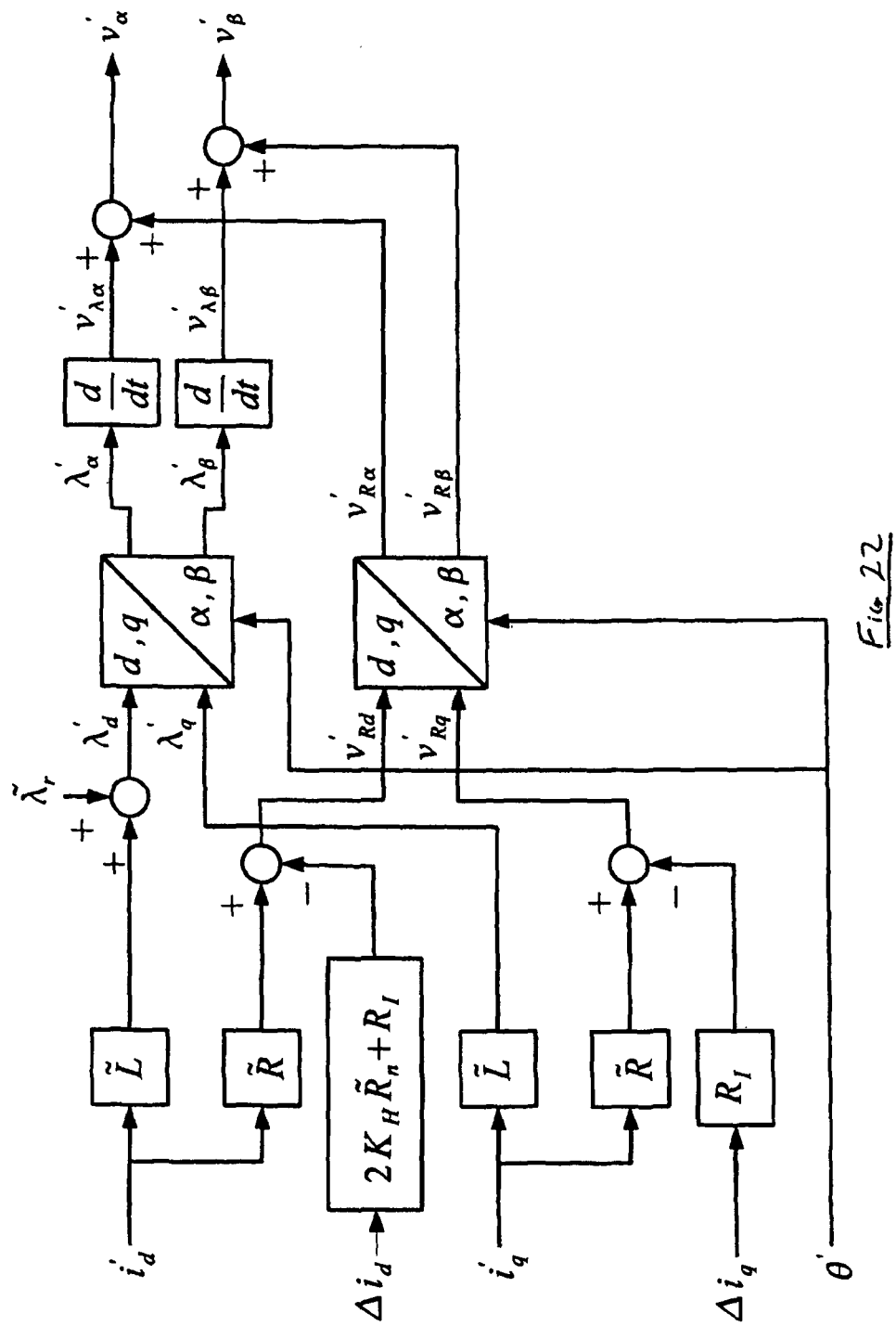
FIG. 22 schematically illustrates a feed forward block with added rotor damping resistance.

The extra electronically generated resistance is best added by modifying the feed forward block in FIG. 5 to that shown in FIG. 22. To balance the output impedance in both the d and q axis, an extra electronic resistance of $2 K_H \tilde{R}_n + R_I$ has also been added to the d axis. This ensures the rotor damping remains the same even for large deviations between the rotor and applied rotor angles which may occur at start-up.

If the winding resistance is very large, it may be necessary to make $R_I$ negative in order to provide the required low speed damping. Also, if inductance L is too large to find a compromise effective damping resistance for both the LC and $L_P C$ tuned circuits, it may be necessary to modify the inverter output impedance to include a negative inductance. Adding electronically generated negative impedances to the inverter output must be implemented carefully. It usually requires higher current bandwidth and accurate compensation of PWM dead time. The topic is dealt with more fully later in this document.

It is of interest to note that as the applied frequency drops below the natural frequency the effect on damping of modulating the applied frequency rapidly diminishes. At zero Hz, with the applied voltage zero, it has no effect at all. Equally, as the applied frequency is raised above the natural frequency, the effect on damping of modulating the applied voltage also rapidly diminishes due to the diminishing ratio of the modulating voltage to the back-EMF. The two damping methods complement each other to provide the same level of damping throughout the speed range.

Torque Disturbance Correction

So far, the controller is designed to respond very quickly to changes in the command torque, but there is no provision for it to respond properly to a load torque disturbance. A load torque disturbance not incorporated into the load model will result in a corresponding rotor angle error. There will be a slight correction from the feedback of $\Delta i_q$ used for stability, control but this would be minor.

What is required is that for a fixed command torque, when the load torque is changed the applied acceleration is changed until the inertia generated torque balances the change in load torque to make the electrical torque equal to the command torque. The required change in acceleration is given by the following equation:

$$J \Delta \frac{d\omega'}{dt} = -\Delta T_L \tag{25}$$

At high rotor speeds, errors between the command torque and the electrical torque produce a q axis current error as follows:

$$\Delta T = \lambda_r \Delta i_q \tag{26}$$

The load model can be adjusted to add partial correction for a torque disturbance by adding integral feedback of the q axis current error to the applied frequency, extending the load model and stability control equation (17) to:

$$\omega' = \frac{1}{Js}(T^* - K_1 \tilde{\lambda}_r \Delta i_q) - 2 K_H \sqrt{\frac{L}{J}} \Delta i_q \tag{27}$$

where $K_1$ is the 1st order load compensation gain constant.

Figure 23:
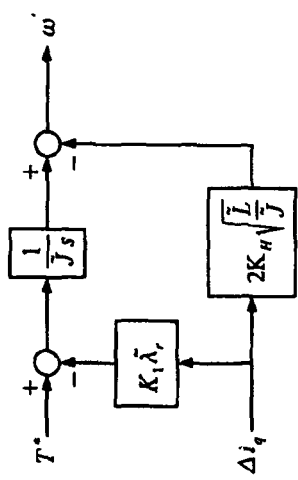
FIG. 23 schematically illustrates a load model and stability control incorporating 1st order load torque correction.

The corresponding block diagram of the load model and stability control block is shown in FIG. 23.

Figure 24:
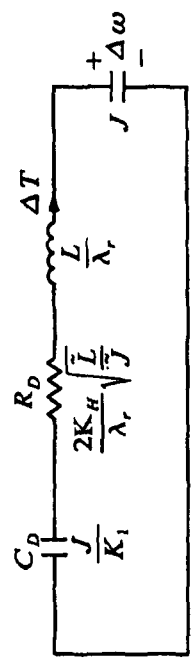
FIG. 24 schematically illustrates a quasi-steady-state mechanical equivalent damping circuit at high speed with 1st order load correction.
Figure 25:
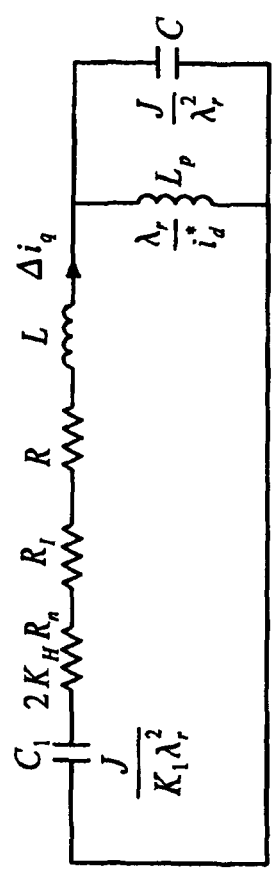
FIG. 25 schematically illustrates a quasi-steady-state q axis equivalent damping circuit at low speed with 1st order load correction.

At high rotor speeds, the effect of this modification when considering the quasi steady state mechanical equivalent damping circuit of FIG. 17 is to add a series capacitance as shown in FIG. 24 and at low speed, the effect on the q axes equivalent circuit is shown in FIG. 25.

The maximum value that can be set for $K_1$ is limited by its effect on rotor damping. Its value can be chosen by incorporating its effect in the low speed damping equivalent circuit of FIG. 21. The resulting equivalent circuit is shown in FIG. 25. In this circuit, the new $1^{st}$ order term appears as a series capacitance $C_1$ of value $1/K_1$ times the inertia capacitance C.

This circuit is fourth order making the choice of component values difficult. If motor inductance L is ignored, the circuit shows that to be able to choose a value of $R_T = 2 K_H R_n +$ R+R₁ to give approximately critical damping for both the $CL_P$ tuned circuit and the $C_1L_P$ tuned circuits $R_T$ must satisfy the equations:

$$R_T = 0.5\sqrt{\frac{L_P}{C}} \quad (28)$$

and:

$$R_T = 2\sqrt{\frac{L_P}{C_1}} \quad (29)$$

This requires $C_1$ to be at least 16 times the value of C. Such a system would be very slow to respond to load torque transients, so usually a choice of $C_1$ much close to the value of C is better, with $R_T$ chosen as:

$$R_T = \sqrt{\frac{L_P}{\sqrt{C_1C}}} \quad (30)$$

If L is not much smaller than $L_P$, then $R_T$ may need further adjustment to provide adequate damping of the $LC_1C$ tuned circuit. Usually adjustment by simulation of the low speed damping circuit of FIG. 25 is required.

A side benefit of adding the above integral feedback control of the q axis current at low speeds is that errors in the feedback loop are compensated for. In particular, at very low speeds and at standstill, errors in the PWM process such as dead band voltage errors do not result in q axis current errors.

To add robustness to the controller against errors in the motor parameter settings and against torque disturbances at low speed which cannot be compensated for, it is advisable to introduce a matching integral controller in the d axis. This can be implemented as the dotted integral controller shown in FIG. 3. The required integral controller has the following s domain transfer function:

$$i'_d = i^*_d - \Delta i_d \frac{K_1 \omega_n}{s} \quad (31)$$

Figure 26:
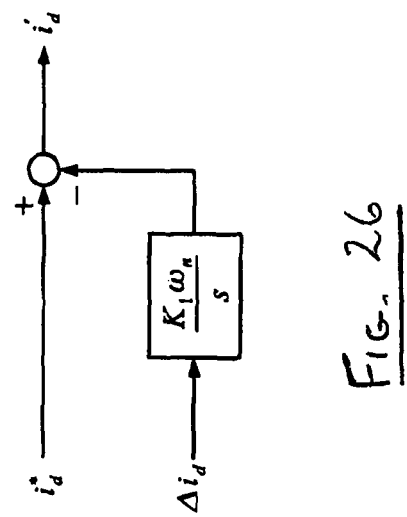
FIG. 26 schematically illustrates a d axis integral current compensator.

This is implemented as shown in FIG. 26. As in the q axis integral feedback controller, this controller stabilises the output d axis current against errors. This is particularly important since even slight variations in the estimated rotor flux could otherwise cause large errors in the d axis current.

The first order torque disturbance compensation described above and shown in FIG. 23 cannot properly correct for a step torque disturbance. Such a disturbance requires the motor to be accelerated at a constant rate after the change in load torque, resulting in a fixed torque offset error for a first order compensation system. This can be corrected by adding a second order term to the transfer function of equation (27). The new transfer function is then:

$$\omega' = \frac{1}{Js}\left(T^* - K_1\tilde{\lambda}_r\left(1 + K_2\frac{\omega_n}{s}\right)\Delta i_q\right) - 2K_H\sqrt{\frac{L}{J}}\Delta i_q \quad (32)$$

Figure 27:
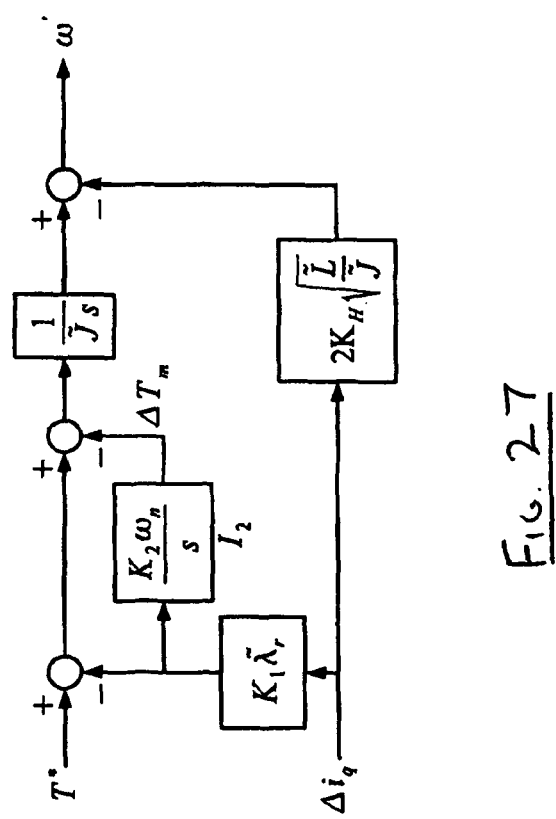
FIG. 27 schematically illustrates a load model and stability control incorporating $2^{nd}$ order load torque Correction.

This can be implemented as shown in FIG. 27. The load torque correction $\Delta T_m$ which appears at the output of the second order integrator block is, at higher speeds, the error between the torque predicted by the load model and the actual torque. It is possible to use this value to adaptively correct the load model to improve dynamic performance. An example of using it to adaptively correct the load inertia is described later in this document.

For the first order torque disturbance correction term, a matching compensator was added to the d axis current controller. A matching second order term is not needed though for the d axis controller and would be difficult to implement.

The second order term is difficult to incorporate into the high speed quasi steady state equivalent circuit damping model of FIG. 24 but at the circuit's resonance it injects a frequency modulation 180 degrees out of phase with the torque modulation, so its effect on damping can be compensated by slightly increasing the equivalent series damping resistance by increasing $K_H$. The same increase in $K_H$ should also correct for the effects of the second order term on low speed damping.

This second order load disturbance feedback correction system creates an interesting dilemma at zero speed. Without a back EMF present, any load torque offset at low speed will not cause a change in the motor current. As a result, it is possible at zero speed for the system to be stable for any value of T* with $i_q$ adjusted to match it but with an unmatched true motor torque. The rotor true d axis will just align at a 90 degrees shift to the total current vector angle less a torque balance shift, with the true torque being unmeasurable. In the load model block, the system will be stable with $\Delta i_q=0$ and $\Delta T_m$ equal to command torque T*. The output of the second order block is effectively what the control system thinks the load torque is.

Figure 28:
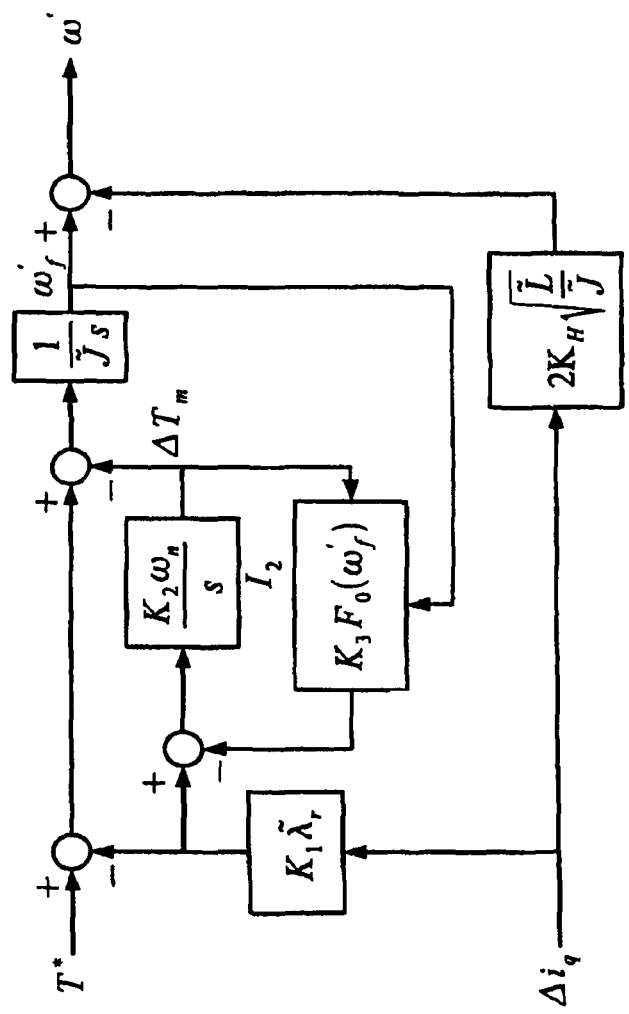
FIG. 28 schematically illustrates a load model and stability control with a variable limit on the 2nd order DC gain.

To prevent this problem of multiple stable states at zero speed, a pole can be added to the integrator block $I_2$ limiting its DC gain to force it to settle to zero output at zero speed. The pole is needed at zero speed but is not needed at high speed, so the DC gain should be adjusted by a frequency dependent function to limit its effect at high speed. The simplest way to implement this is with a variable gain feedback path around the integrator as shown in FIG. 28. With the pole added, the transfer function for the load model and stability control block, equation (32), now becomes:

$$\omega' = \frac{1}{Js}\left(T^* - K_1\tilde{\lambda}_r\left(1 + \frac{K_2\omega_n}{s + K_2\omega_n K_3 F_0(\omega')}\right)\Delta i_q\right) - 2K_H\sqrt{\frac{L}{J}}\Delta i_q \quad (33)$$

The DC gain of integrator $I_2$ at zero speed is now $1/(K_3F_0(\omega'_f))$ and thus is determined by the fixed gain constant $K_3$ and the gain function $F_0(\omega)$. A suitable formula for the function $F_0(\omega)$ is:

$$F_0(\omega) = \frac{\omega_n}{|\omega| + \omega_n} \quad (34)$$

This function gives a gradual increase in the DC gain with frequency with the gain doubled at the natural resonant frequency. Other functions may be better depending on the application. In the arrangement shown in FIG. 28 a filtered version $\omega'_f$ of the rotor applied frequency $\omega'$ obtained before the stabilising term is added is used for the function's independent variable but $\omega'$ could also be used.

The setting of the DC gain constant $K_3$ depends on the application. If the load torque is expected to stay fixed as the motor goes through zero speed then $K_3$ can be set to a very low value (<<1). The control system will then retain the correct value of i'$_q$ as the motor goes through zero speed. A practical example where this control setting would be advantageous is a direct drive washer motor which, during the wash cycle, reverses through zero speed with a constant load torque. The constant may, though, need to be set close to one when power is first applied to allow the rotor to self synchronise to a known state. If the load torque quickly changes to zero at zero speed, such as with a friction load, and the motor speed is expected to rapidly go through zero, $K_3$ should be set to 1 or even more. The setting for $K_3$ thus depends on the nature of the load and the speed of transition through zero speed. Another consideration is that the output of the second order integrator will drift if the controller motor parameter estimates do not match the actual motor parameters. The expected parameter errors put a lower limit on the value of $K_3$.

In any case, if the load torque versus frequency profile of the load is fixed and known, it should be added to the inertial load model of equation (7) to reduce dependence on the torque disturbance feedback compensation system. Note that if the load torque cannot be correctly compensated for, the value of the d axis current will need to be increased to ensure the rotor stays synchronised.

Direct Axis Current Setting

The final parameter setting that needs to be addressed for the controller design is the d axis current setting. At zero speed this should be set at least high enough so that the peak torque error between the load model prediction and the actual torque will not cause a loss of synchronism. For a given d axis current setting, the peak pull-out torque is given by:

$$T_{pull-out} = \lambda_r i^*_d \quad (35)$$

The value chosen for current setting i*$_d$ at zero speed will probably be higher than this to provide a margin for error and possibly also to limit the initial torque angle error to provide a faster dynamic response at start-up. As speed is increased and the restoring torque produced by the back-EMF grows, the value of i*$_d$ can be reduced to reduce IR heating losses by multiplying it by a speed dependent function $F_D(\omega)$. The value of i*$_d$ will be given by:

$$i^*_d = i^*_{d0} F_D(\omega) \quad (36)$$

where i*$_{d0}$ is the value of i*$_d$ at zero speed. A suitable formula for $F_D(\omega)$ is:

$$F_D(\omega) = \frac{\omega_n}{|\omega| + \omega_n}. \quad (37)$$

This is the same as the $F_0(\omega)$ function of equation (34). It will halve the value of i*$_d$ at the speed equal to the natural resonant frequency. Other formulae could be used depending on the application.

At very high speeds, it may be necessary to introduce some field weakening to reduce the peak motor voltage. This can be done by setting i*$_d$ to a suitable negative value.

For washing machine direct drive motors and other cost sensitive applications it may be necessary to set i*$_d$ to a high positive value during times when the motor is regenerating. This will cause extra power to be dumped into the motor's winding resistance preventing a net power flow into the inverter's DC bus, saving the cost of installing a DC bus energy dump circuit. A negative feedback controller could be added to regulate i*$_d$ according to the DC bus over voltage.

PWM Dead-Time Correction

If at least first order compensation is used for the torque and d axis current as shown in FIGS. 23 and 26, the average d and q axes currents will be well controlled and not influenced by PWM inverter errors, the largest of which is due to the effect of the PWM dead-time normally inserted to prevent top and bottom transistors in each inverter leg from conducting simultaneously. The compensation, though, has a very slow response time and without PWM error correction severe deterioration in dynamic performance could occur. If negative resistance or negative inductance is added to the inverter output impedance to improve dynamic performance, minimising PWM inverter errors is even more important.

To obtain very accurate dead-time correction, the best method is to modify the pulse widths from direct measurement of the inverter voltage output PWM transition times. This method, though, requires extra hardware and may not be suitable for a low cost drive. An alternative but less accurate method is to just add a positive or negative offset to the pulse widths depending on the measured current polarity to the PWM modulation input for each phase to correct the distortion produced by the inserted dead-times. This method can be implemented in software making it simple to implement. One problem with this method is that when the output current drops below the amplitude of the PWM ripple current this method over compensates for the required dead time correction causing instability. A simple modification to minimise this effect is to stop the d axis current dropping below a minimum level sufficient to provide a bias current to limit this instability to an acceptable level.

Parameter Setting and Adaptive Parameter Adjustment

The feed forward torque controller relies on accurate estimates of the motor parameters for good dynamic performance. The parameter values can be obtained from the motor manufacturer's specifications or from off-line measurements, the method used for the experiments described herein, but they can also be obtained from on-line measurements and even adjusted adaptively while the motor is running.

Initial values of motor inductance and resistance can be measured off line by applying test voltages to the motor windings and measuring the currents. For the motor inductance, it is best to average the readings over different rotor positions to account for any rotor saliencies. These tests can also be done on line by using the PWM inverter to generate the test voltages.

Initial value for the peak rotor flux linkage can be found by measuring the motor open circuit winding voltage and frequency while the motor is spinning.

Initial measurement of the rotor inertia can be difficult particularly as the load inertia must also be included. A novel off-line method that can be used for a three-phase motor is to apply a constant current between two phases, start a transient oscillation of the rotor and measure the frequency of this oscillation by measuring the back-EMF waveform on the unconnected phase. The electrical 2-pole equivalent inertia can then be calculated using the following equation derived from the equation of motion (18):

$$J = \frac{I \lambda_l}{\omega_{osc}^2} \quad (38)$$

where $\omega_{osc}$ is the frequency of oscillation in radians per second, I is the line to line applied current and $\lambda_l = \sqrt{2} \lambda_r$ is the line to line peak flux linkage. The applied current must be large enough to produce enough restoring torque to minimise the effect of cogging torque and to overcome any mechanical damping. It is also important that the electrical angle deviation is small enough to ensure small signal conditions apply ($\Delta\theta \approx \sin \Delta\theta$).

Parameter adjustment while the motor is running is easy to implement with a feed forward torque control system. When the motor is stationary, the difference between the command d axis current and the measured d axis current can be used to calculate and correct the error in the estimated resistance. If the d axis compensator of FIG. 26 is used, the measured value of the motor resistance is given by:

$$R = \frac{i'_d}{i^*_d}\tilde{R} \qquad (39)$$

Parameter adjustment for the motor inductance can be made by comparing the values of current $i'_d$ for two different settings of the command current $i^*_d$ at high speed. From equation (4), the q axis component of voltage at high speed ($\omega L \gg R$) and at steady state is given by:

$$v_q = \omega L i_d + \omega \lambda_r \qquad (40)$$

If the d axis compensator of FIG. 26 is used, the d axis current error is held at zero and the following relationship, derived from equation (40), holds:

$$\tilde{L}i'_d + \tilde{\lambda}_r = Li^*_d + \lambda_r \qquad (41)$$

Using two sets of readings at different current settings, the motor inductance can be calculated as follows:

$$L = \tilde{L}\frac{(i'_{d2} - i'_{d1})}{(i^*_{d2} - i^*_{d1})} \qquad (42)$$

where the 1 and 2 subscripts indicate the first and second measurement sets. Parameter adjustment for the peak rotor flux linkage can be implemented using equation (41) assuming the estimated inductance is the same as the true inductance. The true flux linkage will then be given by:

$$\lambda_r = \tilde{\lambda}_r - \tilde{L}(i^*_d - i'_d) \qquad (43)$$

The difference in the torque error between two different rates of acceleration can be used to calculate and correct the error in the estimated inertia, assuming the load torque remains unchanged. If the torque disturbance compensator of FIG. 27 is used, and the filtered version of the torque error measurement $\Delta T_m$ is used to smooth out torque ripples, then the true inertia would be given by:

$$J = \tilde{J}\left(\frac{(T^*_2 - T^*_1)}{(T^*_2 - T^*_1) - (\Delta T_{m2} - \Delta T_{m1})}\right) \qquad (44)$$

where the 1 and 2 subscripts indicate the first and second measurement sets.

Motor Impedance Compensation

Motors with very low efficiency driving a high inertia load often have a winding resistance which is too high to obtain adequate damping at low speed. Also, motors having thin magnets and small air gaps to reduce cost may have inductances which are also too large to obtain adequate low speed damping. Some motors, such as direct drive washer motors, may have high resistance, high inductance and very high inertia loads. It can be very difficult to provide adequate damping for such motors.

Figure 29:
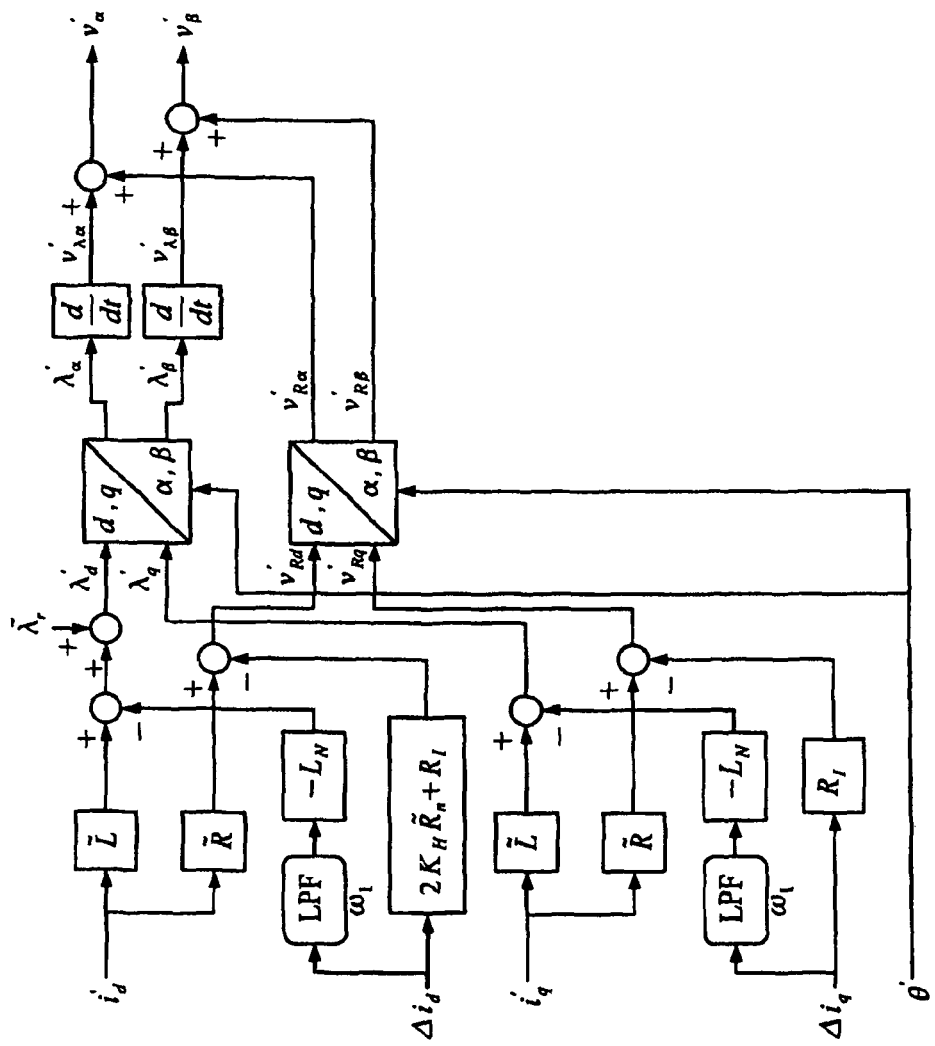
FIG. 29 schematically illustrates a feed forward block with negative inductance added.

One way to provide adequate damping for such motors is to electronically create negative resistance and/or negative inductance on the inverter output. Negative resistance is easily added by just making the added inverter resistance $R_I$ in the feed forward block shown in FIG. 22 negative. Care must be taken to ensure the total motor plus inverter resistance never becomes negative else instability will result. Negative inductance can be added by modifying the feed forward block to that of FIG. 29 where $L_N$ is the value of negative inductance added. Whereas the addition of the negative resistance is always stable provided the total resistance is positive, due to the low pass filter introduced by the motor's L/R time constant, the negative inductance loop must be stabilised by the addition of a single pole low pass filter. A possible placement of such filter with frequency roll off of $\omega_1$ radians/sec is shown in FIG. 29. It could also be placed earlier in the $i_d$ current measurement path since the roll off frequency is in most cases too high to affect the normal operation of the feed forward torque controller.

Figure 30:
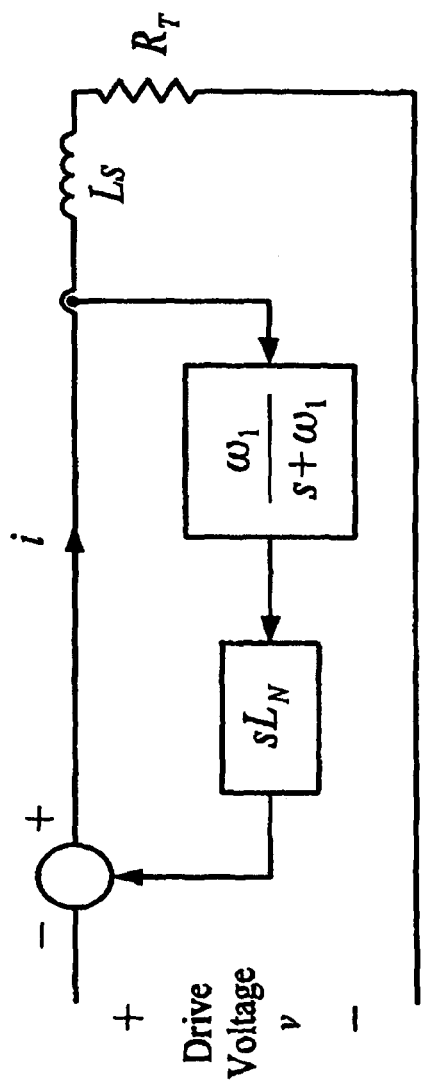
FIG. 30 schematically illustrates a circuit of the negative inductance control loop.

The simplified circuit of the negative inductance loop with Laplace transformed values, suitable for calculating parameters, is shown in FIG. 30. Resistance $R_T$ is the total resistance of the motor and inverter, including any added negative resistance.

By using Kirchhoff's voltage law, the following loop equation is obtained:

$$v(s) = i(s)\left(R_T + Ls - \frac{L_N s \omega_1}{s + \omega_1}\right) \qquad (45)$$

Rearranging and defining constant $K_0$ as:

$$K_0^2 = (R_T/L)/\omega_1 \qquad (46)$$

the voltage to current transfer function is obtained:

$$\frac{i(s)}{v(s)} = \frac{1}{L}\left(\frac{s + \omega_1}{s^2 + s\omega_1\left(\frac{L - L_N}{L} + K_0^2\right) + K_0^2 \omega_1^2}\right) \qquad (47)$$

The characteristic equation for this system is:

$$s^2 + s\omega_1\left(\frac{L - L_N}{L} + K_0^2\right) + K_0^2 \omega_1^2 = 0 \qquad (48)$$

By comparing this with the universal characteristic equation for a second order system with damping factor $\zeta$ and natural resonant frequency $\omega_0$:

$$s^2 + s2\zeta\omega_0 + \omega_0^2 = 0 \qquad (49)$$

the following formulae for damping and resonant frequency are obtained:

$$\omega_0 = K_0 \omega_1 \qquad (50)$$

$$\zeta = \frac{1}{2K_1}\left(\frac{L - L_N}{L} + K_0^2\right) \qquad (51)$$

Rearranging equation (51) and completing the squares:

$$\frac{L - L_N}{L} = \zeta^2 - (K_0 - \zeta)^2 \qquad (52)$$

Taking the negative square root solution (since $K_0 < \zeta$):

$$K_0 = \zeta - \sqrt{\zeta^2 - 1 + \frac{L_N}{L}} \qquad (53)$$

The controller should be designed for a damping factor of at least 1. From equations (46) and (53), this limits the filter cut-off frequency to:

$$\omega_1 \geq \frac{R_T}{L\left(1 - \sqrt{\frac{L_N}{L}}\right)^2}. \quad (54)$$

Alternatively, for a given filter cut-off frequency, the maximum negative inductance is limited to:

$$L_N \leq L\left(1 - \sqrt{\frac{R_T}{L\omega_1}}\right) \quad (55)$$

The maximum value of frequency $\omega_1$ and thus the maximum negative inductance that can be inserted is limited by the maximum DSP sampling rate. Ideally, the cut-off frequency in Hertz should be kept to less than one tenth the sample rate to avoid interference from sampling effects.

Sampling Delay Compensation

Figure 31:
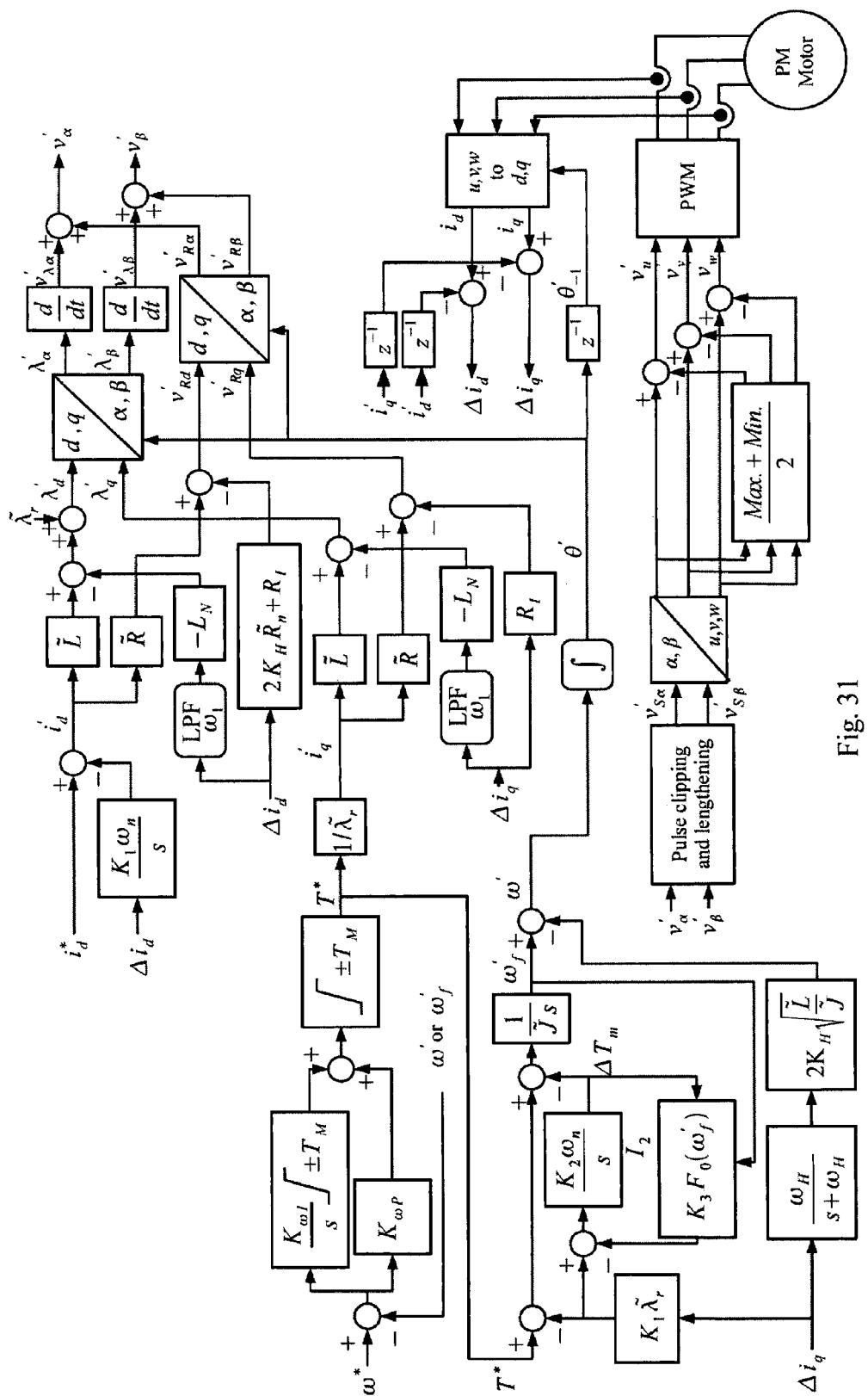
FIG. 31 schematically illustrates a complete system with speed regulator.

The PWM unit between the controller and the motor usually introduces a sampling delay of one or two samples between the controller and the output to the motor. This must be compensated for in order to obtain accurate current error signals. A complete block diagram of the motor and controller with a speed control loop, showing the inserted compensating delays, is shown in FIG. 31. Compensating delays are inserted in the applied current signals and in the phase of the rotating reference frame. Without compensation, especially for delays, the current error signals would be in error for motor frequencies approaching the sampling frequency, possibly causing instability.

Speed Loop Implementation

Figure 32:
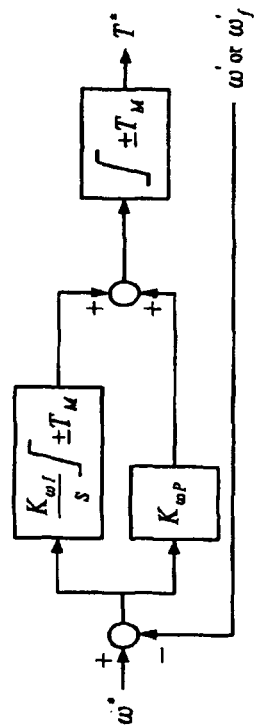
FIG. 32 schematically illustrates a speed loop implementation.

With an estimate of the rotor speed readily available from the feed forward torque controller, a standard proportional integral speed feedback loop is readily implemented. A suitable feedback loop is shown in block diagram form in FIG. 32. As shown, a torque limit of $\pm T_M$ is added to the output. The same limit is also applied to the integrator to prevent integrator wind-up. This works by ignoring any integrator input which would cause the integrator output to exceed the limit. This is the simplest method of preventing integrator wind-up. Other higher performance but more complex methods are available. On a DSP platform, the PI controller would be implemented as a sampled digital filter. In such an implementation, it would be best to implement the proportional and integral parts separately to allow separate limiting of the integrator output.

The proportional and integral gains, $K_{\omega P}$ and $K_{\omega I}$ can be expressed using normalised parameters as follows:

$$K_{\omega I} = K_{\omega f}^2 \tilde{J} \omega_n^2 \quad (56)$$

$$K_{\omega P} = 2K_{\omega d} K_{\omega f} \tilde{J} \omega_n \quad (57)$$

where $K_{\omega f}$ is the natural frequency of the second order system created by the PI speed loop as a proportion of the motor natural frequency $\omega_n$ and $K_{\omega d}$ is its damping factor. Using the damping factor and the normalised natural frequency instead of the proportional and integral gains to specify the speed PI controller has the advantage of directly specifying the speed loop's response characteristic. Normalising these parameters to the motor's natural frequency results in the speed loop's stability margins being independent of the motor and load characteristics.

Figure 33:
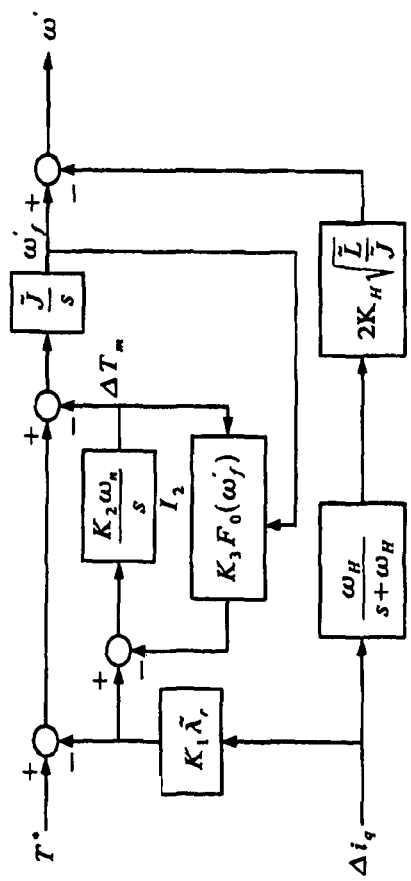
FIG. 33 schematically illustrates a load model plus stability control block with a filter in the stabilisation path for improved speed feedback stability.

For the speed feedback, either the direct feed forward applied frequency $\omega'$ or the filtered version $\omega'_f$ as shown in FIG. 28 can be used. The filtered version gives better stability margins but can cause a speed offset at low speed if there is an uncompensated torque error. It allows the speed feedback bandwidth to be set very high for very good torque disturbance rejection at high speed. If the direct version $\omega'$ is used, the feedback gain, particularly the proportional gain, can affect stability limiting feedback bandwidth. Also, if frequency $\omega'$ is used, an algebraic loop is introduced (no integral or delay terms in the path) via the speed feedback loop proportional path and the motor stabilisation path which will cause an error in a simulation. The algebraic loop can be prevented without affecting performance by inserting a low pass filter in series with the stability control term in FIG. 28. This filter is also recommended to prevent stability concerns caused by sampling. The cut-off frequency should be set high enough to not affect motor damping. Any value more than five times frequency $\omega_n$ but less than one tenth the sampling frequency would be reasonable. The load model plus stability control block of FIG. 28 with this filter added with a roll off frequency of $\omega_H$ is shown in FIG. 33. It is probably wise to put this filter in place for any practical implementation of the feed forward torque controller with speed feedback.

To analyse stability of the control system when the speed feedback uses the direct applied frequency $\omega'$, refer to the complete diagram of the control system with the speed control loop shown in FIG. 31. There are two loops to be considered for stability analysis of the speed control system, one with negative feedback and one with positive feedback. The negative feedback loop is the direct loop formed by the speed proportional controller $K_{\omega P}$, current signals $i'_q$ and $\Delta i_q$, the high speed damping compensator and the speed feedback signal $\omega'$. The path of the positive feedback loop continues from current signal $i'_q$ through the torque feed forward block and the motor to motor current $i_q$ then to current signal $\Delta i_q$. The gain of the negative loop is given by:

$$G_{neg} = K_{\omega P} \cdot \frac{1}{\lambda_r} \cdot 2K_H \sqrt{\frac{\tilde{L}}{\tilde{J}}} \quad (58)$$

$$G_{neg} = 4K_H K_{\omega d} K_{\omega f}$$

which is also the gain of the positive loop if the motor parameter estimates are accurate. Ignoring sampling delays, if the estimated inductance used for the feed forward block match the actual motor inductance, the two loops cancel and no stability problems occur no matter how high the gain is set for the speed PI compensator. If the motor inductance is not correct, then it is important that the variation in inductance does not result in the overall gain at high frequencies $G_{neg}(L/\tilde{L}-1)$ becoming greater than +1.

Because the torque control is instantaneous and the speed feedback signal is derived from an internal load model, the speed feed-back gain can be set to very high levels, much higher than for other sensorless control systems and even higher than for sensored control systems. There is no point, though, in setting the gain so high that the resulting changes in the applied speed $\omega'$ are much faster than the actual motor speed changes. An upper limit on the setting of constant $K_{\omega f}$ of about 2 would be reasonable. If speed signal $\omega'$ is used instead of $\omega'_f$, speed feedback gain affects stability, particularly for large parameter errors, limiting the value of $K_{\omega f}$. Maximum usable values are best found by simulation and experiment.

A compromise arrangement could be achieved by connecting the speed feedback signal to the signal $\omega'_f$ via a high pass filter and to the signal $\omega'$ via a complementary low pass filter.

Adding the speed loop to stabilise the speed using feed forward torque control also has the effect of stabilising the output current at low and zero speed against errors in the PWM inverter output voltage and variations in the motor resistance, Any error in the q axis motor current results in a change in the applied torque via the torque disturbance corrector in the load model and stability control block shown in FIG. 28. This change is passed through to the applied speed via the inertia model integrator then to the torque command input via the speed feedback loop, resulting in the q axis current error being corrected. The result is that for low and zero speed steady state operation, the motor current is immune to inverter PWM and motor resistance errors, although these errors still affect dynamic performance.

Position Loop Implementation

Figure 34:
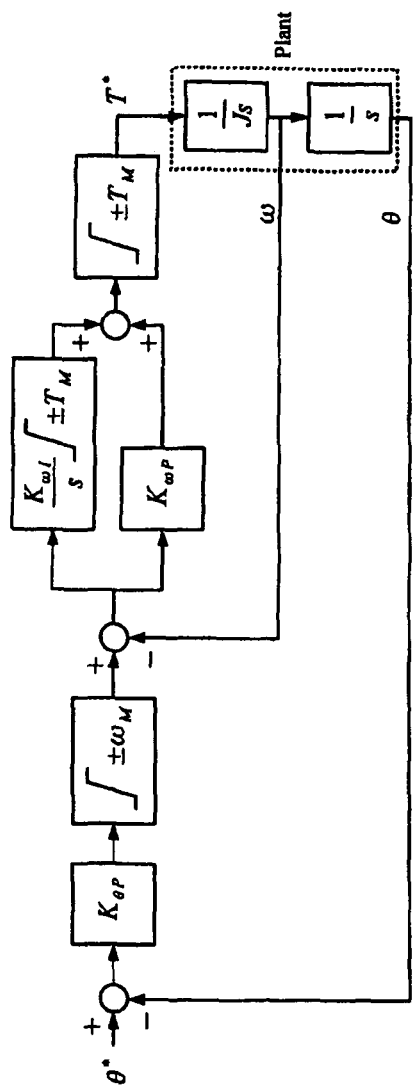
FIG. 34 schematically illustrates a conventional position loop structure.
Figure 35:
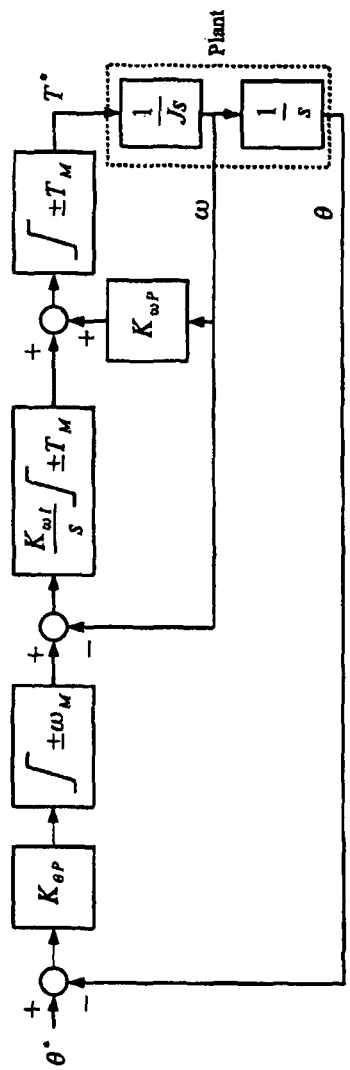
FIG. 35 schematically illustrates a PDF position loop structure.

For position control, an extra position feedback loop can be added around the speed feedback loop. Usually, position control is added by adding a proportional position loop around the above, speed control loop. Such a control structure together with the transfer functions of the torque controlled motor drive assuming an inertial load is shown in FIG. 34. A slightly different structure which is commercially popular is the PDF (Pseudo-Derivative Feedback) control structure, also known as the PIV control structure (Proportional position loop, Integral and proportional Velocity loop), shown in FIG. 35.

These control structures are third order systems which causes several problems in use. First, under severe position step inputs where the torque limit is heavily saturated, the system goes unstable. Also, tuning is difficult with three control parameters to be chosen.

Figure 36:
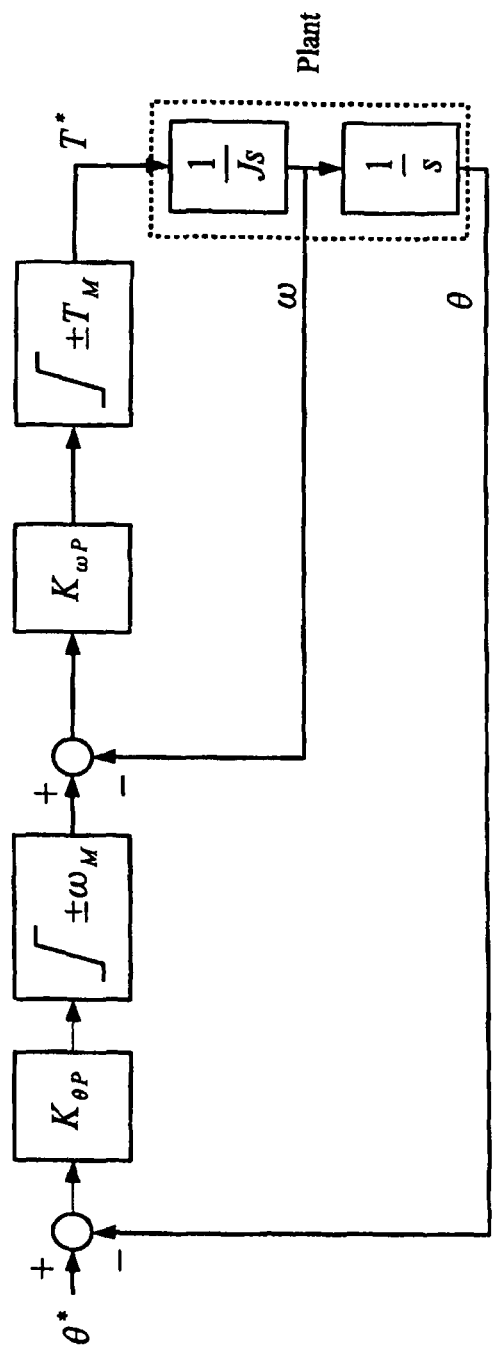
FIG. 36 schematically illustrates a dual proportional position loop structure.

For a sensorless position control system using feed forward torque control, the much simpler and more robust dual proportional position control structure shown in FIG. 36 can be used. This is a second order system which is always stable under large step inputs. It is also much easier to tune with the two control parameters dictating the second order response curve. This structure is not normally used because a load torque offset at zero speed causes a steady state position error. This is not a problem when using feed forward torque control because any load torque offset is not detected at zero speed.

The transfer function for the dual proportional position controller as shown in FIG. 36 is given by:

$$\frac{\theta(s)}{\theta^*(s)} = \frac{\frac{K_{\theta P} K_{\omega P}}{J}}{s^2 + s\frac{K_{\omega P}}{J} + \frac{K_{\theta P} K_{\omega P}}{J}} \quad (59)$$

The characteristic equation for this system is:

$$s^2 + s\frac{K_{\omega P}}{J} + \frac{K_{\theta P} K_{\omega P}}{J} = 0. \quad (60)$$

Comparing this with the characteristic equation for a second order system (49), for a system natural frequency of $\omega_0$ and a damping factor $\zeta$, the two proportional gain settings are:

$$K_{\theta P} = \frac{\omega_0}{2\zeta} \quad (61)$$

$$K_{\omega P} = 2\zeta\omega_0 J \quad (62)$$

Suitable per unit parameter constants for natural frequency and damping are $K_{pf} = \omega_0/\omega_n$ and $K_{pd} = \zeta$.

Simulation

Simulations of feed forward torque control are presented for two different motors: a 1 kW servomotor and a 500 W direct drive washing machine motor. The simulation for the direct drive washing machine motor is included because with its very high stator resistance combined with a very high and variable load inertia it is likely to be the most difficult motor to control without sensors.

The simulations are carried out using Matlab and Simulink. To match a real motor controller as closely as possible, the controller is simulated with a fixed sample rate equal to the expected PWM sample rate while the motor itself is simulated at a high speed variable sample rate.

Servo Drive Simulation

The servo drive simulation incorporates a motor simulation of a 6 pole PMSM made by Lanzhou Electric Co, China. For the simulation, the 2-pole 2-phase equivalent parameters for the machine are used. The transformation from 3-phase to 2-phase currents and voltages use a scaling factor of $\sqrt{3/2}$. to preserve power. The parameters of the simulated motor are shown in Table 1. The inertia includes the equivalent inertia of the dynamometer load in the actual experimental setup. For this motor and load, the natural frequency is 91.4 rad/s and the natural impedance is 0.914Ω.

TABLE 1

Parameters of the Simulated Servo Motor.

| Item | Value |
| --- | --- |
| Phase | 2 phase quadrature |
| Pole | 2 pole |
| Rated frequency | 628 rad/s (100 Hz) |
| Rated current | 8.0 A |
| Rated torque | 1.5 Nm |
| Peak flux linkage | 0.171 Webers |
| d-axis inductance | 10 mH |
| q-axis inductance | 10 mH |
| Phase resistance | 1.7 Ω |
| Moment of inertia | 0.35 × 10$^{-3}$ kgm$^2$ |

Figure 37:
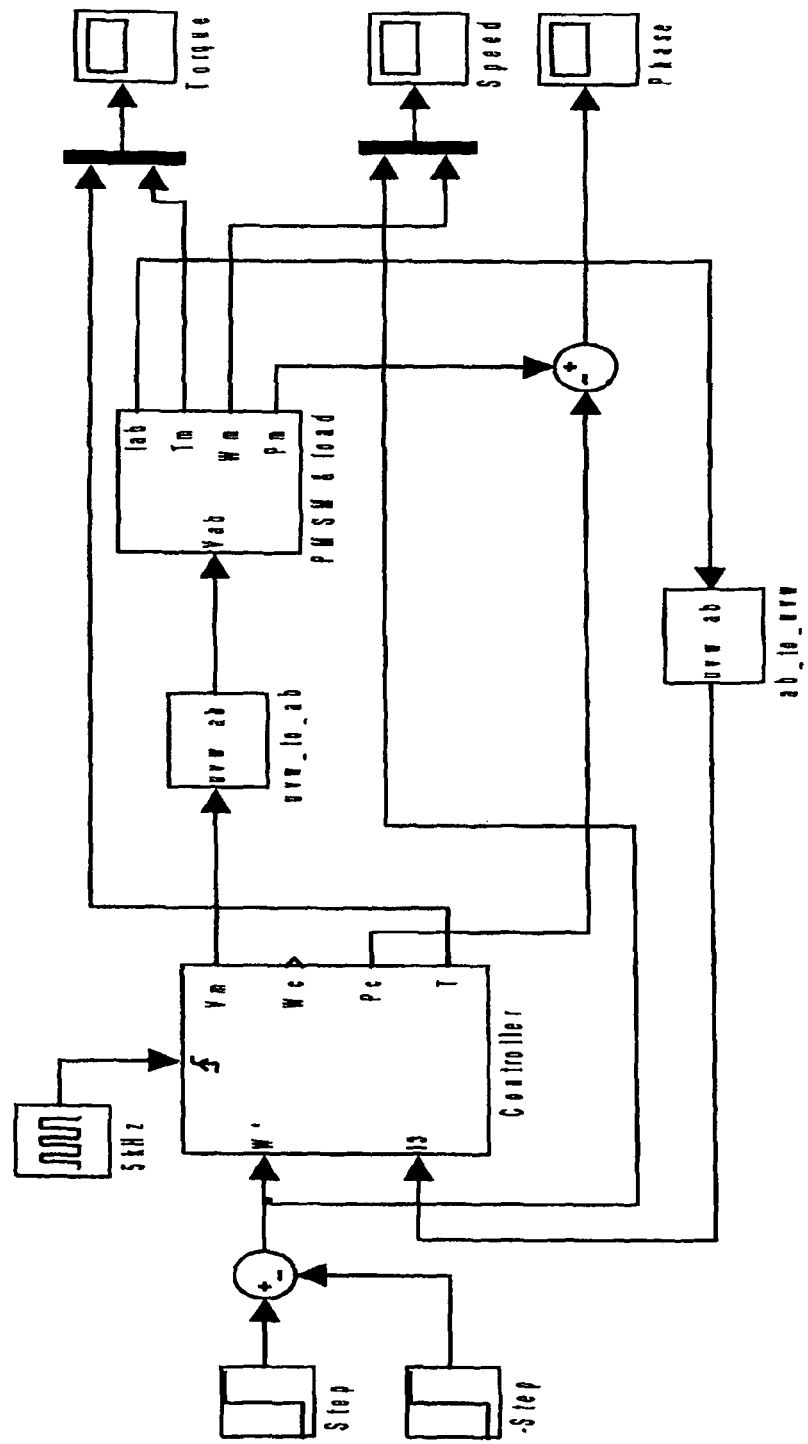
FIG. 37 illustrates a servo drive Simulink model.
Figure 38:
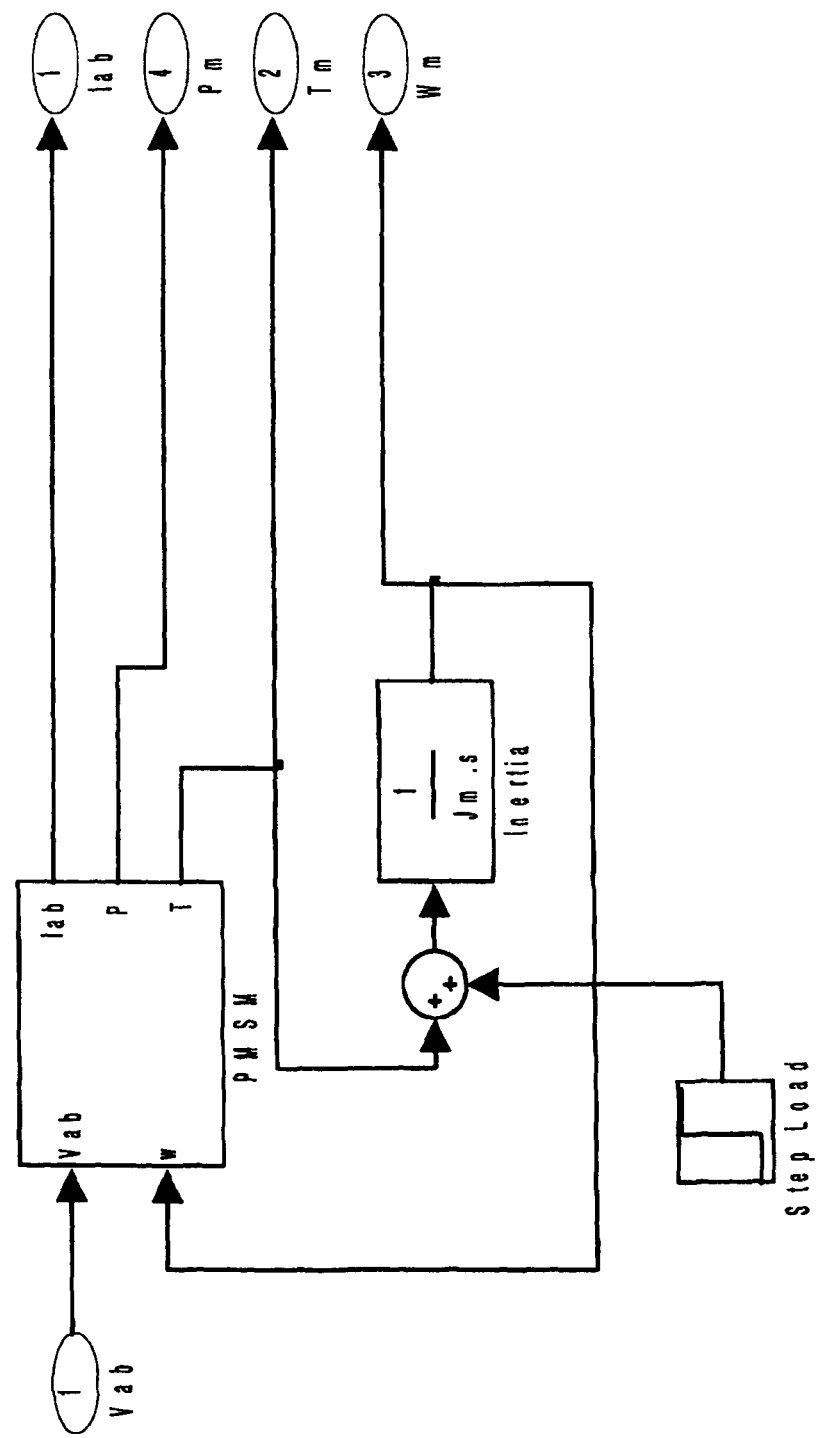
FIG. 38 illustrates a Simulink model of PMSM and load.

The simulation of the servo drive uses speed feedback control. The upper level blocks of the simulation are shown in FIG. 37. The controller block is sampled at 5 kHz and uses the three phase uvw format for input currents and output voltages to simulate as close as possible a DSP based controller operating at a 5 kHz PWM sample rate. The model used for the PMSM and load is shown in FIG. 38. The load is a straight inertial load with provision for a step load torque to be applied. The actual motor model uses the dq frame motor equations with input and output coordinate transformation of voltages and currents between the rotating and fixed reference frames.

Figure 39:
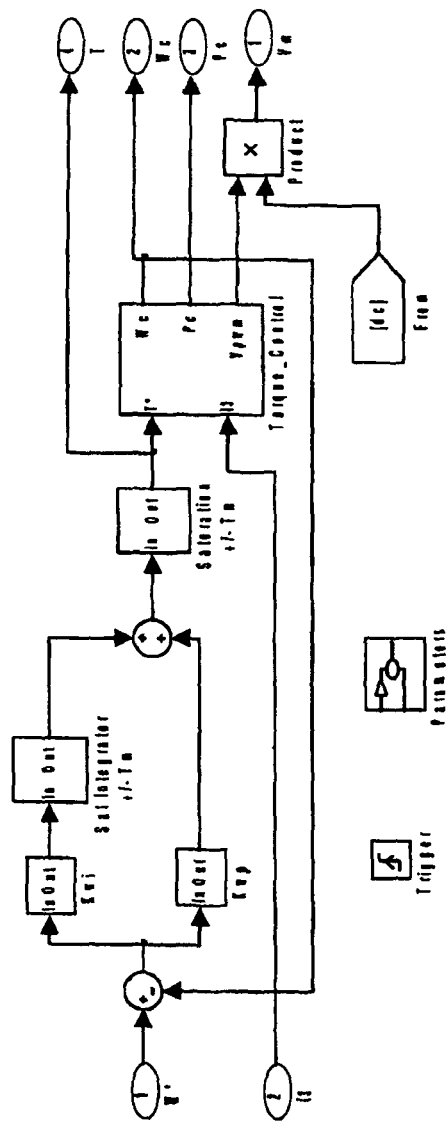
FIG. 39 illustrates a Simulink model of the speed controller.

The Simulink model of the controller block is shown in FIG. 39. All parameters for the controller are stored in the parameter block for convenience.

The controller parameters for the simulation were initially set to the values shown in Table 2.

TABLE 2

Controller Parameters for Servo Speed Control Simulation.

| Parameter | Value | Description |
| --- | --- | --- |
| $f_s$ | 5000 Hz | Digital Sampling frequency |
| $T_M$ | 1.5 Nm | Load torque limit |
| $i_{d0}$ | 2.5 A | d axis component of motor current at zero speed |
| $K_H$ | 2 | High speed stability compensation gain constant |

TABLE 2-continued

Controller Parameters for Servo Speed Control Simulation.

| Parameter | Value | Description |
|---|---|---|
| $\omega_H$ | 500 Hz | Stability compensation filter roll-off frequency |
| $K_1$ | 1 | Torque disturbance compensator $1^{st}$ order gain constant |
| $K_2$ | 0.5 | Torque disturbance compensator $2^{nd}$ order gain constant |
| $K_3$ | 0.3 | Torque disturbance compensator $2^{nd}$ order DC gain constant |
| $K_{\omega f}$ | 0.5 | Speed feedback controller natural frequency normalised to $\omega_n$ |
| $K_{\omega d}$ | 1 | Speed feedback controller damping factor |
| $R_1$ | 0 | Added inverter generated output resistance |
| $L_N$ | 0 | Added inverter generated negative inductance |

Figure 40:
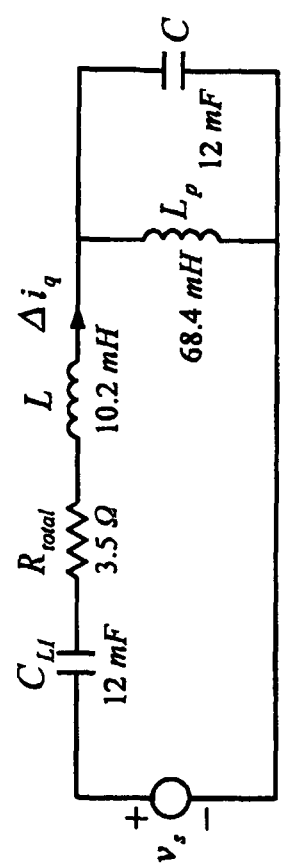
FIG. 40 illustrates an equivalent circuit for zero speed damping for an example motor.

The d axis zero speed command current is set to 2.5 A, giving a pull-out torque of 0.43 Nm. At this current setting, the equivalent parallel inductance at zero speed shown in FIG. 25 is 68.4 mH, about seven times the motor series inductance. This allows fairly aggressive values for the parameters to be set to obtain fast response times. With the high speed damping gain $K_H$ set to 2 the added series resistance is $2R_n$ or $1.8\Omega$. Adding the motor resistance, the total series resistance is $3.5\Omega$. The equivalent capacitance in FIG. 25 due to the inertia is 12 mF. Setting parameter $K_1$ to 1 adds an equivalent series capacitance of the same value. This high setting for $K_1$, which would normally be set to 0.5, improves the response time. Damping gain $K_H$ is set high to 2 to restore damping lost due to the high value of $K_1$. The final zero speed approximate equivalent damping circuit is shown in FIG. 40. As before for the derivation of the circuit in FIG. 25, the second order torque disturbance correction term is ignored.

Figure 41:
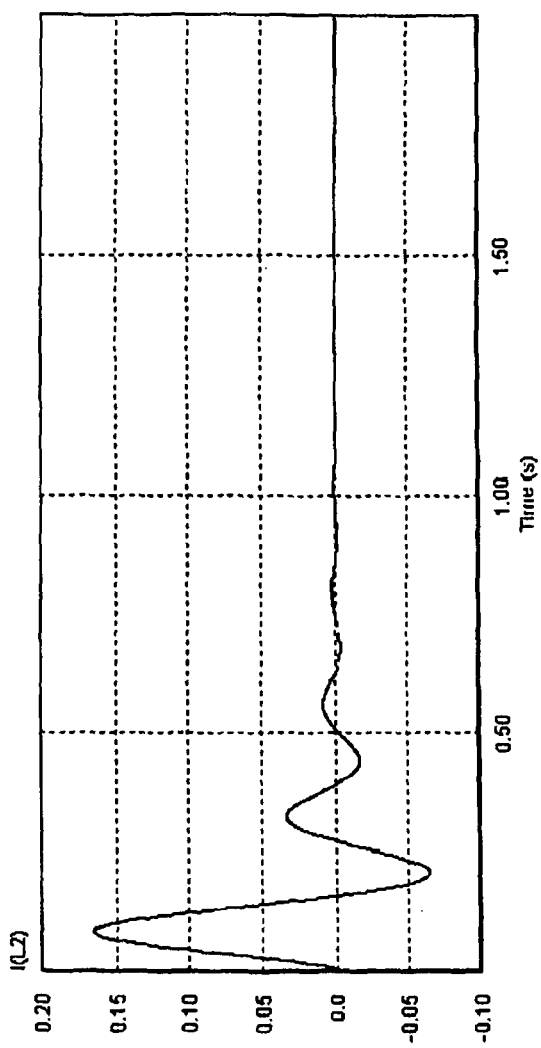
FIG. 41 graphically illustrates a current through $L_p$ for a 1 Volt step input.
Figure 42:
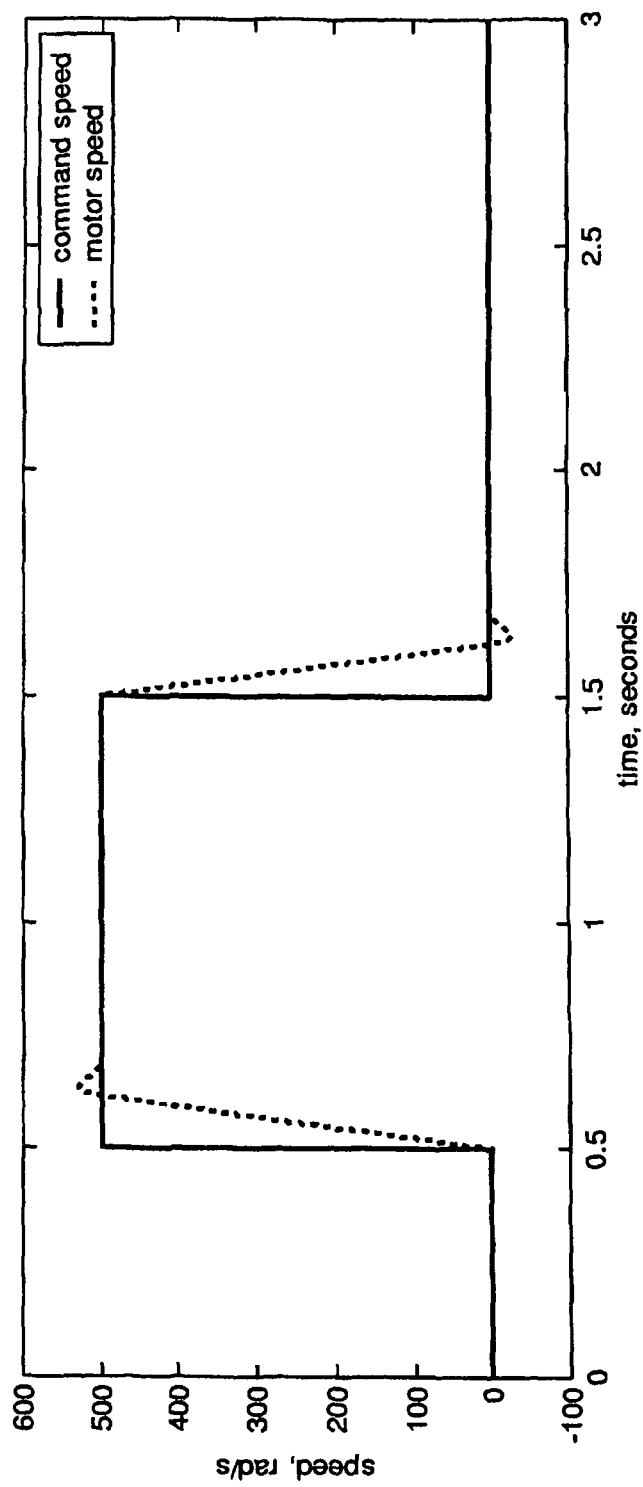
FIG. 42 graphically illustrates a servo speed response from simulation.
Figure 43:
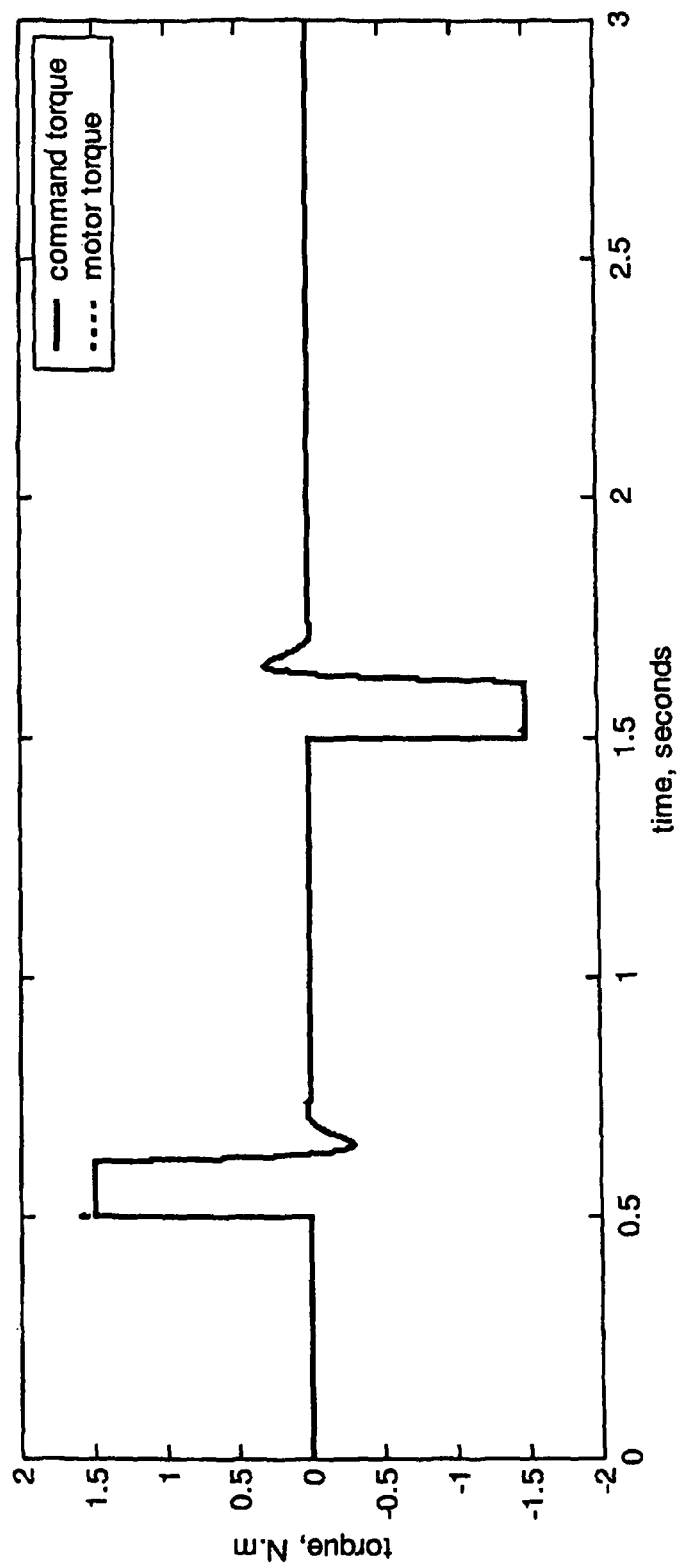
FIG. 43 graphically illustrates a servo torque response from simulation.
Figure 44:
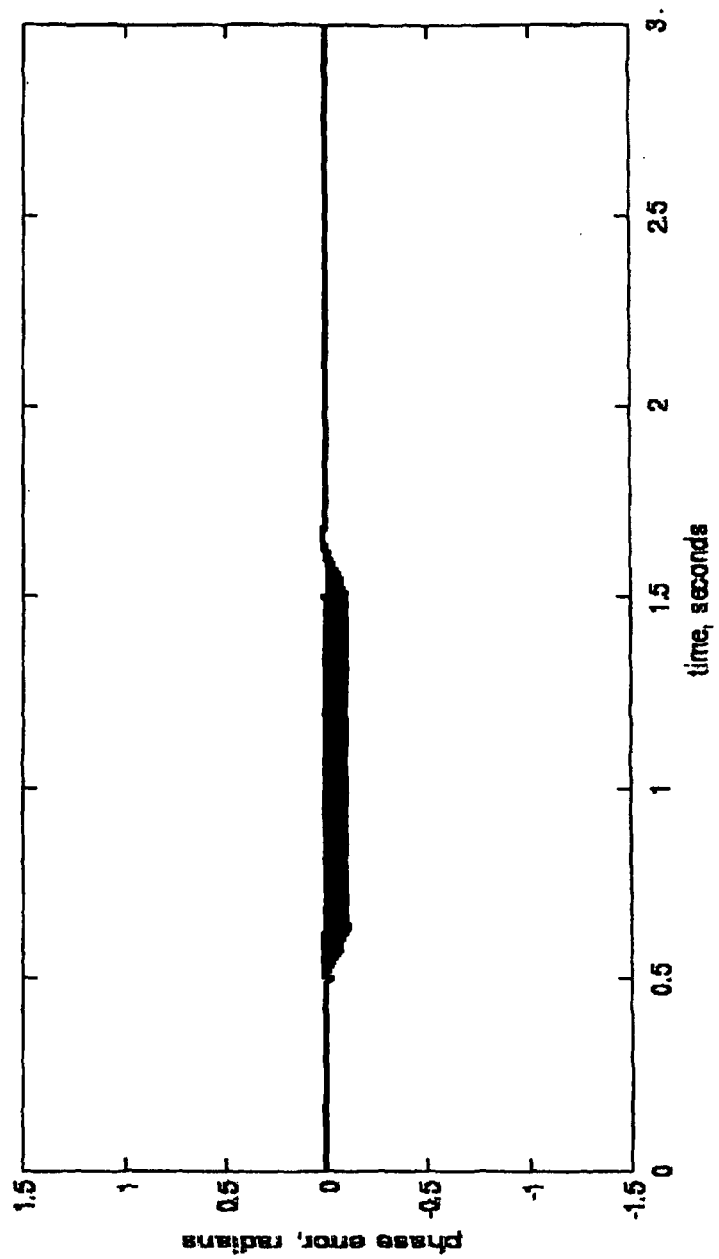
FIG. 44 graphically illustrates a servo phase error from simulation.
Figure 45:
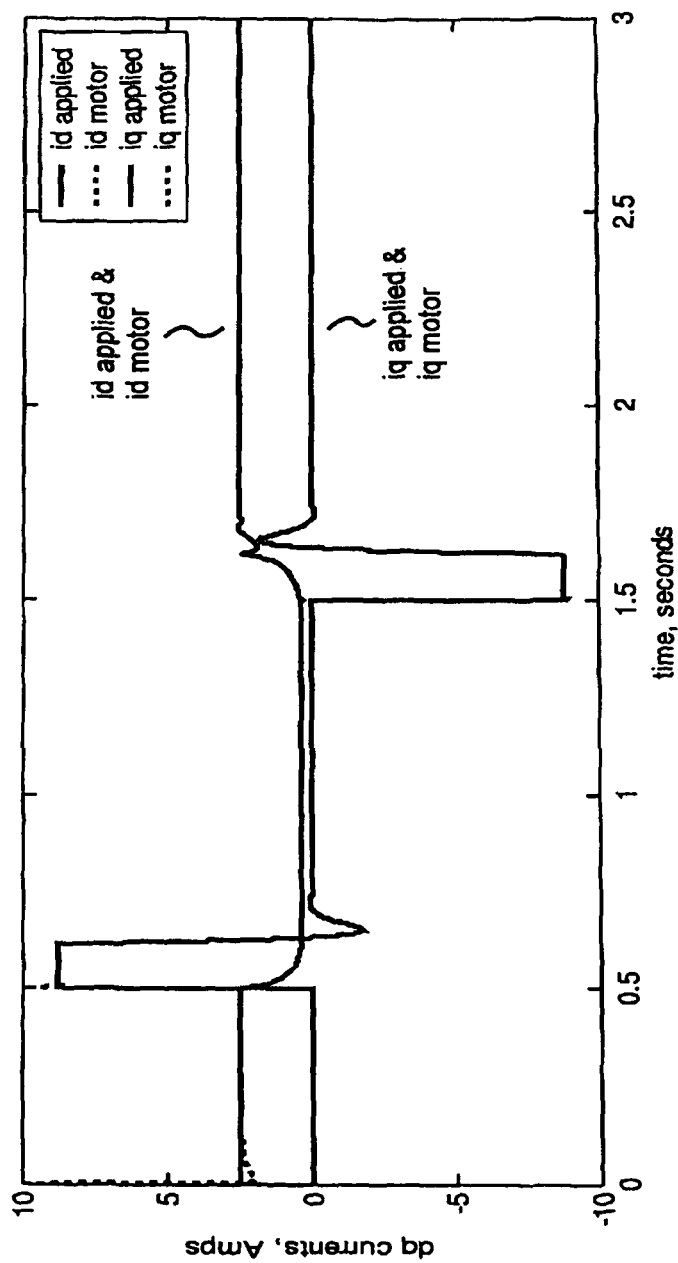
FIG. 45 graphically illustrates servo current waveforms from simulation.
Figure 46:
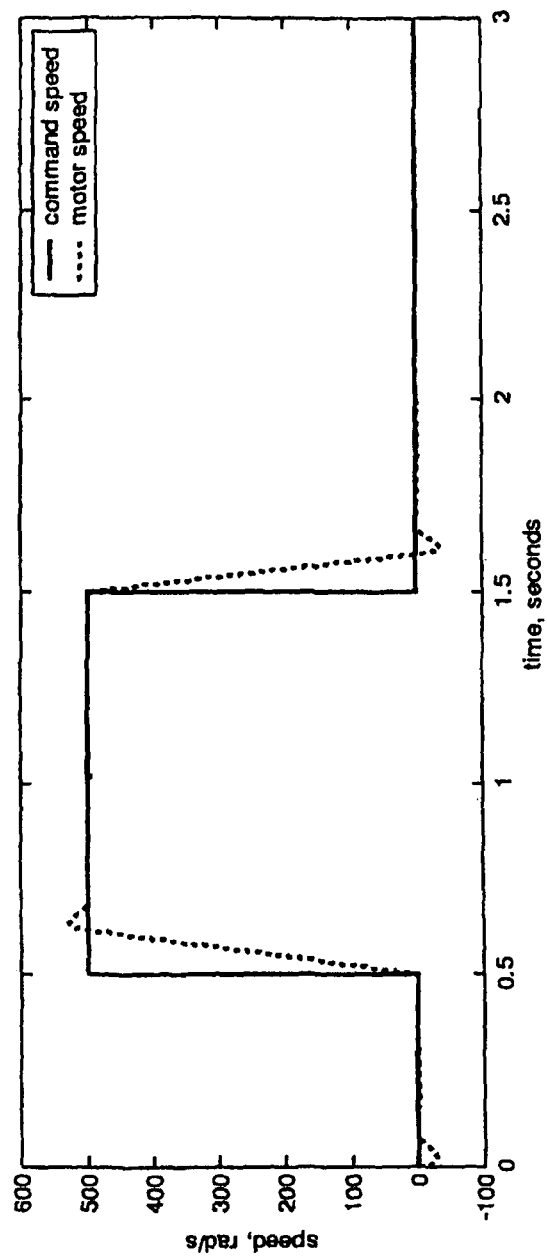
FIG. 46 graphically illustrates a servo speed response with torque disturbance and initial rotor position error.
Figure 47:
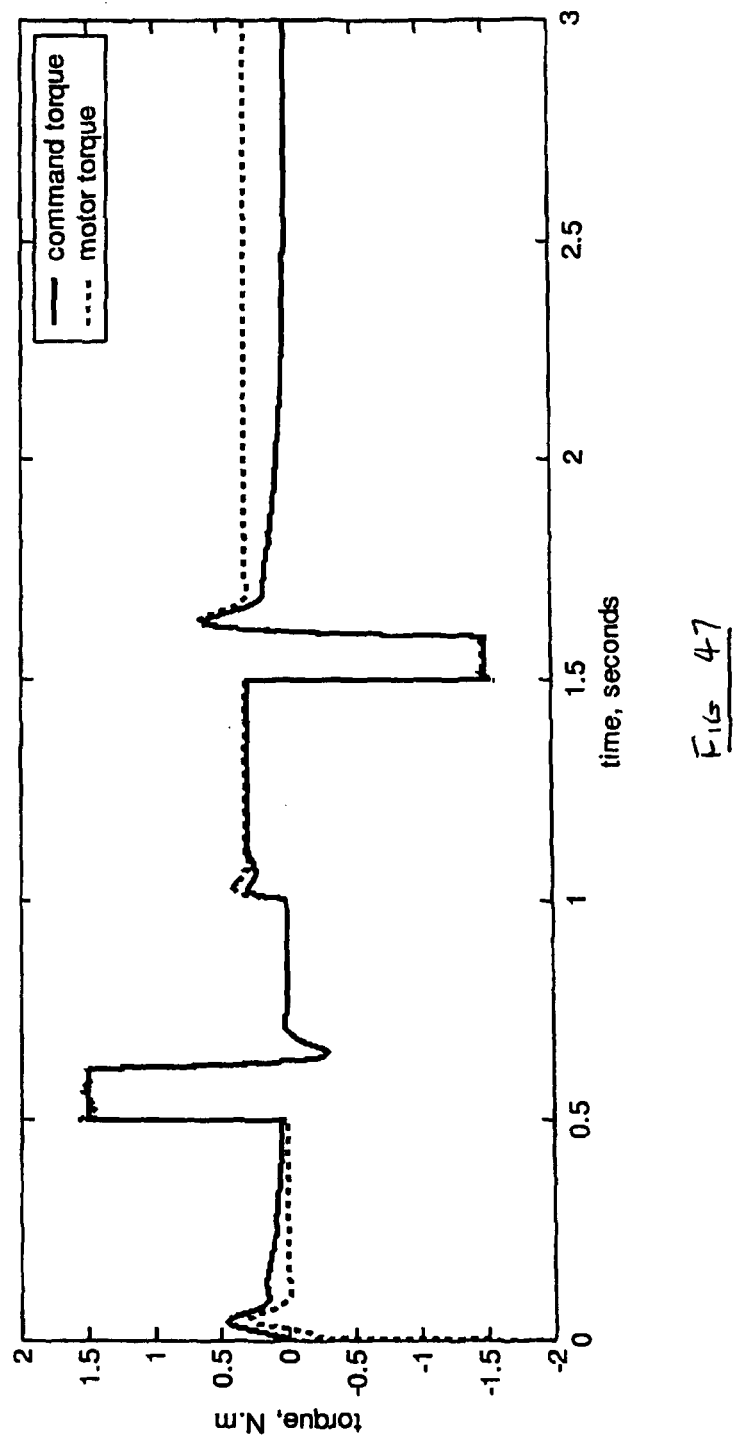
FIG. 47 graphically illustrates a servo torque response with torque disturbance and initial rotor position error.
Figure 48:
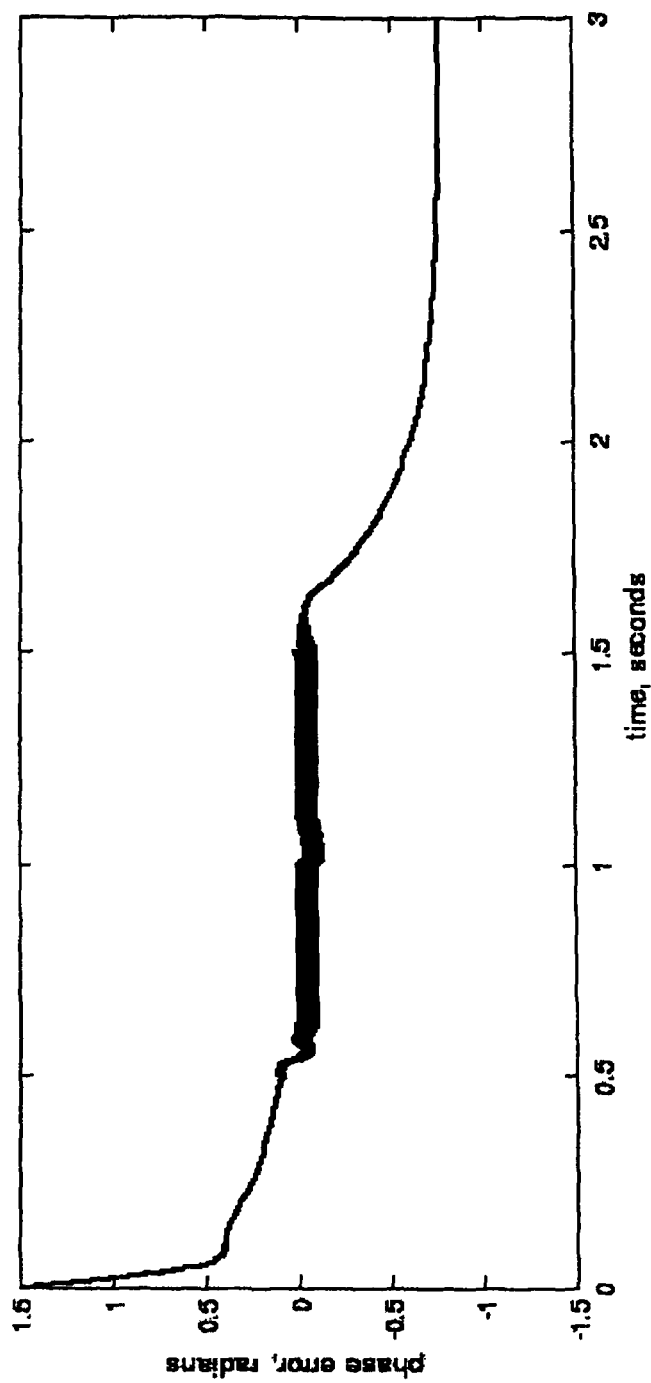
FIG. 48 graphically illustrates a servo phase error with torque disturbance and initial rotor position error.

The response of the current through inductance $L_p$, which is proportional to the rotor phase displacement, for a 1 Volt step input, obtained using PSIM circuit simulation software, is shown in FIG. 41. This response is slightly oscillatory at zero speed, but this is worse case and will improve as speed increases and inductance $L_p$ increases due to falling d axis current. It has been found in practice that this is a worse case response. The addition of an outer speed controller and other effects tend to add extra damping. Improved damping can be obtained trading off response time by reducing parameter $K_1$ with adjustment of other parameters.

The servo motor drive is first simulated with just an inertial load. The speed reference is stepped up to 500 rad/sec then back down to zero. The results of the simulation are shown in FIGS. 42 to 45. There is some speed overshoot when the controller comes out of torque saturation which can be corrected by either profiling the speed command or using a more sophisticated anti-wind-up control. The torque response is virtually instantaneous and the phase error remains close to zero throughout the simulation. Note that as speed is increased the phase stepping in the controller due to sampling becomes more evident, causing a blurring of the waveform, with the phase error returning to zero at each sampling point.

The next simulation adds a disturbance torque of 0.3 Nm to test the response to a disturbance torque close to the pull-out torque. The 0.3 Nm disturbance torque is applied while the speed is at 500 rad/s and kept at that value to the end of the simulation. Also, to test the controller's ability to lock in the rotor phase the initial rotor phase error was set to 1.5 rad. The results of this simulation are shown in FIGS. 46 to 49.

The speed response shows excellent tracking ability at all speeds including very good torque disturbance rejection. The torque output graph shows near instantaneous response times and good torque tracking except as expected at low speed when torque output cannot be determined by the controller. At zero speed, the temporary torque memory effect where the controller remembers the last output torque at higher speeds can be seen. As explained previously, the rate of decay of this memory can be set by the second order torque parameter $K_3$.

The graph of phase error shows an initial rapid reduction in phase error at start up until the second order torque disturbance effect takes hold to start a more progressive phase error reduction. Note that as soon speed is increased to the level where the back EMF could be used to determine actual rotor phase, the phase error rapidly drops to near zero. After zero speed is again reached at around 1.7 seconds, the phase error slowly settles to a large error consistent with a load offset torque close to the pull-out torque.

Figure 49:
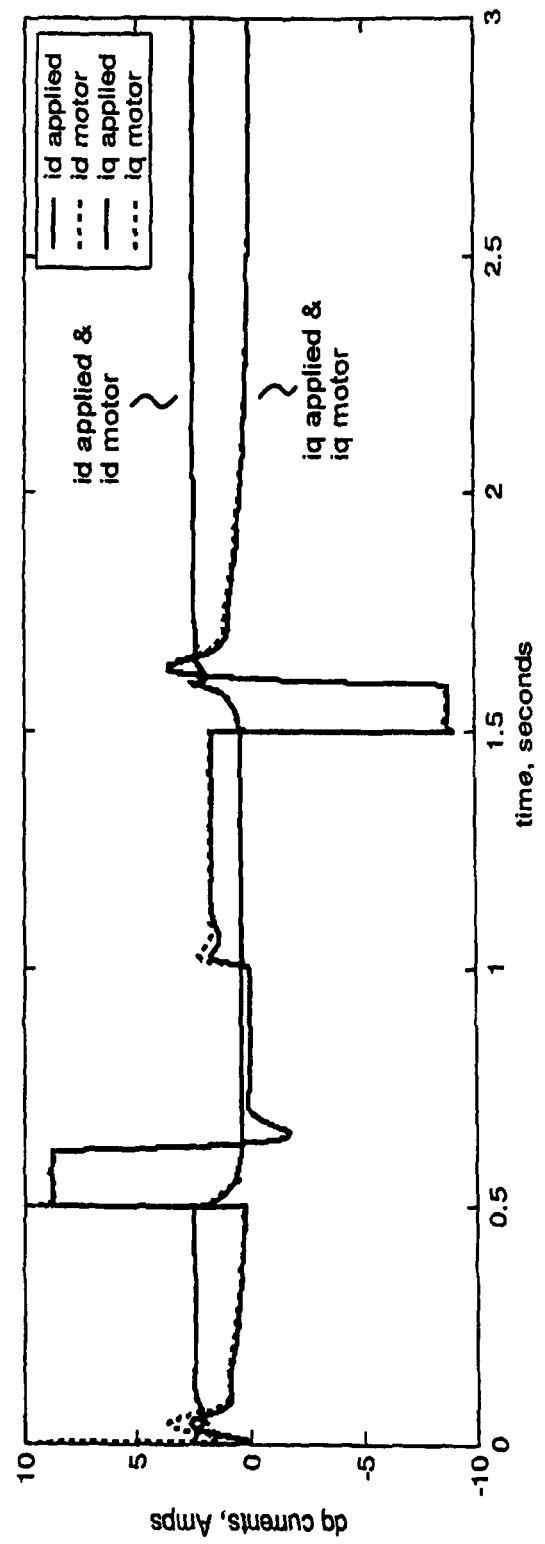
FIG. 49 graphically illustrates currents in the dq reference frame with torque disturbance and initial rotor position error.
Figure 50:
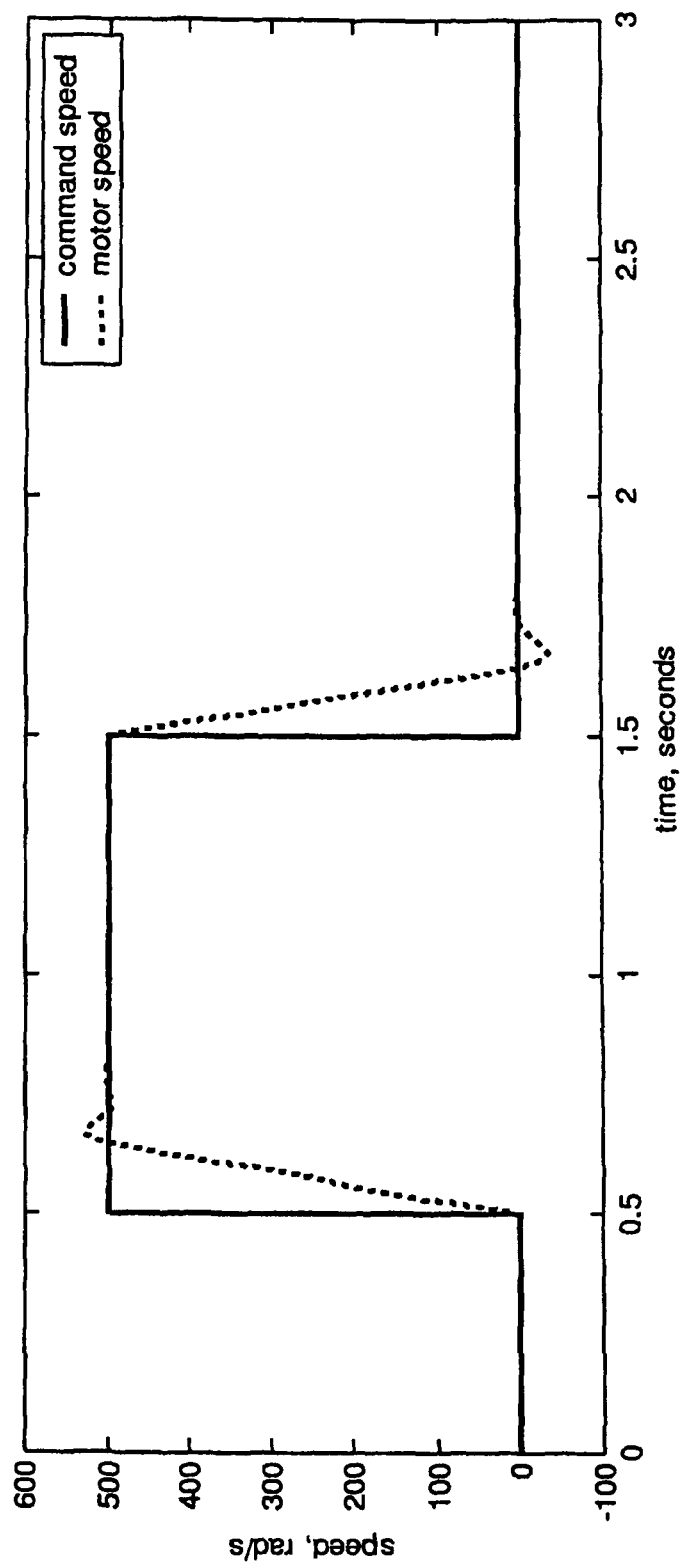
FIG. 50 graphically illustrates a servo speed response with 20% rotor flux error.
Figure 51:
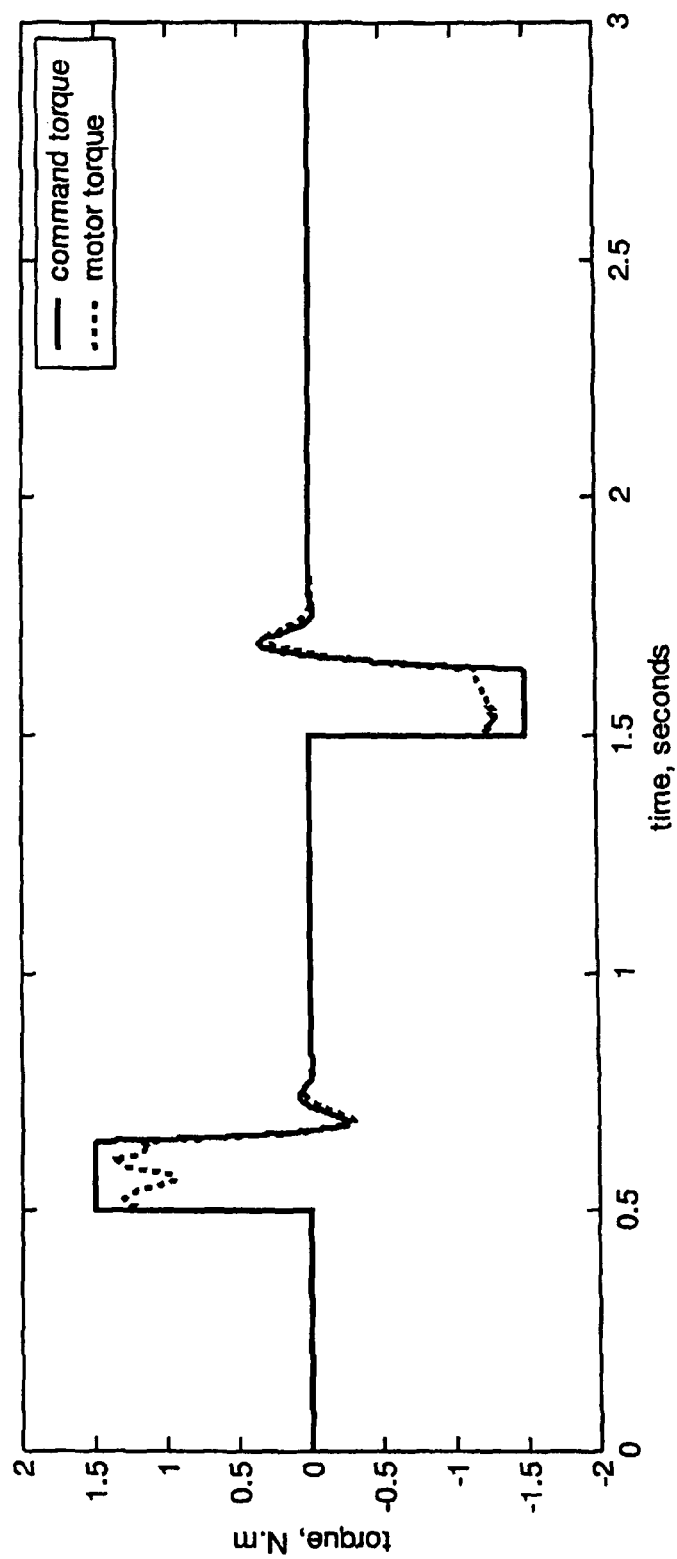
FIG. 51 schematically illustrates a servo torque response with 20% rotor flux error.
Figure 52:
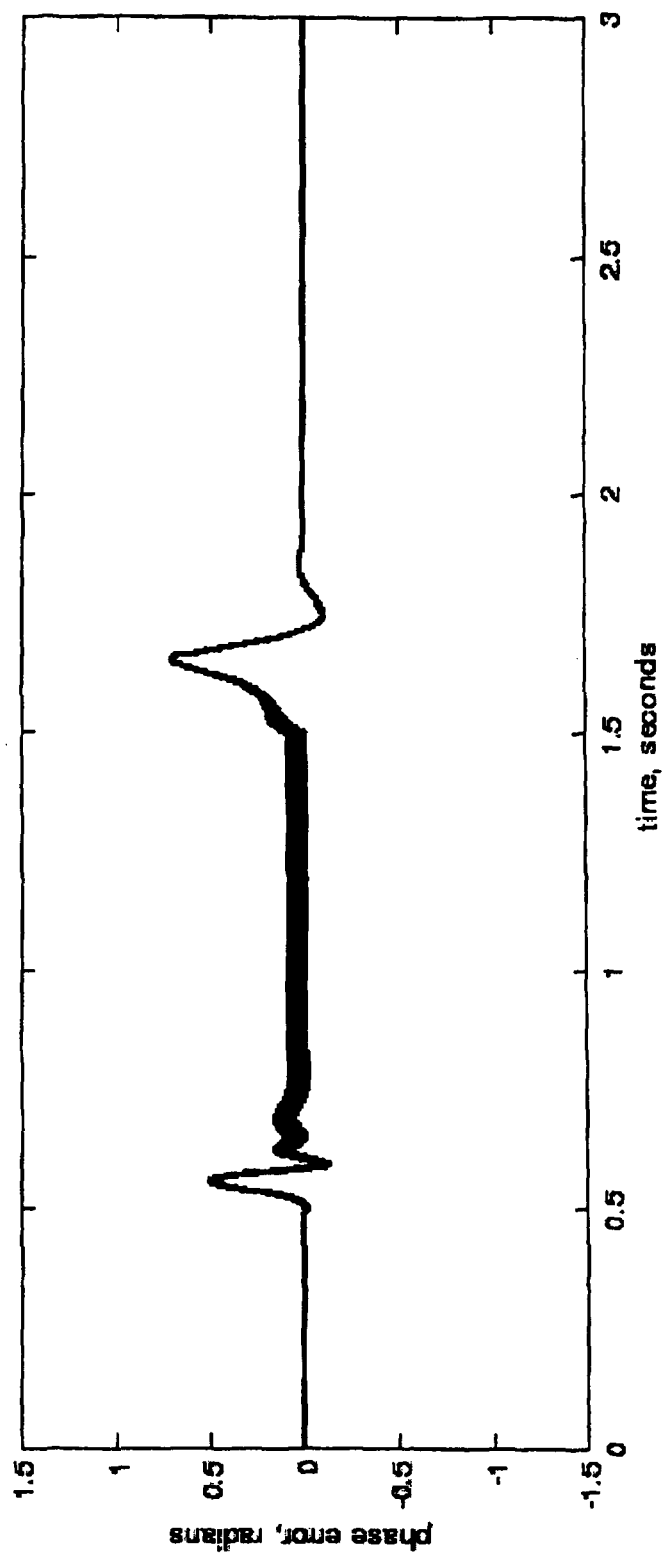
FIG. 52 graphically illustrates a servo phase response with 20% rotor flux error.
Figure 53:
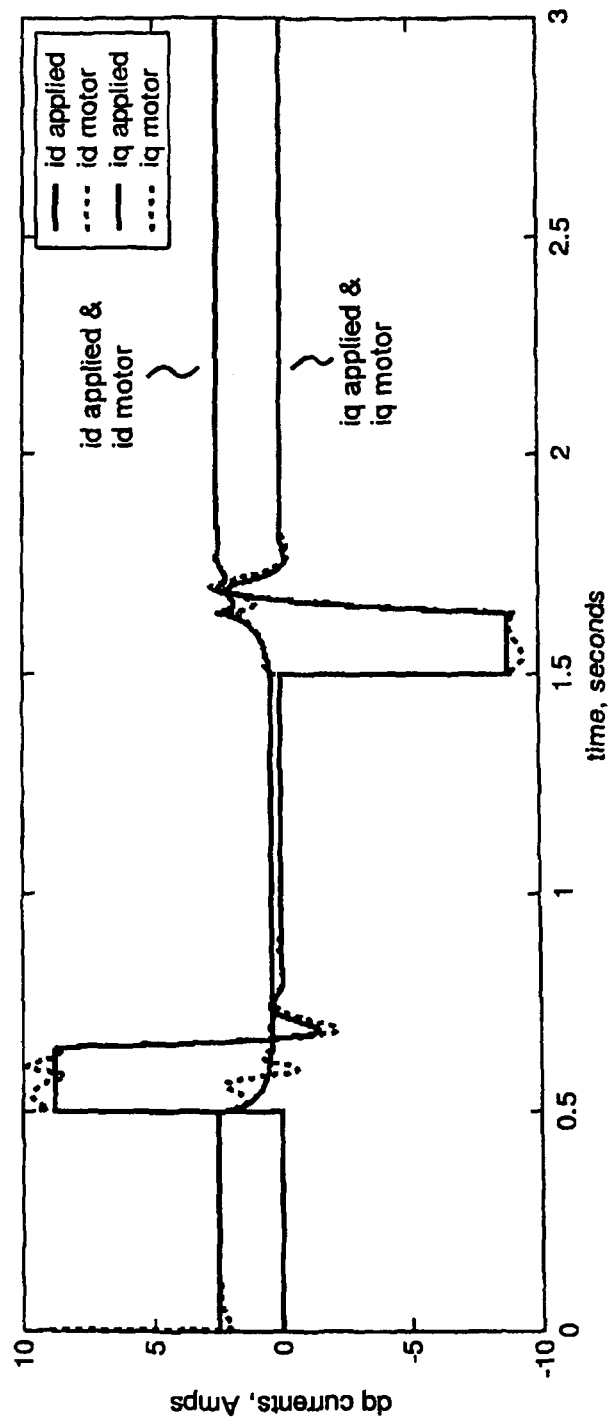
FIG. 53 schematically illustrates current waveforms in dq frame with 20% rotor flux error.
Figure 54:
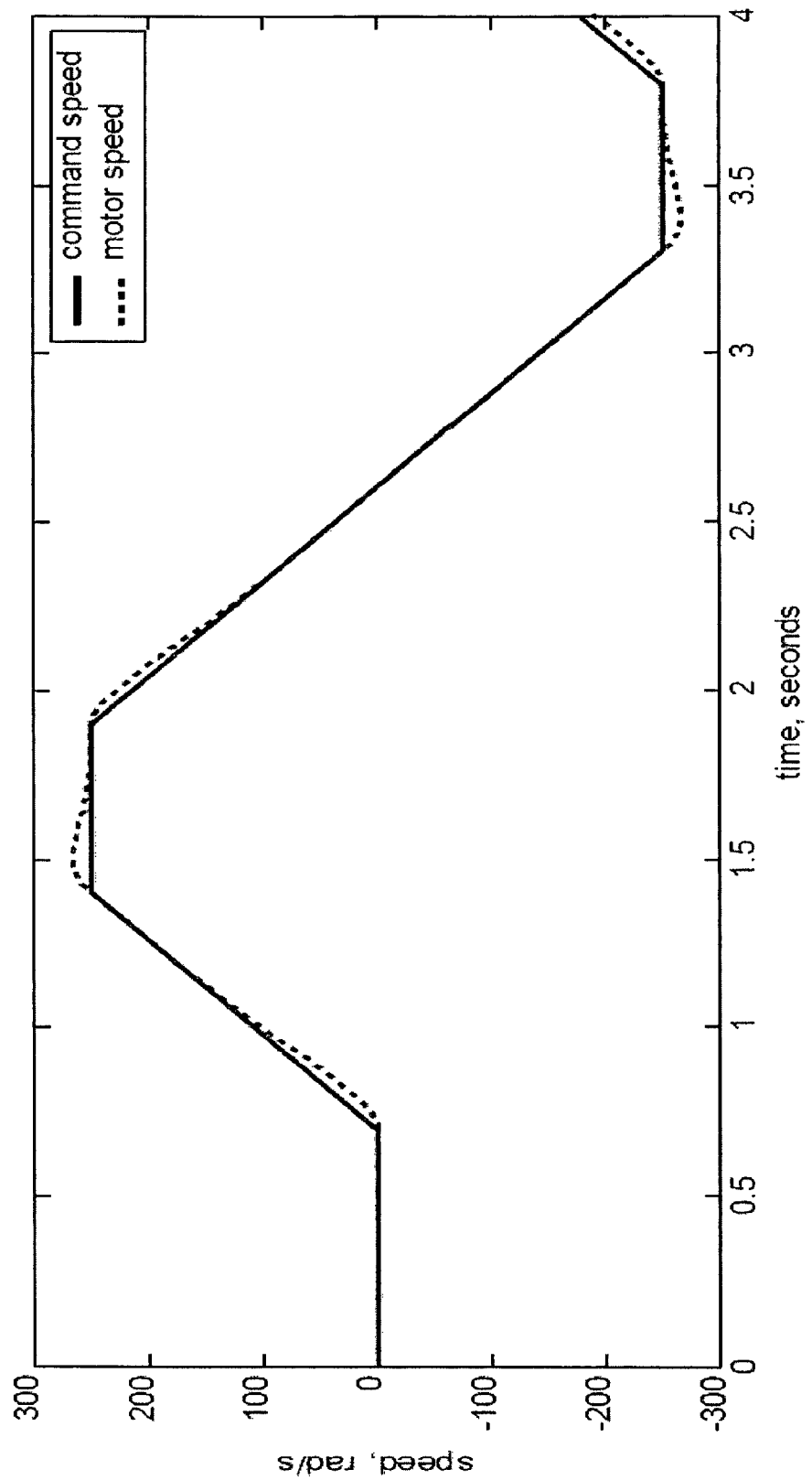
FIG. 54 graphically illustrates a washer motor drive speed response from simulation.
Figure 55:
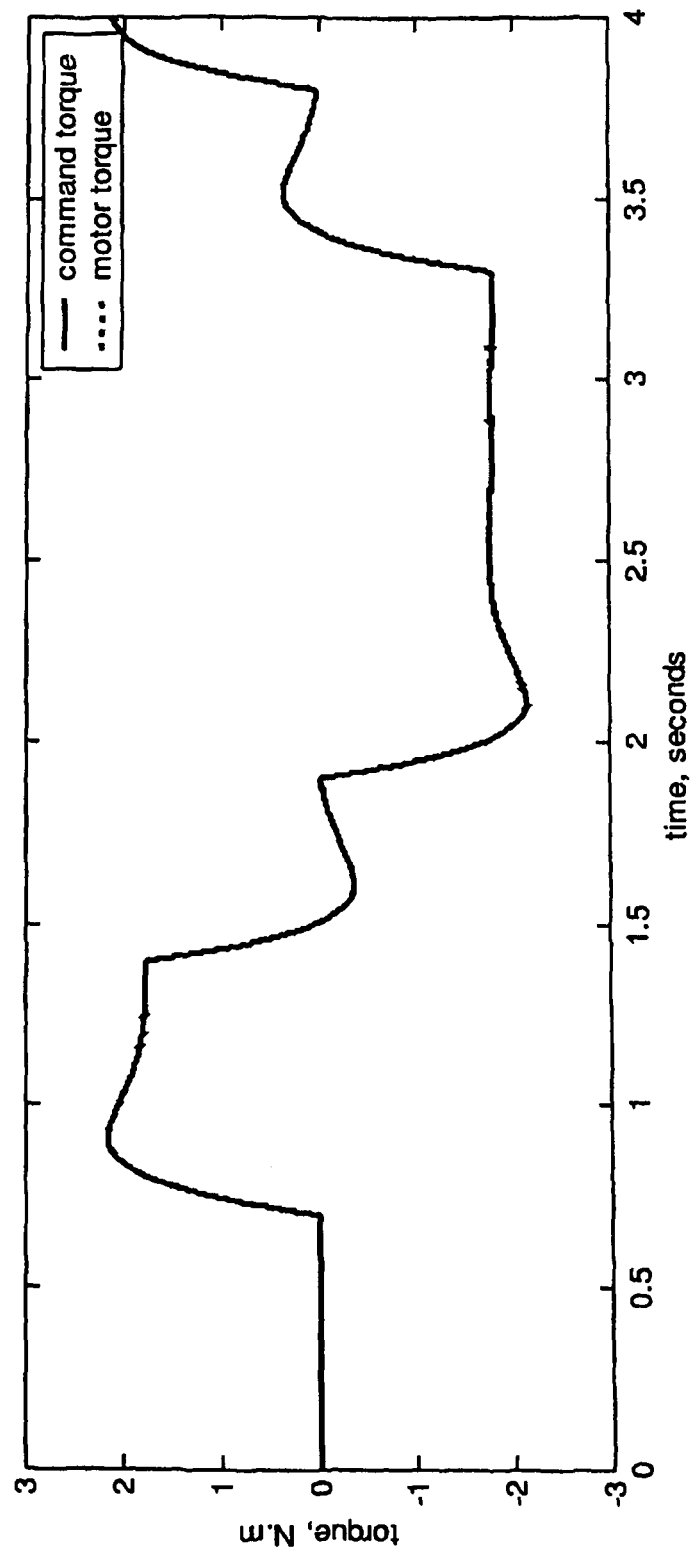
FIG. 55 graphically illustrates a washer motor drive torque response from simulation.
Figure 56:
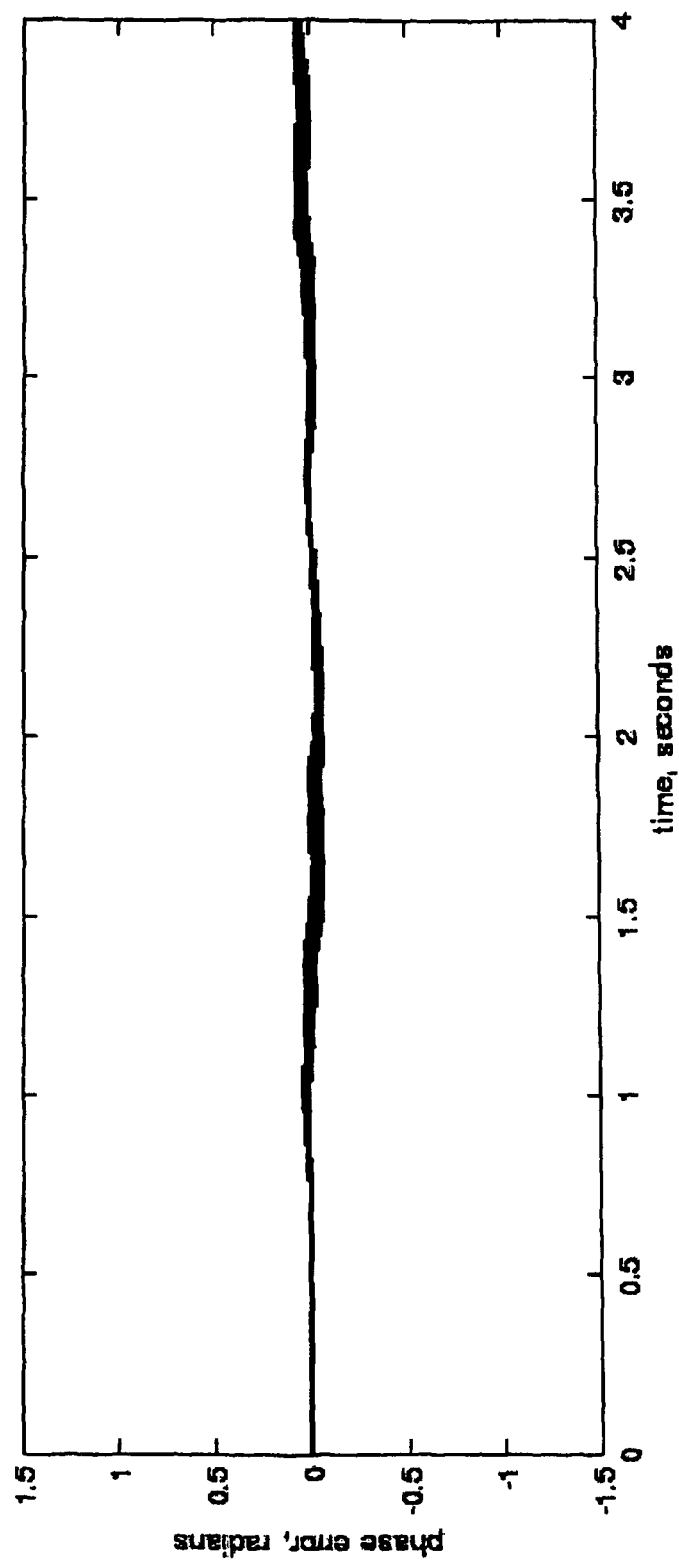
FIG. 56 graphically illustrates a washer motor drive phase error from simulation.
Figure 57:
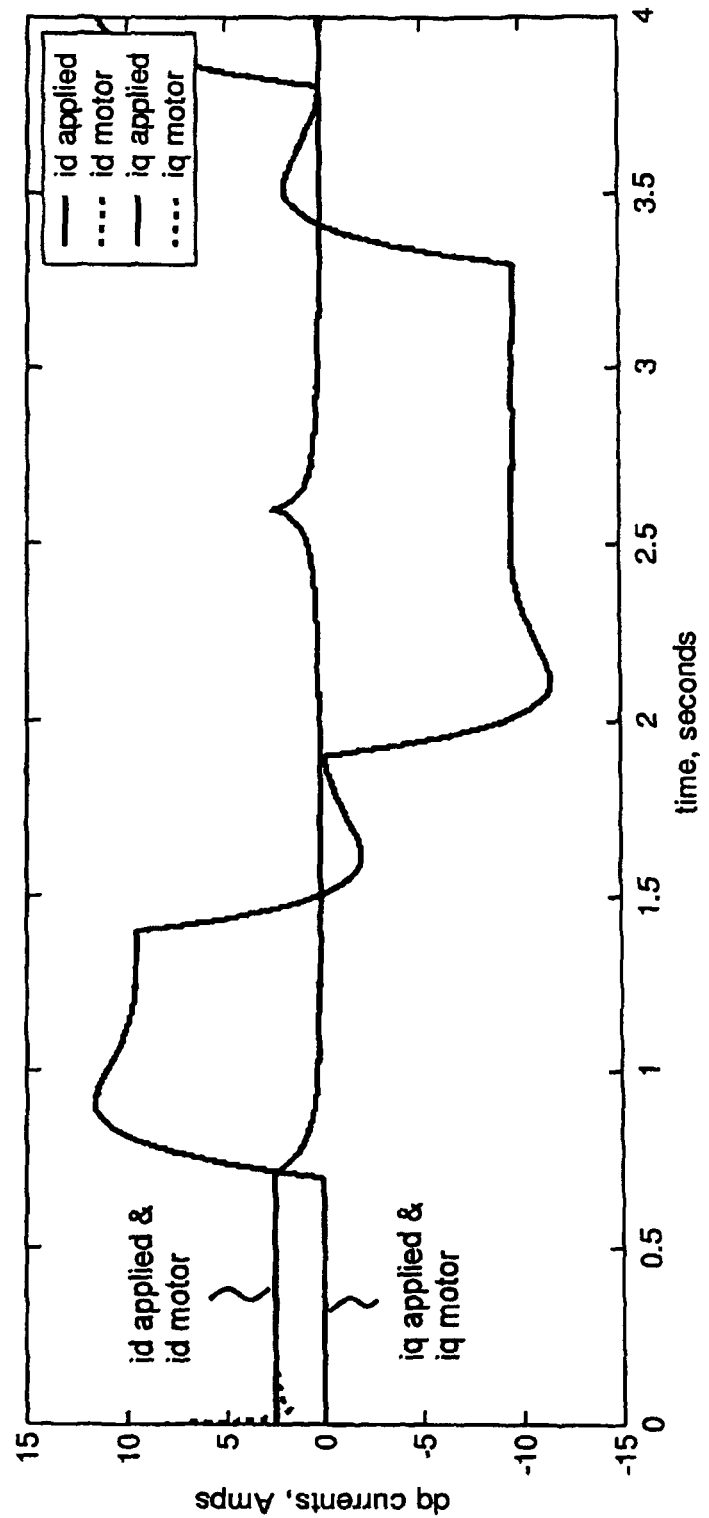
FIG. 57 graphically illustrates a washer motor drive current waveforms from simulation.

As shown in FIG. 49, except for the initial turn on transient, the d axis applied and actual currents match exactly for all speed and load conditions. The q axis currents also match closely except for brief transient conditions.

Parameter Sensitivity of Servo Drive

Generally a PMSM controller using feed forward torque control is very insensitive to motor parameter variations although if large parameter variations are expected the controller parameters should be chosen carefully.

For example, one of the most likely parameters to vary in a PMSM is the rotor flux level. FIGS. 50 to 53 show the simulation results if the rotor flux is reduced by 20%. The results show that the d axis current which is normally very sensitive to changes in flux, is kept well controlled. Also, the speed response is nearly unchanged but when operating in torque limit during acceleration the motor torque is lower than the command torque by about 20% and is not as stable. As well, there is significant phase error when nearing zero speed in full torque limit. This is when the motor torque reduction must be taken up by the restoring torque provided from the positive d axis current.

For the servo drive, the controller is even less sensitive to changes in stator resistance because this resistance is masked to some extent by the added series resistance produced by high speed damping.

The greatest sensitivity is found from variations in the motor inductance. If the motor inductance is less than the controller estimate, the controller's estimate of changes in motor speed amplifies actual speed changes causing possible instability in the speed feedback loop. If inductance variations are expected, the inductance estimate used in the controller should be set to the lower end of the expected range of inductance.

Washer Direct Drive Simulation

A permanent magnet synchronous motor for direct drive of a top loading washing machine is a particularly difficult application for a sensorless speed controller. Winding resistance is very high to minimise cost and motor inductance is high due to the low flux of the typically ferrite magnets. Also, the load inertia is very high and varies greatly depending on the load. As well, the wash cycle speed profile is very demanding, requiring repeated rapid speed reversal at high torque. To add to the difficulty, the winding resistance can change by up to 30% and the rotor flux can change by up to 20% due to the motor temperature rise during the wash cycle.

Typical phase to neutral motor parameters of a three phase direct drive washer motor are listed in Table 3. For the simulation of this motor, the equivalent two-phase, two-pole motor parameters are listed in Table 4.

TABLE 3

Parameters of the Direct Drive Washer Motor

| Parameters | Value | |
|---|---|---|
| Rated speed | 150 | rev/min |
| Rated power | 500 | W |
| Rated current | 6 | A |
| Number of poles | 48 | |
| Back EMF constant $\lambda_r$ | 0.152 | Vs |
| Phase resistance | 4.6 | Ω |
| d axis inductance | 32 | mH |
| q axis inductance | 32 | mH |

TABLE 4

Parameters of the Simulated Washer Motor.

| Item | Value |
|---|---|
| Phase | 2 phase quadrature |
| Pole | 2 pole |
| Rated frequency | 377 rad/s (60 Hz) |
| Rated current | 7.35 A |
| Rated torque | 1.5 Nm |
| Peak flux linkage | 0.186 Vs |
| d-axis inductance | 32 mH |
| q-axis inductance | 32 mH |
| Phase resistance | 4.6 Ω |

The torque load on the motor over the wash cycle varies depending on the speed differential between the circular water flow and the bowl speed, but a reasonable approximation can be made by modelling the load as a fixed inertia. For a maximum 7 kg load in the machine used with the above motor, the two pole equivalent load inertia is about $5 \times 10^{-3}$ kg·m². With this inertia, the natural frequency for the above machine ($\lambda_r/\sqrt{LJ}$) is 14.7 rad/s and the natural impedance ($\lambda_r \sqrt{(L/J)}$) is 0.47Ω. The machine has been simulated using this load and a typical wash cycle speed profile. The controller parameter settings are listed in Table 5. These are the same as those chosen for the servo drive except the load torque limit has been increased and a negative resistance has been added on the output to compensate for the rather large motor resistance. It was found adding the negative resistance is worthwhile to slightly improve the low speed response, although operation without it is possible reducing the need to compensate the inverter output for dead time distortion.

TABLE 5

Controller Parameters for Washer Speed Control Simulation.

| Parameter | Value | Description |
|---|---|---|
| $f_s$ | 5000 Hz | Digital Sampling Frequency |
| $T_M$ | 3.0 Nm | Load torque limit |
| $i_{d0}$ | 2.5 A | d axis component of motor current at zero speed |
| $K_H$ | 2 | High speed stability compensation gain constant |
| $\omega_H$ | 500 Hz | Stability compensation filter roll-off frequency |
| $K_1$ | 1 | Torque disturbance compensator $1^{st}$ order gain constant |
| $K_2$ | 0.5 | Torque disturbance compensator $2^{nd}$ order gain constant |
| $K_3$ | 0.3 | Torque disturbance compensator $2^{nd}$ order DC gain constant |
| $K_{\omega f}$ | 0.5 | Speed feedback controller natural frequency normalised to $\omega_n$ |
| $K_{\omega d}$ | 1 | Speed feedback controller damping factor |
| $R_I$ | −3.5 Ω | Added inverter generated output resistance |
| $L_N$ | 0 | Added inverter generated negative inductance. |

The results of the simulation are shown in FIGS. 54 to 57. The controller response is almost ideal. In particular, the inner feed forward torque controller tracks torque, phase and currents almost exactly.

Parameter Sensitivity of Washer Direct Drive

Other washer direct drive sensorless control schemes rely on estimating rotor position from the back EMF. These prior art schemes must accurately estimate the voltage drop across the winding resistance in order to measure the back EMF making them particularly sensitive to variations in resistance at low speeds. Accommodating these variations is very difficult when they can be up to 30% due to motor temperature variations.

For the simulated washer motor, the winding temperature may rise by 80° C. resulting in an increase in the winding resistance of 30% from 4.6Ω to 6Ω. During a full load wash cycle, the peak two phase equivalent current is 8 A giving a resistance voltage drop of 48V when hot, yet the peak back EMF is only 47V at maximum wash speed, making measurement of the back EMF especially near zero speed extremely difficult.

Figure 58:
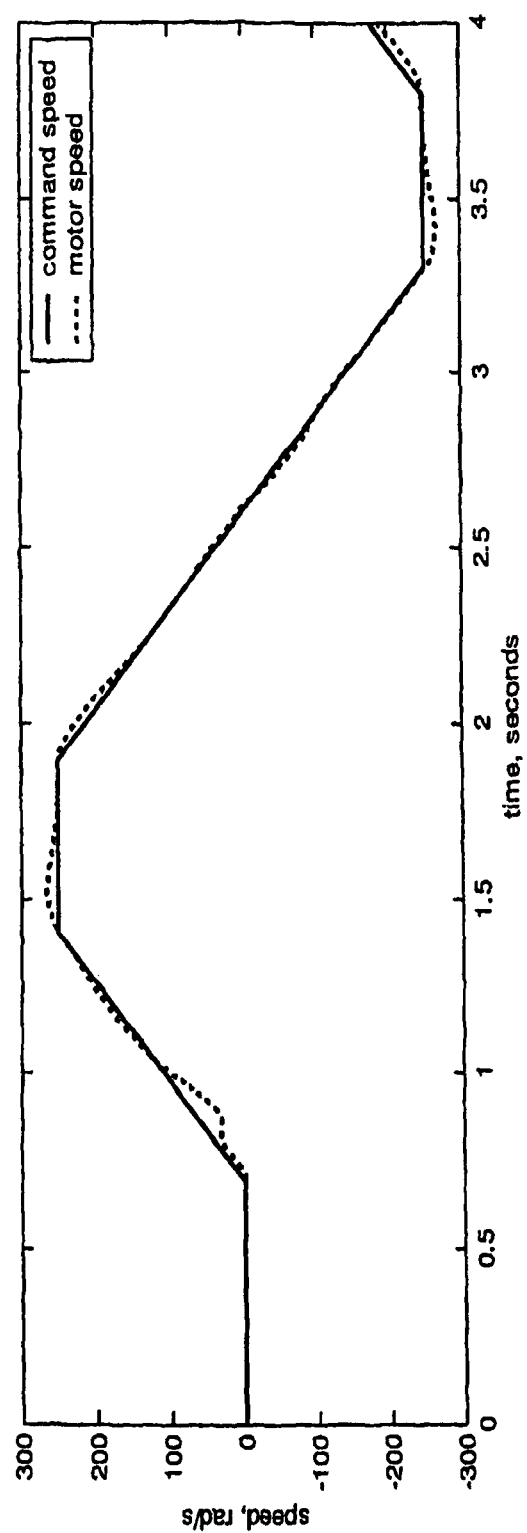
FIG. 58 graphically illustrates a washer motor drive speed response with 30% change in motor resistance.
Figure 59:
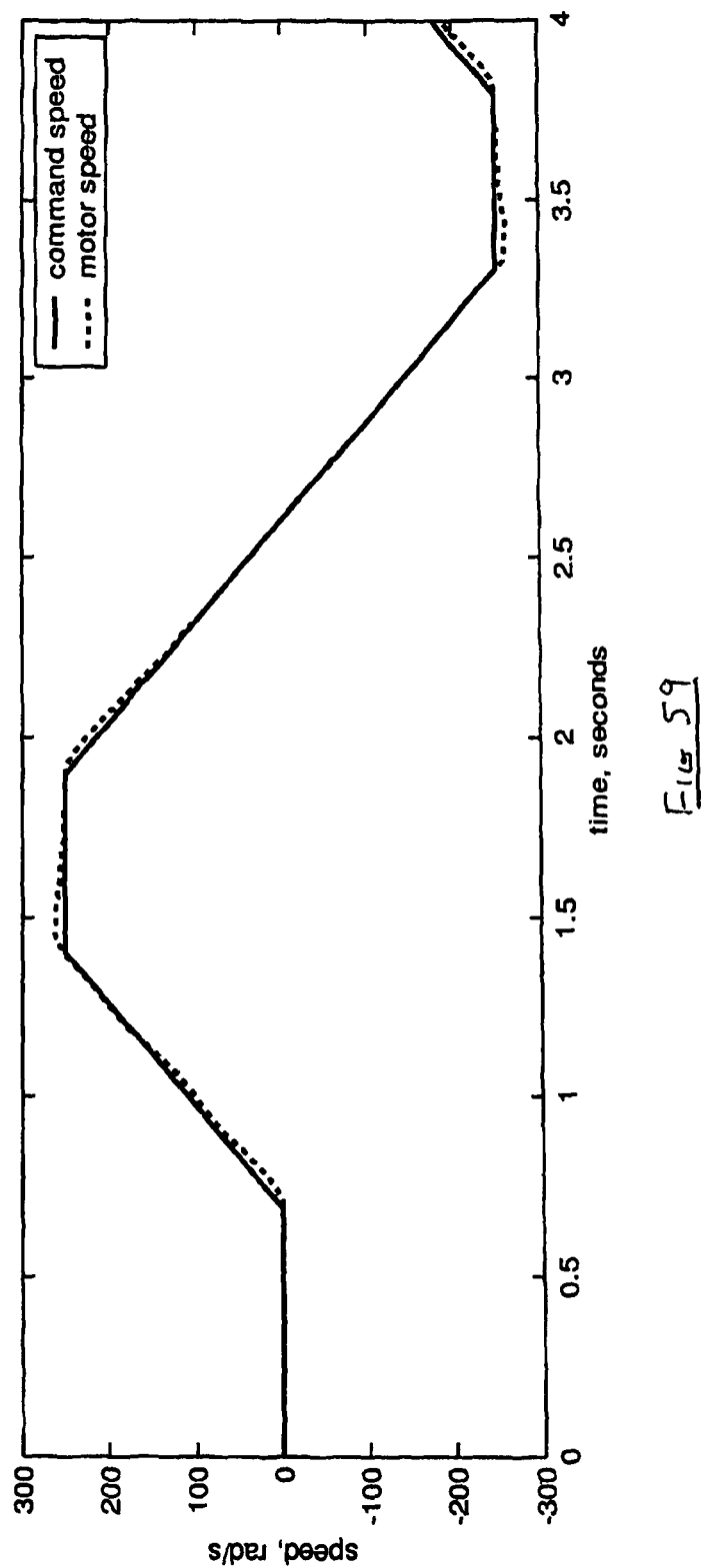
FIG. 59 graphically illustrates a speed response with 20% load error.
Figure 60:
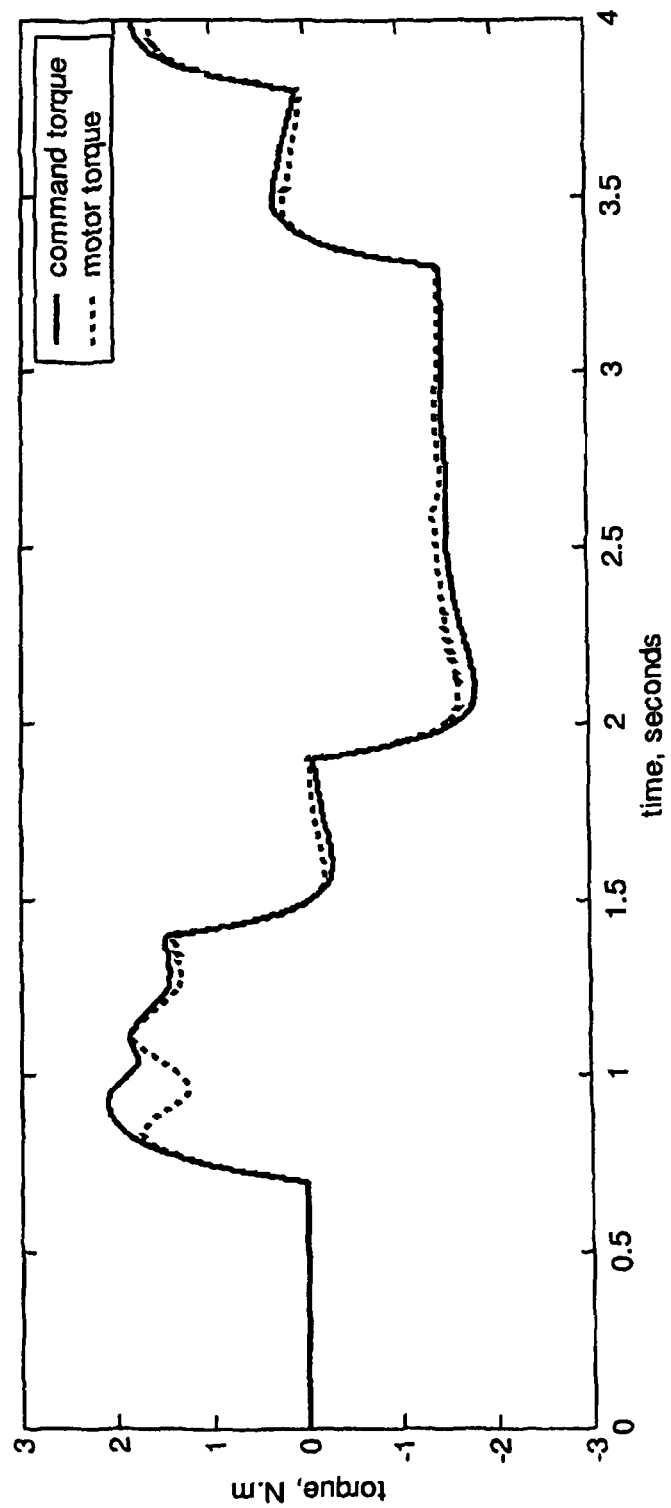
FIG. 60 graphically illustrates a torque response with 20% load error.
Figure 61:
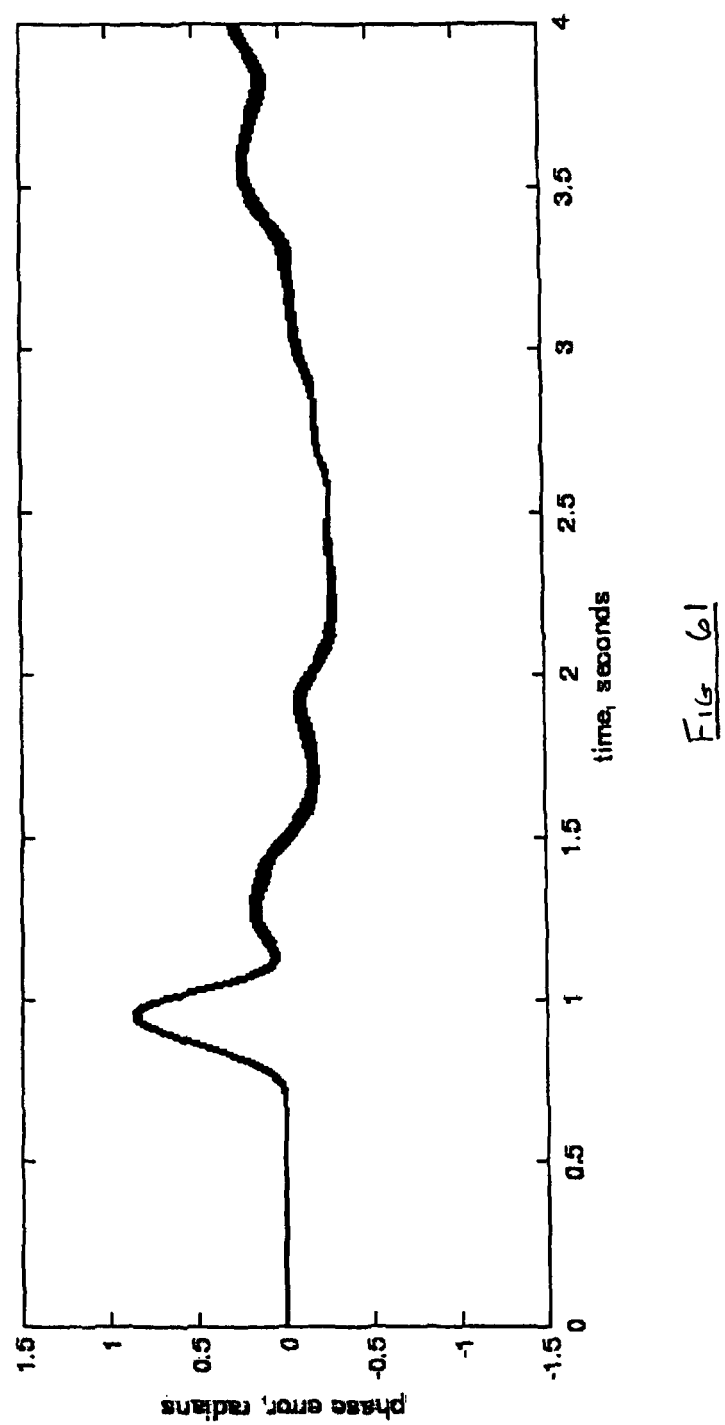
FIG. 61 graphically illustrates a phase error plot with 20% load error.
Figure 62:
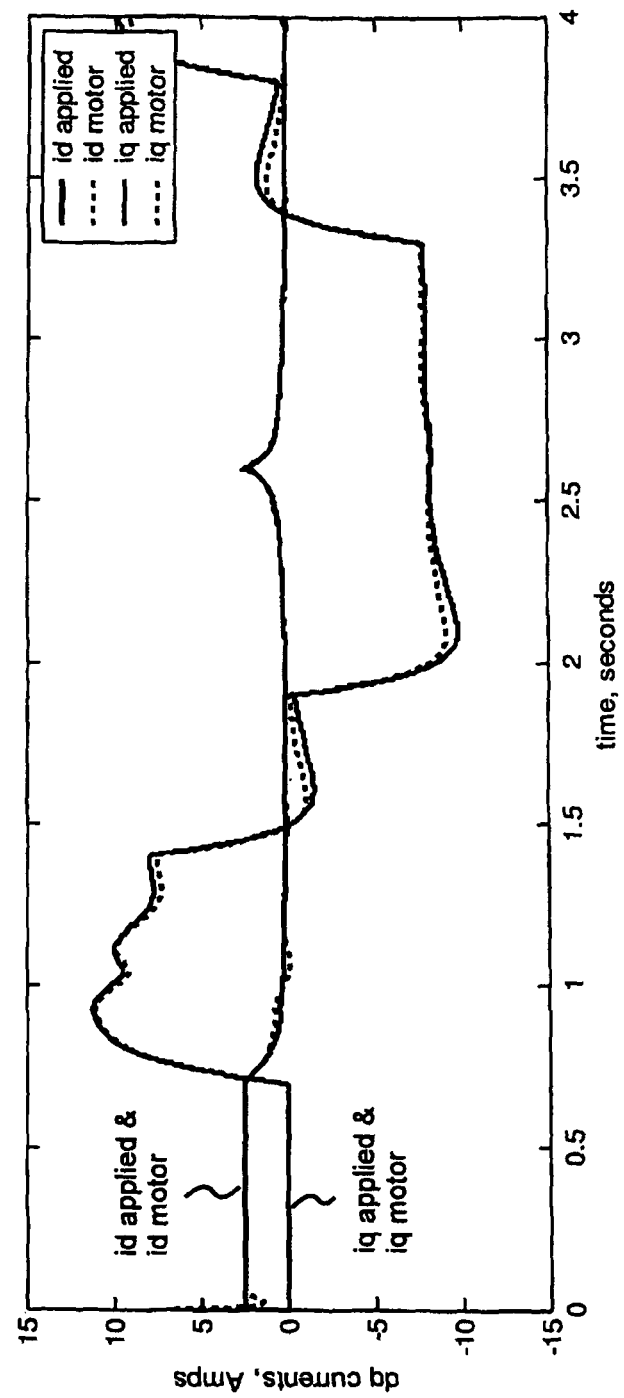
FIG. 62 graphically illustrates current waveforms with 20% load error.

For a controller using FFTC, the sensitivity to winding resistance is eased somewhat. The main problem now is the effect of the temperature induced variation in winding resistance on the low speed motor damping. For the simulated washer motor, the ideal damping resistance is around 1Ω but the actual resistance varies from 4.6Ω to 6Ω. In simulation, it was found that this range can just be accommodated if the estimated resistance is set to 6Ω and the inverter resistance $R_I$ is set to −6Ω, the most negative value which could be set whilst maintaining good stability. The estimated resistance is set to the high end of the range to ensure motor torque is over rather than under compensated. Speed response for the worst case situation when the motor is cold as shown in FIG. 58 is only marginal. In a practical controller, a software thermal model of the motor, combined with initial motor resistance measurement at rest using the d axis current would easily allow tracking of the winding resistance to within 10%, greatly improving controller performance under temperature variation.

To test sensitivity to variations in washer load, the actual equivalent load inertia in the simulation was reduced to 4 kg·m², which is the expected value for a washer load of 3 kg. Controller parameters were kept as shown in Table 5. The results of the simulation are shown in FIGS. 59 to 62. The main effect of the reduced inertia can be seen in the phase plot of FIG. 61. On initial acceleration after standstill the motor phase advances due to more torque being applied than required. This error reduces as speed is increased allowing the controller to detect and correct the torque error.

Note that the torque error is much larger on the initial speed increase from zero compared with subsequent speed reversals through zero. This is because the second order component of the torque disturbance compensator "remembers" the load torque measured at high speeds as the speed reverses through zero. With this mechanism, even larger load torque errors can be accommodated if the initial rise in motor speed is slowed until the speed rises to a sufficient level to enable the load model torque disturbance estimator to determine the true load torque. This feature, unique to feed forward torque control, is particularly useful for a cyclic reversing drive such as a washing machine direct drive.

Similar errors in other motor parameter estimates can also be accommodated. To reduce the chance of stalling the motor, it is much better that the errors result in an over torque and subsequent phase advance being applied to the motor rather than a phase retard.

With motor flux errors, the washer controller stability was found sensitive to a motor flux reduction but not to a motor flux increase of 20%. The motor flux estimate used in the controller should be set to the low end of the expected range, or alternatively, the flux estimate can be adjusted adaptively online, which is easy to do during the speed "plateau" period.

The estimate used for the motor inductance should be set to the low end of the expected range as was found for the servo drive simulation.

Controller Variations when Controlling an Induction Motor

Figure 63:
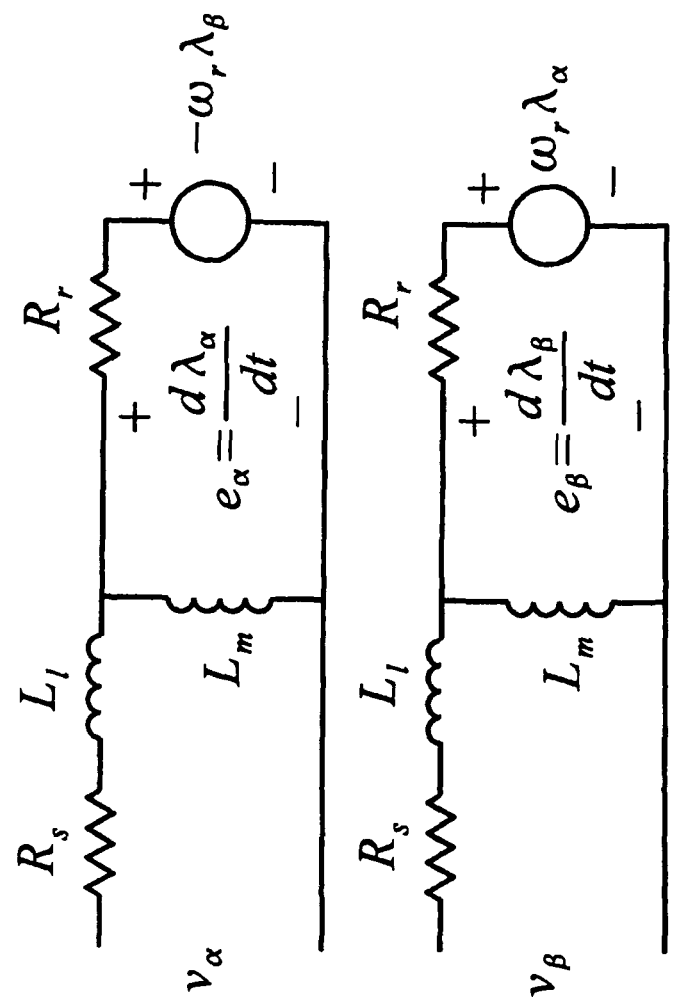
FIG. 63 schematically illustrates the induction motor equivalent circuit used for FFTC.

The feed forward torque controller as previously described was designed to control non-salient permanent magnet synchronous motors but can be easily modified to control an induction motor. The induction motor when controlled with FFTC is operated in the rotor oriented flux control mode where the rotor flux amplitude is fixed and the torque is controlled by controlling the rotor q axis current. Also, to simplify the control structure, for this example, the induction motor inductances are arranged in the "inverted L" equivalent circuit rather than the more accurate "T" equivalent circuit. The "T" equivalent circuit could be used with FFTC, but the performance gains are not worth the extra complexity for most applications. The stator reference frame equivalent circuit of the two-phase two-pole induction motor in the rotor flux orientation using the "inverted L" equivalent circuit is show in FIG. 63. It is assumed the stationary α and β phases are oriented as they are for the PMSM as shown in FIG. 4. The frequency $\omega_r$ in FIG. 63 is the rotational frequency of the rotor which for an induction motor differs from the flux rotational frequency by the slip frequency $\omega_s$ which varies with the torque.

With the rotor flux oriented control mode, the d axis flux is set to $\lambda_r$ and the q axis flux is set to zero, emulating the rotor flux vector of the PMSM as shown in FIG. 4. The steady state values of the rotor flux and back EMF when operating in the rotor flux oriented mode then become:

$$\lambda_\alpha = \lambda_r \cos\omega_e t \qquad (63)$$
$$\lambda_\beta = \lambda_r \sin\omega_e t$$
$$e_\alpha = \frac{d\lambda_\alpha}{dt} = \omega_e \lambda_r \sin\omega_e t$$
$$e_\beta = \frac{d\lambda_\beta}{dt} = -\omega_e \lambda_r \cos\omega_e t$$

where $\omega_e$ is the flux rotational frequency giving $\theta=\omega_e t$ in FIG. 4.

To keep the motor in the rotor flux oriented mode, the motor slip frequency $\omega_s=\omega_e-\omega_r$ must be controlled to be:

$$\omega_s = \frac{i_q R_r}{\lambda_r} \qquad (64)$$

The required modifications to the FFTC to operate the induction motor are:

1. The motor flux is no longer fixed but is dependent on the d axis current. The estimate of motor flux linkage used in the PMSM FFTC is replaced with an applied flux linkage $\lambda'_r$ which is dependent on the applied d axis current. There are now two components of the d axis current for the induction motor, the motor's magnetising current $i_{dm}$ and a transient current $i_{dt}$ while the flux amplitude is being changed. The applied d axis current is now:

$$i'_d = i'_{dm} + i'_{dt} \qquad (65)$$

with the applied magnetising and transient currents calculated separately.

The magnetising current must be set according to the selected flux linkage level. For a given rotor flux linkage $\lambda_r$ the d axis magnetising current is given by:

$$i_{dm} = \frac{\lambda_r}{L_m} \qquad (66)$$

For the feed forward block, the applied d axis magnetising current can be calculated from the applied flux linkage and an estimate of the motor magnetising inductance.

A change in motor flux (not possible with the PMSM) results in a transient d axis current which must be compensated for. This component of the d axis current $i_{dt}$ is given by:

$$i_{dt} = \frac{1}{R_r} \frac{d\lambda_r}{dt} \qquad (67)$$

Figure 64:
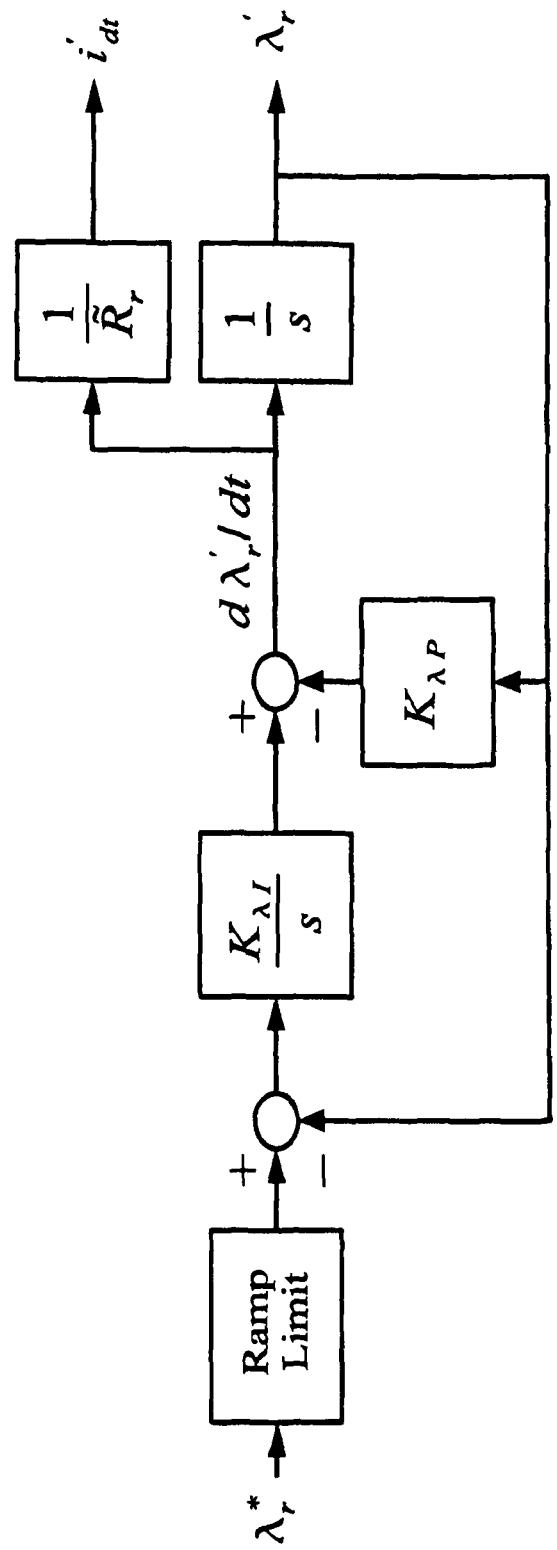
FIG. 64 schematically illustrates the induction motor control system for generating applied flux and d axis transient current.

A simple way of generating the applied current is to ramp up or down the applied flux to the new reference flux linkage value at a fixed ramp rate and setting the applied transient current $i_{dt}$ during the ramp time according to the ramp rate using equation (67) and the estimate of rotor resistance. This has the problem of generating unnecessary sharp changes in the d axis current. An alternative method is to use a local feedback control system for generating the applied flux linkage and transient d axis current such as that shown in FIG. 64. A feedback loop with a proportional-integral controller is used to generate the applied flux linkage and its derivative. The proportional term is placed in a slightly different position than normal to soften the rate of change of the applied flux linkage derivative. The ramp limit on the flux linkage reference limits the rate of rise or fall of the reference, limiting the peak value of the applied transient current $i'_{dt}$.

Note that whenever the inverse of the flux linkage is used in calculations, to avoid possible division by zero problems, the applied flux linkage should have its value is clipped to preferably the minimum likely value of the reference flux linkage to avoid controller start up problems. Alternatively, the reference flux linkage value can be used instead of the applied value for these calculations.

Also note that the natural frequency and thus most controller constants depend on the flux linkage level. If large variations in the rotor flux linkage occur, these constants will need to be varied with the flux linkage. If the rotor flux linkage does not vary by much, then fixed compromise values for these constants can be used.

2. The motor resistance R used for the PMSM is replaced by the induction motor stator resistance $R_s$ and the motor inductance term L is replaced with the total leakage inductance of the induction motor $L_l$. This assumes the motor inductances are modelled using the "inverted L" equivalent circuit rather than the more exact "T" equivalent circuit. The "T" equivalent circuit could be incorporated into the feed forward block but adds unnecessary complexity.

3. For the PMSM, the rotor frequency and the flux rotation frequency are the same and there is only one applied frequency $\omega'$. For the induction motor, the rotor frequency $\omega_r$ and the flux rotation frequency $\omega_e$ differ by the slip frequency $\omega_s$ which is given by equation (64).

For the induction motor FFTC, the applied rotor frequency $\omega'_r$ is calculated in the same way that the frequency $\omega'$ is calculated for the PMSM but the applied flux rotation frequency $\omega'_e$ is calculated by adding the applied slip frequency $\omega'_s$ to frequency $\omega'_r$. The applied slip frequency is calculated from the applied flux linkage, applied q axis current and an estimate of the rotor resistance using equation (64).

4. The motor slip, being proportional to torque, acts the same way as the high speed stability damping term in the PMSM FFTC. To compensate, the effect of motor slip must be subtracted from this term. Equation (17) describing the high speed damping is now modified to:

$$\omega'_r \approx \frac{T^*}{\tilde{J}s} - \left(2K_H\sqrt{\frac{\tilde{L}}{\tilde{J}}} - \frac{\tilde{R}_r}{\tilde{\lambda}'_r}\right)\Delta i_q. \quad (68)$$

5. When operating at zero and low speed, the $i_d$ current may need to be increased as it is for the PMSM motor to allow for unknown torque disturbances. This is done by increasing the reference flux linkage to increase the magnetising current. Most induction motors have a strong saturation characteristic producing a large increase in the magnetising current for only a small increase in flux linkage. If the reference flux is increased, the estimate of the magnetising inductance $\tilde{L}_m$ will need to be a function of the reference flux to match the saturation characteristic of the motor.

Figure 65:
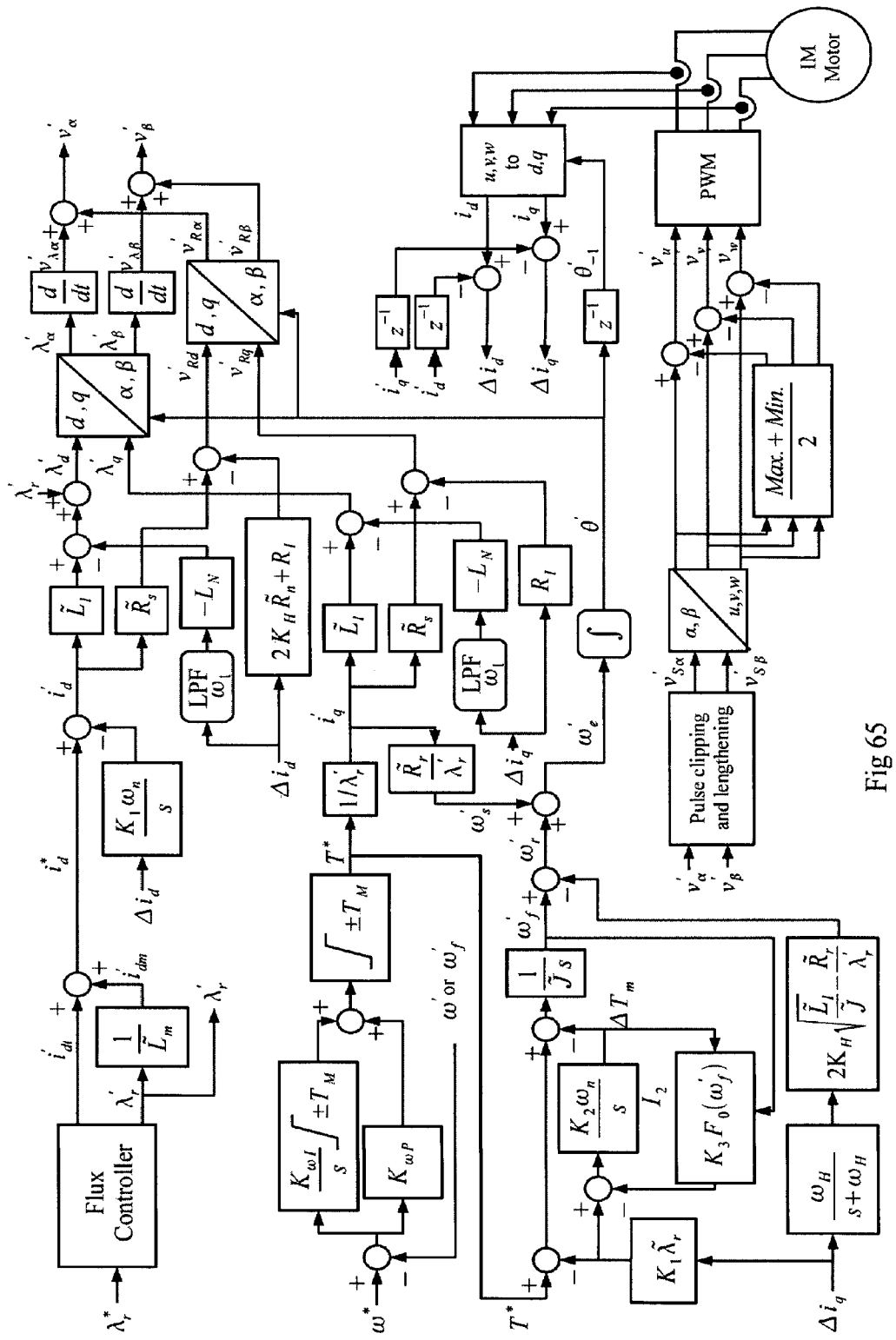
FIG. 65 schematically illustrates a complete system for an induction motor.

The preliminary design of a complete FFTC for an induction motor incorporating the above modifications is shown in FIG. 65. This design may require further changes depending on the application to which the motor is being applied.

The benefits of applying FFTC to induction motors for sensorless control are the same as those for the PMSM: motor speed no longer needs to be estimated from the motor terminal currents and voltages allowing sensorless operation through zero speed without changing algorithms. Also, because of the much shorter rotor time constant under voltage control, recovery from disturbances due to control errors is much faster than for traditional current controlled schemes.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The invention claimed is:

1. A controller for an AC electric motor, the controller comprising:
   i) a Feed Forward Torque Controller which directly derives a torque related component of applied motor voltages from a signal representing a torque command input T* and at least one motor parameter;
   ii) a load model, which derives a motor speed value including a model of motor speed behaviour of the AC electric motor to provide an output signal which represents the motor speed of the AC electric motor for use in determining a frequency of rotation of an applied motor voltage vector and where an input to the load model is the signal representing the torque command input T*, the load model using the signal representing the torque command T*, at least over a part of an operating speed range of the AC motor which includes zero speed, to determine the motor speed output signal.

2. The controller of claim 1 wherein the load model uses the signal representing the torque command T* over a full operating speed range.

3. The controller of claim 1 wherein a further input of the load model receives a signal representing a torque producing component of the motor currents and used to modify the output signal of the load model for at least a part of operating speed range.

4. The controller of claim 3, wherein the load model, includes a modelling component representing an inertial component of the load.

5. The controller of claim 4 wherein the load model receives the signal representing the torque producing component of the motor current over a full operating speed range.

6. The controller of claim 4 wherein the signal representing a torque producing component of the motor current is a correction value $\Delta i_q$ derived in a correction calculator which compares an applied torque current $i'_q$ derived from the signal representing the torque command input T* and a measured torque producing component $i_q$ of the motor currents.

7. The controller of claim 4 further comprising a flux current controller which directly derives a flux related component of applied motor voltages from a flux current command input and wherein a flux component of the motor currents is increased to hold a rotor of the motor in alignment with a direction of a magnetic field produced by the flux component of the motor currents at zero motor speed and at motor speeds at which the rotor cannot align naturally from a presence of motor back EMF.

8. The controller of claim 4 wherein the Feed Forward Torque Controller does not use direct feedback information from the motor to derive the torque related component of applied motor voltages from the signal representing the torque command input T*.

9. The controller of claim 4 wherein the Feed Forward Torque Controller uses indirect feedback information comprising an applied motor speed $\omega'$ derived by the load model using the signal representing the torque command input T*, and correction value $\Delta i_q$ derived in a correction calculator which compares an applied torque current $i'_q$ derived from the signal representing the torque command input T* and a measured torque producing component $i_q$ of the motor currents.

10. The controller of claim 4 wherein the at least one motor parameter includes a value of rotor flux linkage $\lambda_r$.

11. The controller as claimed in claim 10 wherein the value of rotor flux linkage $\lambda_r$ is an estimated value.

12. The controller of claim 4 wherein the load model incorporates a stability control component including a high speed damping component for stability control.

13. The controller as claimed in claim 12 wherein the stability control component comprises a modulator which modulates an applied motor speed signal with a signal representing a torque producing component of the motor currents.

14. The controller of claim 13 wherein a signal representing a torque producing component of the motor currents is a correction value $\Delta i_q$ derived in a correction calculator which compares the applied torque current $i'_q$ derived from the signal representing the torque command input T* and a measured torque producing component $i_q$ of the motor currents.

15. The controller as claimed in claim 14 wherein the load model incorporates a $1^{st}$ order load torque correction component.

16. The controller of claim 15 wherein the $1^{st}$ order load torque correction component corrects the torque command input of the load model by subtracting a signal proportional to a signal representing a torque producing component of the motor currents.

17. The controller as claimed in claim 16 wherein the load model incorporates a 2nd order load torque correction component.

18. The controller of claim 17 wherein an integrator has an input which is a signal representing a torque producing component of the motor currents and wherein the 2nd order load torque correction component corrects the torque command input of the load model by subtracting a signal proportional to an output of the integrator.

19. The controller as claimed in claim 18 wherein, at least over a part of an operating speed range of the AC motor which includes zero speed, the integrator includes a DC gain which is limited by modifying the integrator to configure it as a single pole low pass filter.

20. The controller as claimed in claim 19 wherein the DC gain is modified as a function of motor speed with the DC gain increasing as motor speed increases.

* * * * *